United States Patent
Yu et al.

(10) Patent No.: US 12,321,081 B2
(45) Date of Patent: Jun. 3, 2025

(54) PHOTONIC-CRYSTAL RESONATORS FOR SPONTANEOUS OPTICAL-PULSE GENERATION

(71) Applicants: The Regents of the University of Colorado, Denver, CO (US); Government of the United States of America, as represented by the Secretary of Commerce, Gaithersburg, MD (US)

(72) Inventors: Su-Peng Yu, Boulder, CO (US); Scott B. Papp, Boulder, CO (US)

(73) Assignees: The Regents of the University of Colorado, Denver, CO (US); Government of the United States of America, as represented by the Secretary of Commerce, Gaithersburg, MD (US)

( * ) Notice: Subject to any disclaimer, the term of this patent is extended or adjusted under 35 U.S.C. 154(b) by 512 days.

(21) Appl. No.: 17/648,913

(22) Filed: Jan. 25, 2022

(65) Prior Publication Data

US 2024/0248368 A1    Jul. 25, 2024

Related U.S. Application Data

(60) Provisional application No. 63/141,312, filed on Jan. 25, 2021.

(51) Int. Cl.
G02F 1/365    (2006.01)

(52) U.S. Cl.
CPC .................... *G02F 1/365* (2013.01)

(58) Field of Classification Search
CPC ...................................................... G02F 1/365
See application file for complete search history.

(56) References Cited

U.S. PATENT DOCUMENTS 8,195,011 B2 * 6/2012 Goldring ................. G02F 1/025
359/254
9,863,771 B2 * 1/2018 Ciminelli ............. G01C 19/727
(Continued)

FOREIGN PATENT DOCUMENTS

JP    2004325900 A    * 11/2004    ............... G02B 6/12

OTHER PUBLICATIONS

Drake et al., "Terahertz-Rate Kerr-Microresonator Optical Clockwork," Physical Review X 9, 031023 (2019), DOI: 10.1103/PhysRevX.9.031023.
(Continued)

*Primary Examiner* — Daniel Petkovsek
(74) *Attorney, Agent, or Firm* — Cozen O'Connor

(57) ABSTRACT

A photonic-crystal resonator (PhCR) and associated methods of design and manufacture. The PhCR includes spontaneous optical-pulse generation and includes a ring whose geometry is correlated to a mode structure or dispersion of the PhCR while also taking into account a desired type of nonlinear optical output from the PhCR, such as an optical frequency comb, or a particular type of pulse. The PhCR includes a periodic nanopatterning on an inner radial wall of its ring and is able to spontaneously generate a nonlinear optical output. The nanopatterning of the inner radial wall is designed to form a desired output, such as one of a classic soliton pulse that has a sech type temporal profile, or a gaussian profile, or a sink pulse profile.

8 Claims, 46 Drawing Sheets

(56) References Cited

U.S. PATENT DOCUMENTS

| | | | |
|---|---|---|---|
| 10,996,538 B2* | 5/2021 | Popovic | G02B 6/29395 |
| 11,226,538 B2* | 1/2022 | Marandi | G02F 1/39 |
| 11,754,908 B2* | 9/2023 | Huang | G02F 1/353 |
| | | | 385/32 |
| 2012/0063484 A1* | 3/2012 | Goddard | G02B 6/124 |
| | | | 264/293 |
| 2024/0120706 A1* | 4/2024 | Papp | H01S 5/026 |

OTHER PUBLICATIONS

Lu et al., "Selective engineering of cavity resonance for frequency matching in optical parametric processes," arXiv:1407.4488v1 [physics.optics] Jul. 16, 2014.

Yu et al., "A continuum of bright and dark pulse states in a photonic-crystal resonator," arXiv:2109.01280v1, [physics.optics], Sep. 2021.

Yu et al., "Spontaneous pulse formation in edgeless photonic crystal resonators," Nature Photonics vol. 15, Jun. 2021, pp. 461-467, https://doi.org/10.1038/s41566-021-00800-3.

* cited by examiner

2200

2250

PHOTONIC-CRYSTAL RESONATORS FOR SPONTANEOUS OPTICAL-PULSE GENERATION

RELATED APPLICATIONS

This application claims priority to U.S. Provisional Patent Application No. 63/141,312, titled "Photonic-Crystal Resonators for Spontaneous Optical-Pulse Generation," filed Jan. 25, 2021, which is incorporated in its entirety herein by reference.

STATEMENT REGARDING FEDERALLY SPONSORED RESEARCH OR DEVELOPMENT

This invention was made with government support under grant number HR0011-19-2-0016 awarded by DOD/DARPA and grant number 70NANB18H006 awarded by NIST. The government has certain rights in the invention.

BACKGROUND

Complex systems are a proving ground for fundamental interactions between components and their collective emergent phenomena. Through intricate design, integrated photonics offers intriguing nonlinear interactions that create new patterns of light. In particular, the canonical Kerr-nonlinear resonator becomes unstable with a sufficiently intense traveling-wave excitation, yielding instead a Turing pattern composed of a few interfering waves. These resonators also support the localized soliton pulse as a separate nonlinear stationary state. Kerr solitons are remarkably versatile for applications, but they cannot emerge from constant excitation.

SUMMARY

The present embodiments include an edge-less photonic-crystal resonator (PhCR) that spontaneously forms soliton pulses in place of a Turing pattern. The PhCR is designed in the regime of single-azimuthal-mode engineering to re-balance Kerr-nonlinear frequency shifts in favor of the soliton state, commensurate with how group-velocity dispersion balances nonlinearity. PhCR solitons are established as mode-locked pulses by way of ultraprecise optical-frequency measurements, and their fundamental properties are characterized. The embodiments described herein disclose sub-wavelength nanophotonic designs that expand the toolbox for engineering nonlinear light interactions and associated devices.

The spontaneous formation of pulses reduces the system complexity for soliton formation and stabilization, which may advantageously result in low power consumption, packaging-friendly devices, or integrated systems with multiple independent pulse sources. Spontaneous-pulse devices like the PhCRs disclosed herein may become building blocks for future nonlinear optics and integrated photonics technologies. Additionally, the ability to controllably shift modes while maintaining the bulk dispersion profile provides a tool to explore the physics occurring in a nonlinear process. Here, the capability modifies the behavior of the pump mode, which may lead to applications such as direct engineering of dispersive waves or soliton crystals, potentially enabling inverse design methods for arbitrary desired waveforms.

In one embodiment, a photonic-crystal resonator (PhCR) includes a ring having an outer radial wall and an inner radial wall, and a waveguide lying tangential to the outer radial wall, where the inner radial wall is periodically nanopatterned.

In another embodiment, a method fabricates a photonic-crystal resonator (PhCR). The method includes depositing a layer of tantalum pentoxide ($Ta_2O_5$) onto a silicon wafer; performing lithography to transfer, to the TA2O5 layer, a photonics pattern that defines the PhCR with a ring having an outer radial wall and an inner radial wall, and a waveguide lying tangential to the outer radial wall, where the inner radial wall is periodically nanopatterned; transferring the photonics pattern to the $Ta_2O_5$ layer using reactive-ion etching; and performing lithography to define one or more chips on the silicon wafer.

In another embodiment, a method for designing a photonic-crystal resonator (PhCR) for spontaneous optical-pulse generation includes: determine structure of the PhCR based on a desired operational frequency; calculate a dispersion and a photonic bandgap of a ring resonator and an azimuthal mode order; determine a gap between the bus waveguide and the ring resonator waveguide based on a required strength of evanescent coupling; and introduce PhCR modulation with the periodicity and sinusoidal peak-to-peak amplitude for the inner radial wall of the ring.

BRIEF DESCRIPTION OF THE FIGURES

FIGS. 26B, 27A, and 27B plot the waveform of FIG. 26A on the red- and blue-detuned ranges of an α sweep ($α_1 \le α_2 \ldots < α_6$), showing the increase of dark-pulse duration and the decrease of bright-pulse duration with a.

DETAILED DESCRIPTION

Figure 1:
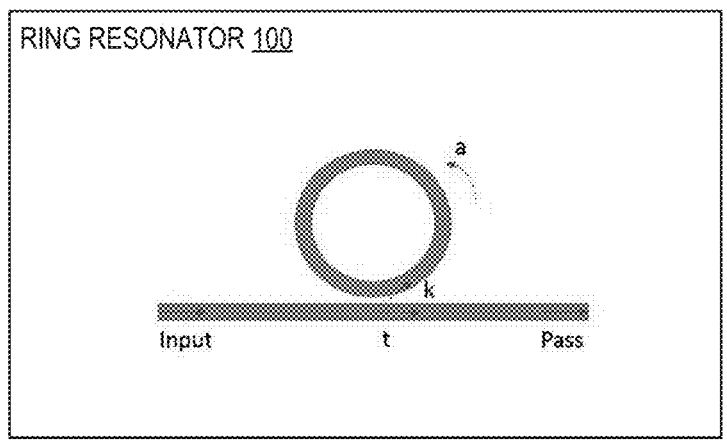
FIG. 1 is a schematic diagram illustrating a conventional ring resonator.

Nonlinear optical susceptibilities form the basis of many photonics technologies. For example, harmonic- or difference-frequency generation that realizes laser sources from the ultraviolet to the infrared. In particular, third-order Kerr processes are ubiquitous in photonics due to intensity dependence of the refractive index, $n=n_0+n_2 I$, where $n_2$ is the nonlinear index and I is intensity. Third-order Kerr processes enable spontaneous formation of stationary configurations of electromagnetic fields that affect conversion of a laser from one color to another. More generally, modulation instability that arises from nonlinearity governs interesting behaviors in systems ranging from quantum matter to desert sand dunes.

Kerr resonators, such as optical cavities that include an intracavity $n_2$ material, allow for understanding the formation of certain pattern and pulse states of the intraresonator field ψ from the Lugiato-Lefever equation (LLE) $\partial_\tau \psi = -(1+i\alpha)\psi - i/2\beta\partial_\theta^2\psi + i|\psi|^2\psi + F$, where θ is the resonator angular coordinate, $-i/2\beta\partial_\theta^2\psi$ is the group-velocity dispersion (hereafter GVD or dispersion), $|\psi|^2\psi$ is the nonlinearity, F is a traveling-wave pump-laser field originating outside the resonator with a red detuning of α to a lower frequency than the resonator mode. A few states stand out amongst the diverse solution space of the LLE, including the constant-amplitude flat state energized by a sufficiently weak pump laser, the Turing pattern that emerges when the flat state is unstable, and the Kerr soliton that is a localized pulse coexisting with, but not emerging spontaneously from, the flat state. For example, microresonator soliton frequency combs have been engineered to support a wide range of applications, including optical communication, spectroscopy, and ranging. Dispersion engineering via the cross-sectional waveguide dimensions offers powerful control of soliton properties. Moreover, exotic photonic states have been reported using unconventional resonator-mode engineering.

Spontaneous formation of patterns from break-up of the flat state is a critical outcome in the LLE. A pattern forms spontaneously by four-wave mixing (FWM), constrained by a balance of the Kerr frequency shift $\delta_\mu$ of the comb mode number μ, and the phase-mismatch from dispersion $\beta\mu^2/2$. The comb modes and the resonator modes with respect to the mode closest to the pump laser (hereafter the pump mode, μ=0) may count. Importantly, $\delta_\mu$ for each mode depends on the intraresonator field according to $\delta_\mu = g(2N - |a_\mu|)^2$, where $a_\mu$ denotes the Fourier amplitude for mode $\mu$, g denotes the per-photon Kerr shift, and N denotes the total photon number. The term g=1 is a standard normalization of the LLE. Beginning with the flat state, all $\alpha_{\mu'\neq 0}=0$ and $\delta_{\mu=0}=2N-N=\delta_{\mu'\neq 0}/2$, where the modes $\mu'$ are not pumped. The difference between self- and cross-phase modulation results in a reduced Kerr shift for the pump mode by a factor of two compared to other modes. This reduced Kerr shift enables FWM for the Turing pattern at modes $\pm\mu'$, characterized by $\beta|\mu'|^2/2-\delta_{\pm\mu'}=-\delta_{\mu=0}$. Conversely, the soliton is a collective state with many modes $\mu'$ that reach phase-matching only at large $\alpha$ where the flat-state amplitude is insufficient to support spontaneous FWM processes. These phase-matching conditions result in the disparate generation behaviors of Turing patterns and solitons.

A re-balancing of the LLE that causes Kerr-soliton formation from break-up of the flat state, replacing the Turing pattern, is explored. To accomplish this dramatic outcome, edge-less photonic-crystal resonators (PhCR) are designed and fabricated. These PhCRs are Kerr-microresonators with their inner radial wall modified by a periodically nanopatterned shape oscillation. The ring geometry imposes the edge-less boundary condition on the photonic waveguide, opening the PhCR bandgap—thus controllably shifting the frequency—for one azimuthal mode. The shift is programmed to directly phase-match the soliton with the pump laser nearly on-resonance with the pump mode. Moreover, this shifts the Turing pattern off-resonance, precluding its formation. Advantageously, aspects of the present embodiments include the realization that spontaneous soliton formation in wide-ranging experiments, including observing the immediate transition from the flat state to the soliton, soliton pulse bandwidth control by dispersion engineering through the bulk ring dimensions, and ultraprecise measurements of the soliton repetition frequency should be explored.

Advances in nanophotonics and photonic-crystal devices provide access to otherwise challenging or impossible to achieve phenomena, such as exotic refractive phenomenon, strong light-matter interactions, and coupling to radiofrequency or phonon modes, for example. Moreover, photonic structures have been demonstrated to suppress and enhance nonlinear effects, engineer small mode volume, create sophisticated group-velocity dispersion profiles, realize slow-light effects, and control resonator mode splittings. Photonic-crystal devices are dielectric structures with sub-wavelength spatial periodicity that restrict scattering to discrete momentum values $k_m=k_0+2m\pi/\Lambda$ not interacting with free-space modes, where $\Lambda$ is the periodicity and m is an integer. In a photonic resonator, the bandgap imposes reflective boundaries to confine light as in a Fabry-Perot cavity. Previous experiments have used the bandgap in an edge-less boundary condition (e.g., a complete ring without edges) to modify a select mode of the PhCR. This condition, combined with an even number of nanopattern periods, frequency-aligns the bandgap to a mode of the PhCR.

FIG. 1 is a schematic diagram illustrating a conventional ring resonator 100. Ring resonator 100 is used for comparison purposes in the following description.

Figure 2:
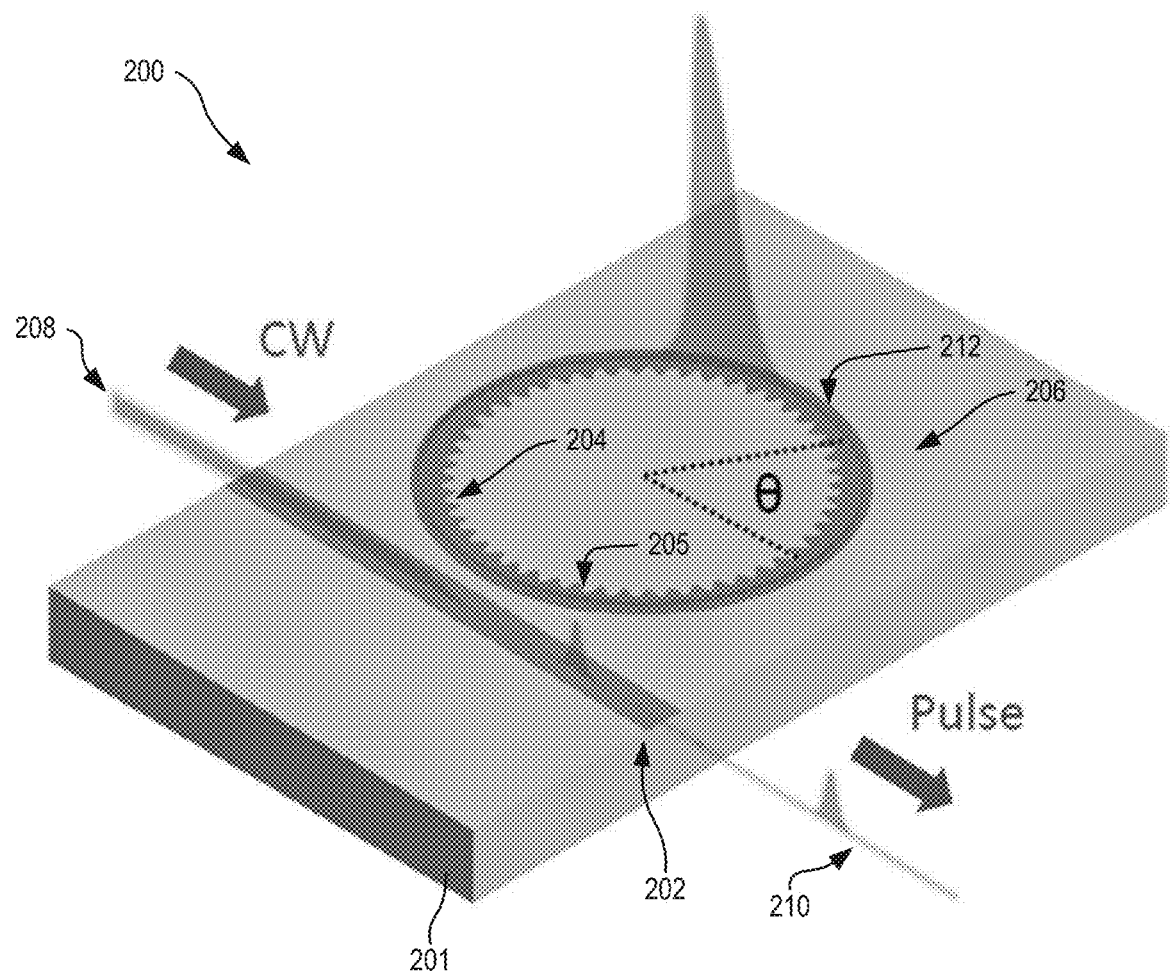
FIG. 2 is a schematic illustrating a photonic-crystal resonators (PhCR) for soliton formation, in embodiments.

FIG. 2 is a schematic illustrating one example PhCR 200 for soliton formation. PhCR 200 includes a coupling waveguide 202 lying tangential to an outer radial wall 212 of a nanopatterned ring 206 formed in a PhCR chip 201. The frequency shift $\epsilon_{PhC}$ is controlled by a periodic nanopattern 204 formed on an inner radial wall 205 of ring 206, while the pump laser field F couples evanescently into the PhCR from waveguide 202. A continuous-wave pump laser input 208 energizes PhCR 200 and creates a stable soliton pulse-train 210 at the output. Outer radial wall 212 of ring 206 is smooth and not patterned (e.g., azimuthally uniform), and only the inner radial wall 205 of ring 206 is periodically nanopatterned. This smooth (non-patterned) outer radial wall 212 facilitates evanescent coupling between ring 206 and waveguide 202.

FIGS. 3A-7 introduce the mode-frequency structure of ring resonator 100 of FIG. 1 and PhCR 200 of FIG. 2, emphasizing how modifying the pump mode affects Turing-pattern and Kerr-soliton generation. The diagrams plot the modal detuning $f_\mu-(f_0+\mu\cdot FSR)$ for each mode $\mu$, showing the cold-resonator modes that correspond to comb modes $\mu$ (crosses) and the hot-resonator modes (open circles). The cold resonances follow the integrated dispersion $D_{int}=\omega_\mu-\omega_0-D_1\mu=D_2\mu^2/2+\epsilon_{PhC}\cdot(1-\delta(\mu))$, where $\omega_\mu$ is the angular frequency, $D_1$ is the free-spectral range, $\epsilon_{PhC}$ is the frequency shift of the pump mode, and $\delta(\mu)$ is the Kronecker delta function. We additionally shift the hot resonances by the Kerr shift $\delta_\mu$, indicating phase accumulation from the Kerr effect. At the onset of flat-state breakup, $\delta_{\mu=0}$ is half that for all other modes.

Figure 3A:
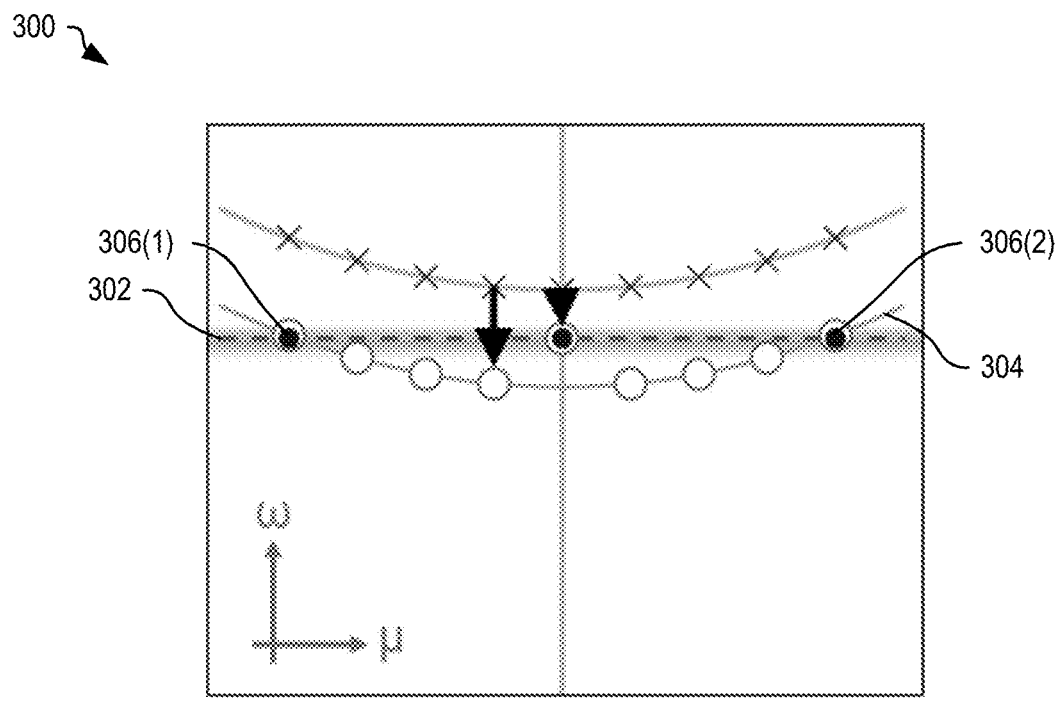
FIG. 3A is a graph illustrating natural phase matching for four-wave mixing to the mode u' of a ring resonator, in embodiments.
Figure 3B:
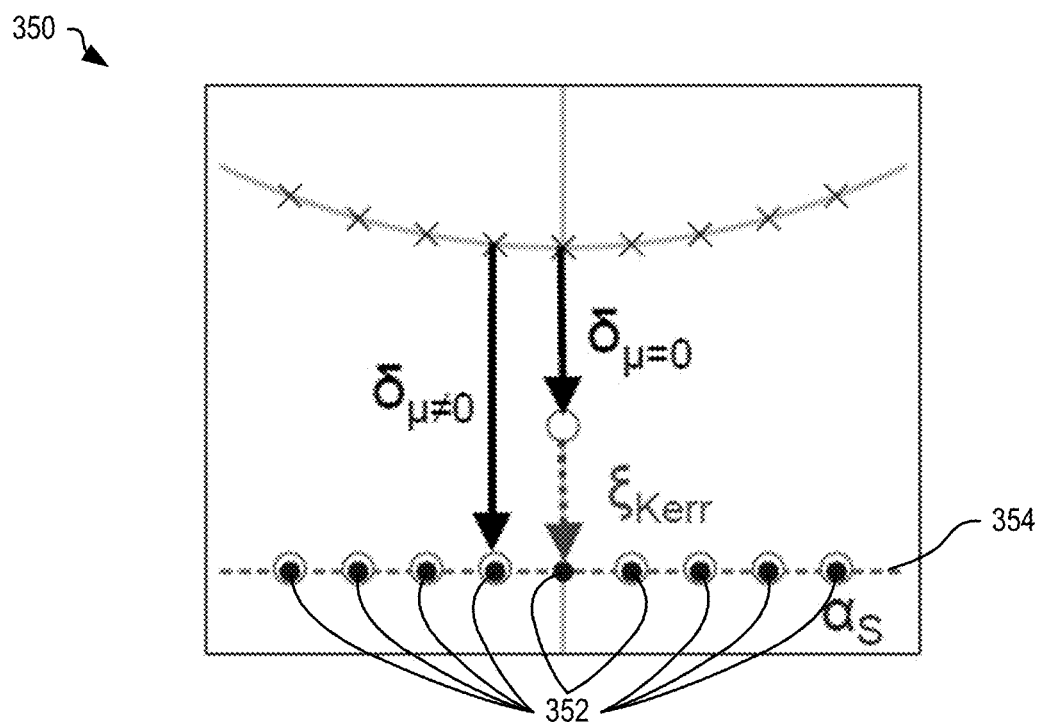
FIG. 3B is a graph illustrating that a stationary soliton state of the ring resonator involves Kerr frequency shifts to balance dispersion across many equidistant comb modes, in embodiments.

FIG. 3A is a graph 300 illustrating natural phase matching for FWM to the mode $\mu'$ of a ring resonator, where a horizontal dashed line 302 matches the shifted $D_{int}$ curve 304. Hence, the Turing pattern emerges, initially composed of pump and $\pm\mu'$ modes 306(1) and 306(2) (blue dots). FIG. 3B is a graph 350 illustrating that a stationary soliton state of the ring resonator involves Kerr frequency shifts to balance dispersion across many equidistant comb modes 352 (blue dots); a horizontal line 354 indicates the pump laser. However, since the pump-mode Kerr shift is reduced, only large $\alpha$ balances the Kerr mismatch $\xi_{Kerr}=\delta_{\mu\neq 0}-\delta_{\mu=0}$. This detuning precludes spontaneous formation of the Turing pattern, but also precludes the formation of solitons, as the low flat state amplitude is below threshold. See details below in the section titled: Kerr Shift Calculation.

Figure 4A:
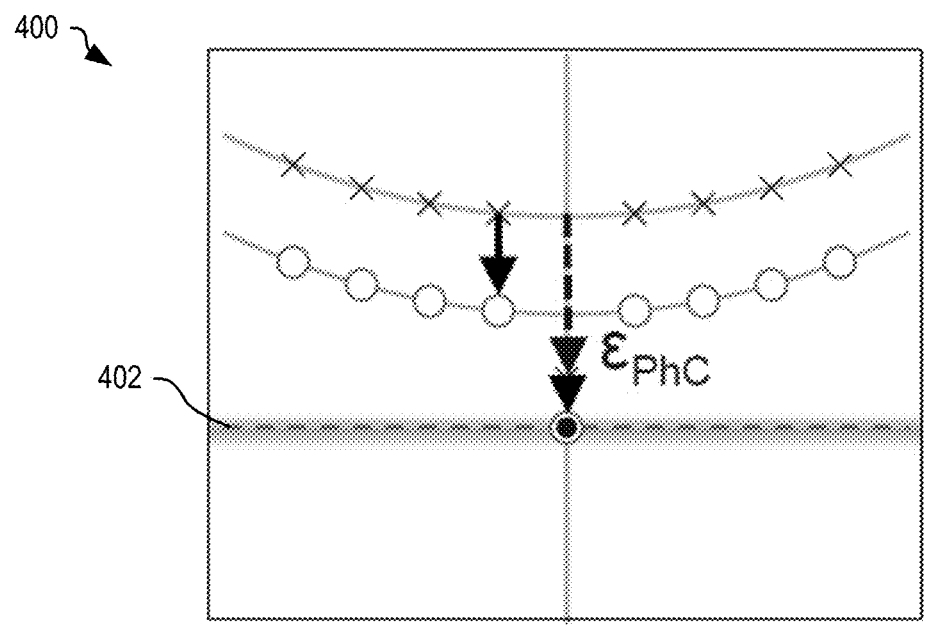
FIGS. 4A and 4B are Kerr shift diagrams illustrating a negative shift of both the cold and hot resonator at comb mode u, in embodiments.
Figure 4B:
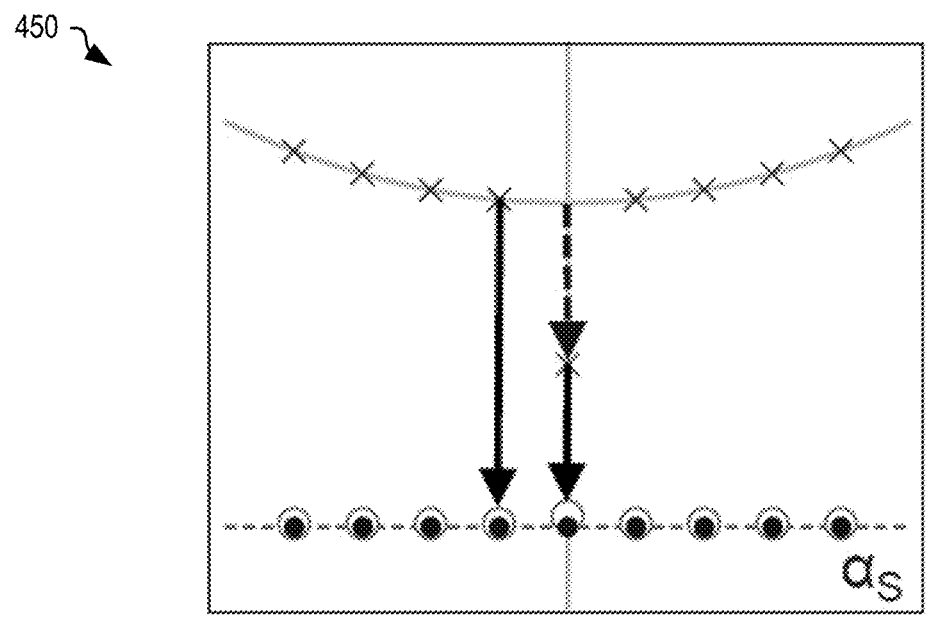

FIGS. 4A and 4B are Kerr shift diagrams illustrating a negative shift of both the cold and hot resonator at comb mode $\mu$. With PhCR 200, a frequency shift $\epsilon_{PhC}$ is programmed to alleviate the $\xi_{Kerr}$ mismatch of the soliton state. The negative shift of both the cold and hot resonator at comb mode $\mu$ are apparent in FIGS. 4A and 4B. Under this condition, the Turing pattern no longer emerges from the flat state when the pump mode is energized, since the natural FWM phase matching is removed; see the horizontal line 402 in FIG. 4A. Importantly, the shift $\epsilon_{PhC}$ moves the cold pump mode toward lower frequency by an amount commensurate with the mismatch $\xi_{Kerr}$, thereby compensating for the reduced Kerr shift on the pump mode, bringing it approximately onto resonance with the pump laser, as shown in graph 450 of FIG. 4B.

Figure 5A:
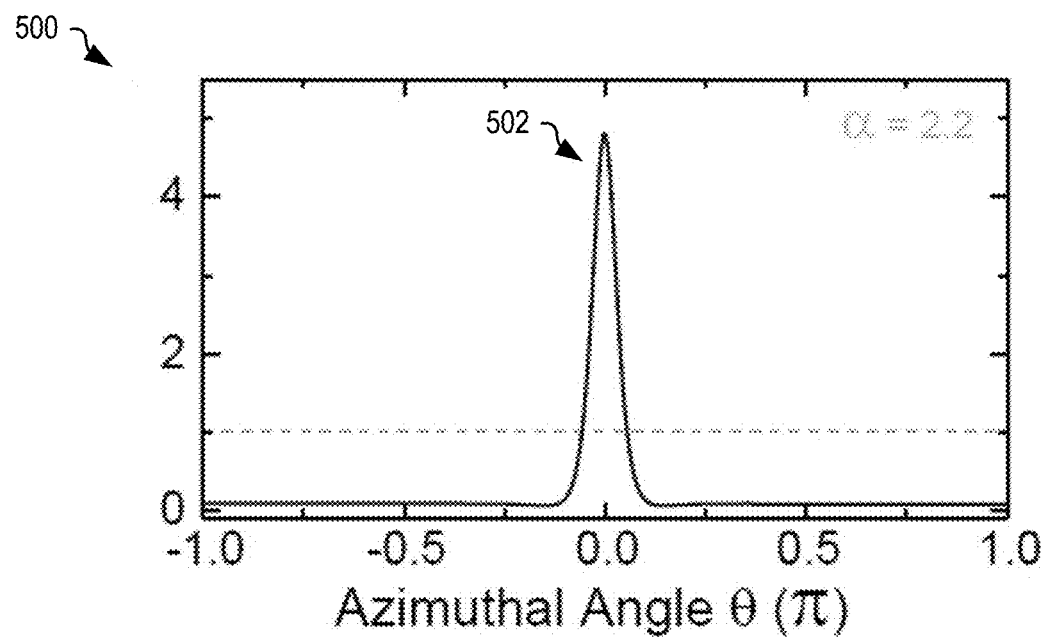
FIG. 5A is a graph illustrating a peak intensity of the PhCR of FIG. 2, in embodiments.
Figure 5B:
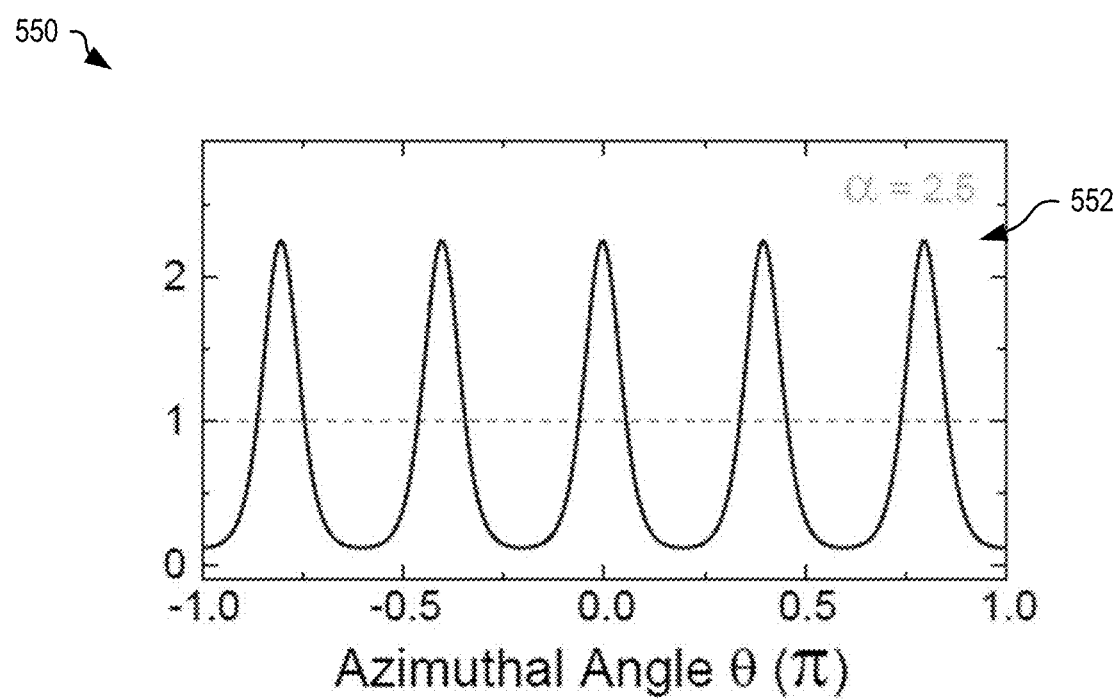
FIG. 5B is a graph illustrating detuning of the conventional ring resonator of FIG. 1.

To verify the physical understanding presented above, an LLE is used to calculate $\psi$ during a sweep of the pump-laser frequency across the pump mode as described below in the section titled: Derivation of Modified LLE. FIG. 5A is a graph 500 illustrating a peak intensity $|\psi|^2$ 502 of PhCR 200 of FIG. 2. FIG. 5B is a graph 550 illustrating detuning of conventional ring resonator 100 of FIG. 1. All frequency variables including $\alpha$ and $\epsilon_{PhC}$ are in unit of half-width-half-max linewidths unless otherwise specified. Aside from changing $\epsilon_{PhC}$ from 0 to 2.8 to activate the PhCR frequency shift, both simulations are performed with the same conditions, namely F=1.5, $\beta$=-0.17. Ring resonator 100 produces the 5-lobe Turing pattern 652 as the pump detuning is swept completely across resonance, corresponding to a range of $\alpha$ from -2 to 4. Performing the same $\alpha$ sweep with PhCR 200 results in single pulse 502 forming with abrupt onset.

Neither Turing patterns nor chaotic states form during the sweep with PhCR 200. Furthermore, pulse 502 demonstrates two distinct sections of oscillatory stages, known as "breather" soliton states. The reappearance of the breather state at the end of the sweep also contrasts with soliton behavior of conventional ring resonator 100, as observed in experiments.

Figure 6:
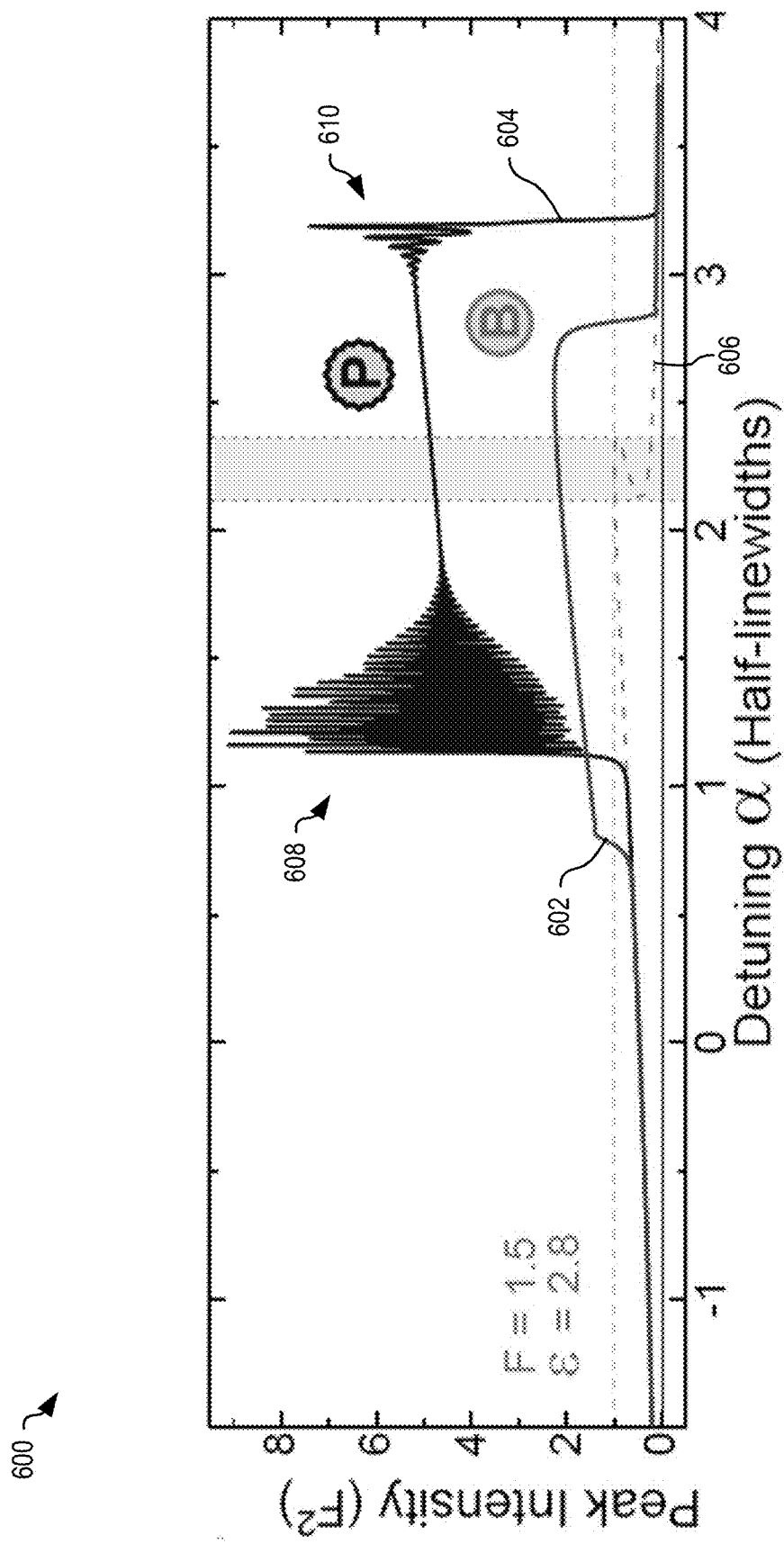
FIG. 6 is a graph illustrating simulated peak power versus pump laser detuning for the conventional ring resonator of FIG. 1 and the PhCR of FIG. 2, in embodiments.

FIG. 6 is a graph 600 illustrating simulated peak power versus pump laser detuning for conventional ring resonator 100 (line 602—green) and PhCR 200 (line 604—blue), with the analytic at amplitude (line 606—dashed gray) for reference. The corresponding intensity proles are shown in FIGS. 5A and 5B.

Figure 7A:
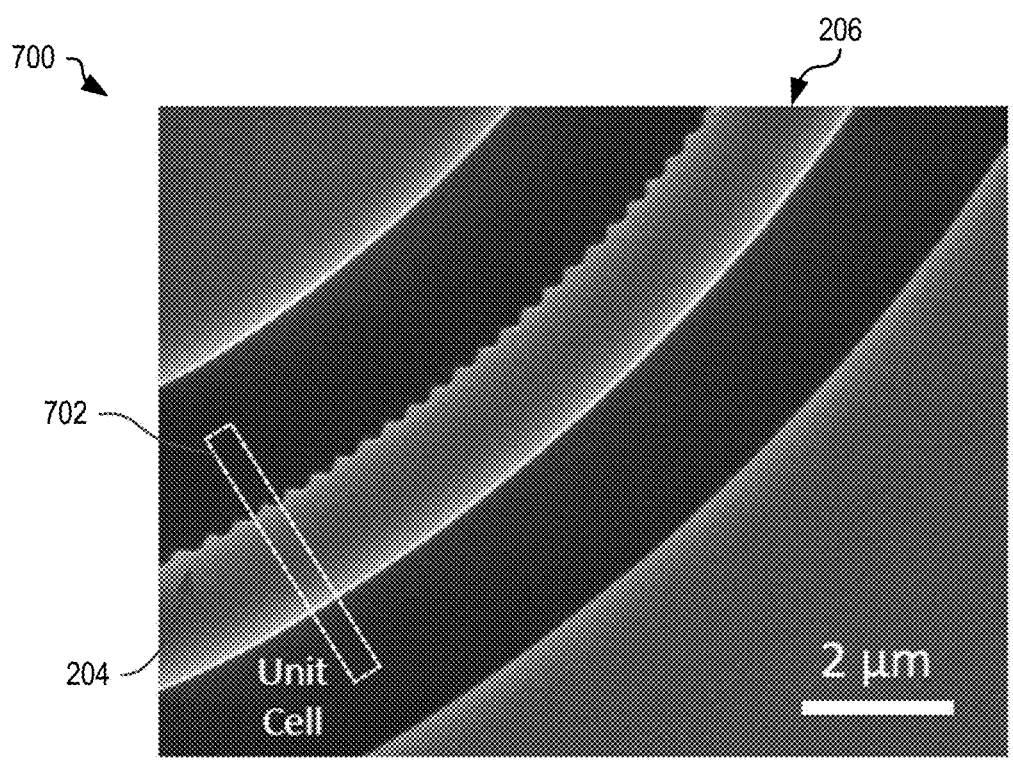
FIG. 7A is an electron microscope image illustrating nanopatterning on an inner radial wall of the ring of the PhCR of FIG. 2, in embodiments.
Figure 7B:
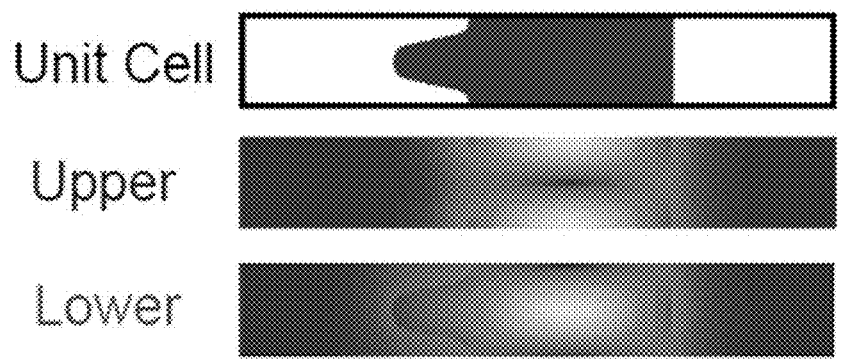
FIG. 7B is a schematic illustrating nanopatterning of a unit cell defined by a sinusoidal shape, characterized by the pattern periodicity and peak-to-peak amplitude $A_{PhC}$, in embodiments.

FIGS. 7A-12 show PhCR devices and experimental evidence for spontaneous soliton formation, according to the principles laid out above. FIG. 7A is an electron microscope image 500 illustrating nanopatterning 204 on inner radial wall 205 of ring 206 of PhCR 200 of FIG. 2. A unit cell 702 defines one period of nanopatterning 204. FIG. 7B is a schematic illustrating nanopatterning 204 of unit cell 702 defined by a sinusoidal shape, characterized by the pattern periodicity and peak-to-peak amplitude $A_{PhC}$. The periodicity enforces a photonic bandgap that necessarily overlaps one particular PhCR mode, denoted as the pump mode $\mu=0$, in the 1550-nm wavelength range, owing to an equal azimuthal mode number of pattern periods and optical-mode fringes. The bandgap lifts the degeneracy of counter-propagating light in the PhCR, creating modes shifted to higher and lower frequency by an amount $\epsilon_{PhC}$. Since nanopatterning 204 is edgeless—circumferentially uniform—high resonator Q is maintained. Properties of other PhCR modes ($\mu \neq 0$) with $\epsilon_{PhC} \approx 0$, including nonlinearity and GVD, are preserved under the geometric modification. In particular, the GVD sensitively depends on a thickness and width (RW) of the waveguide forming ring 206 of PhCR 200.

Figure 8:
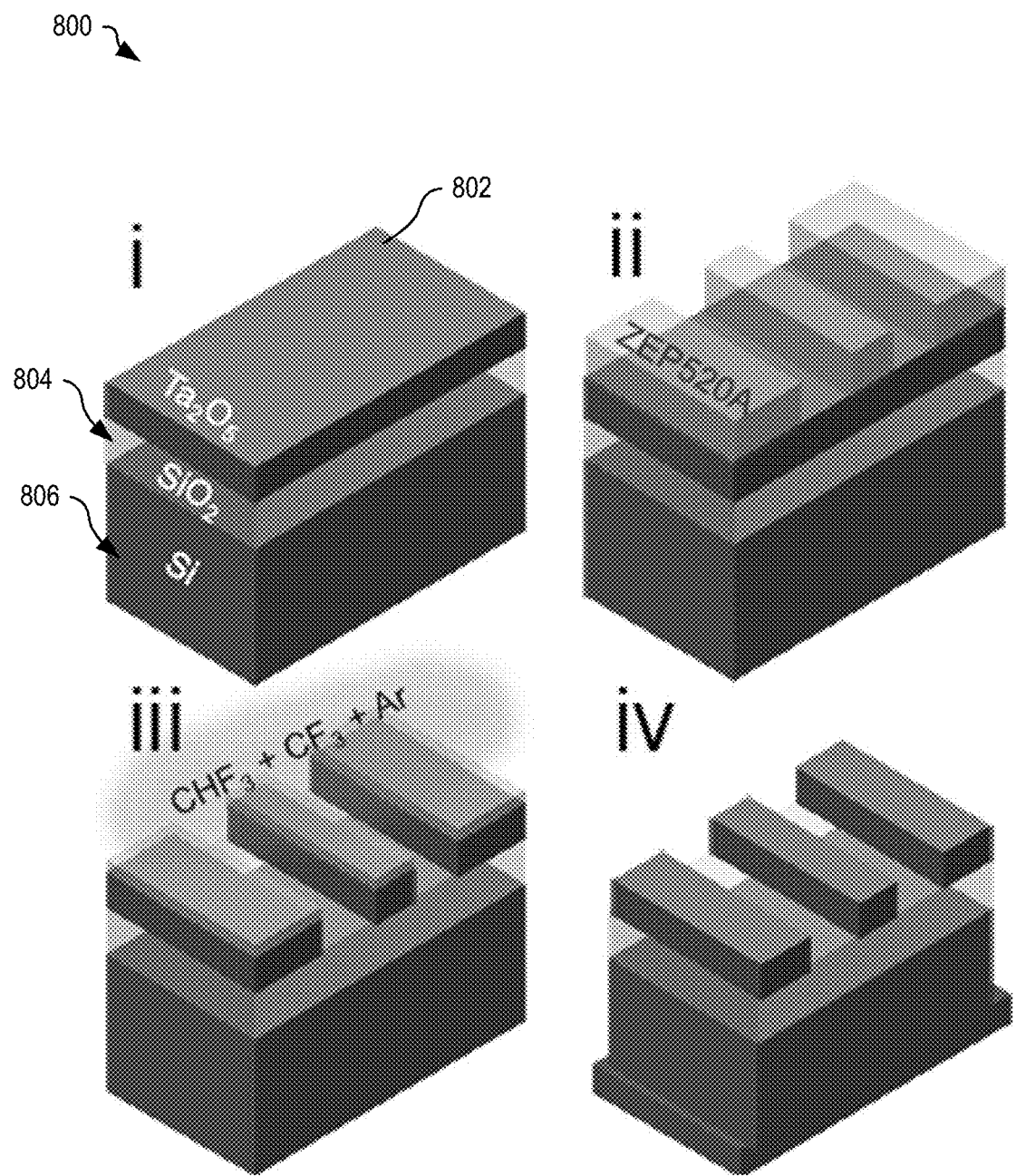
FIG. 8 is a schematic diagram illustrating example fabrication of the PhCR of FIG. 2, in embodiments.

FIG. 8 is a schematic diagram illustrating example fabrication of PhCR 200 of FIG. 2, in certain embodiments. PhCR 200 is fabricated from a 570-nm-thick tantalum pentoxide ($Ta_2O_5$, hereafter tantala) photonics layer 802, which is deposited on an oxidized ($SiO_2$ layer 804) silicon wafer 806. Electron-beam lithography is then used to define the photonics pattern (e.g., coupling waveguide 202, nanopatterned ring 206, and nanopatterning 204) for a wafer and is transferred to tantala layer 802 using fluorine reactive-ion etching. A final UV lithography process defines several chips on the wafer, and facets are dry-etched in the tantala layer 802 and oxide layer 804, and the silicon wafer 806. See details below in the section titled: Design and Fabrication. The example of FIG. 8 illustrates one layer of tantala deposited onto one layer of $SiO_2$. However, a stack of material may be formed by repeating the $SiO_2$ and tantala layers without departing from the scope hereof. That is, the stack may include multiple interleaved $SiO_2$ and tantala layers.

Figure 9:
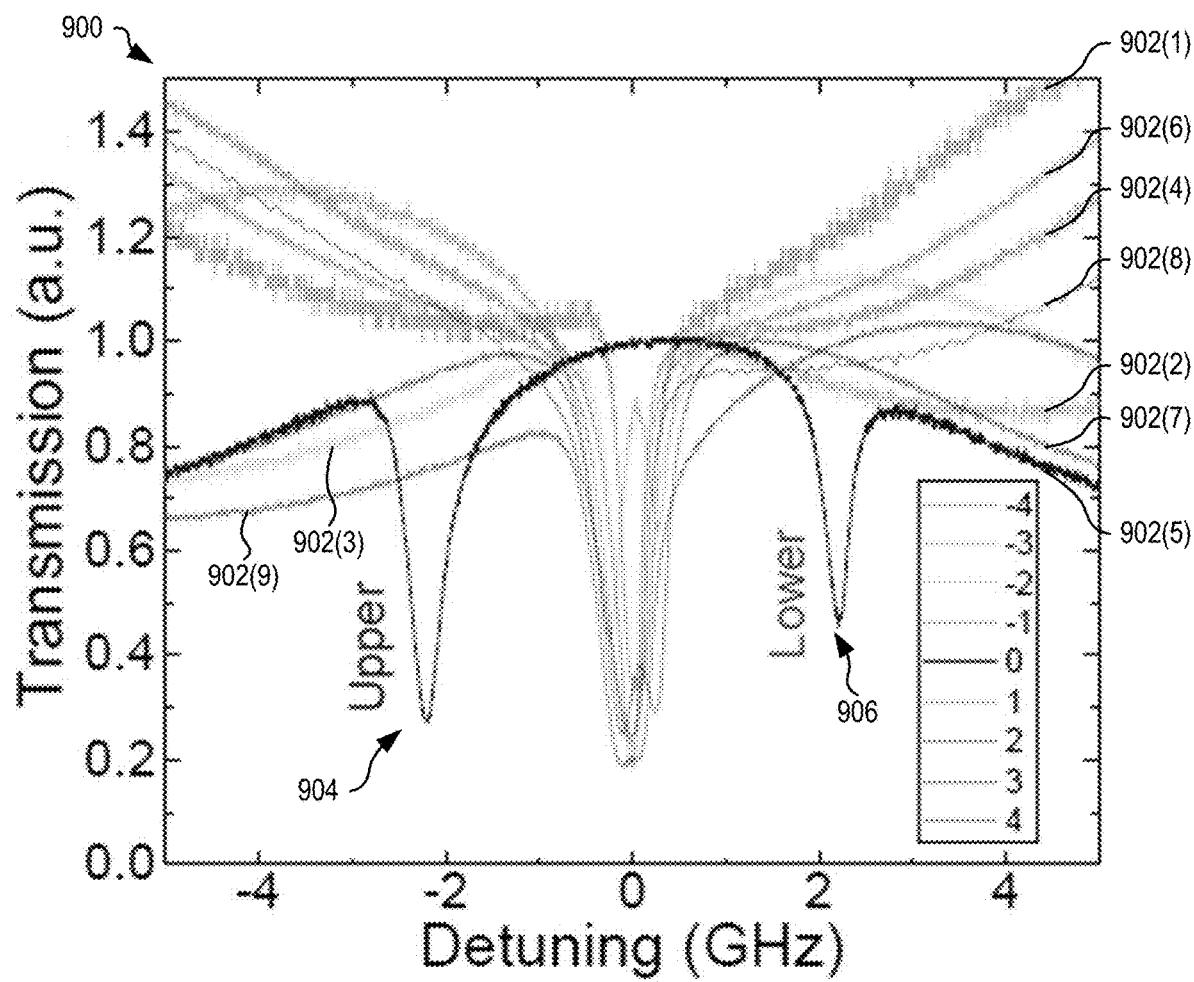
FIG. 9 is a graph illustrating several PhCR mode resonances that demonstrate a single mode frequency splitting, in embodiments.
Figure 10:
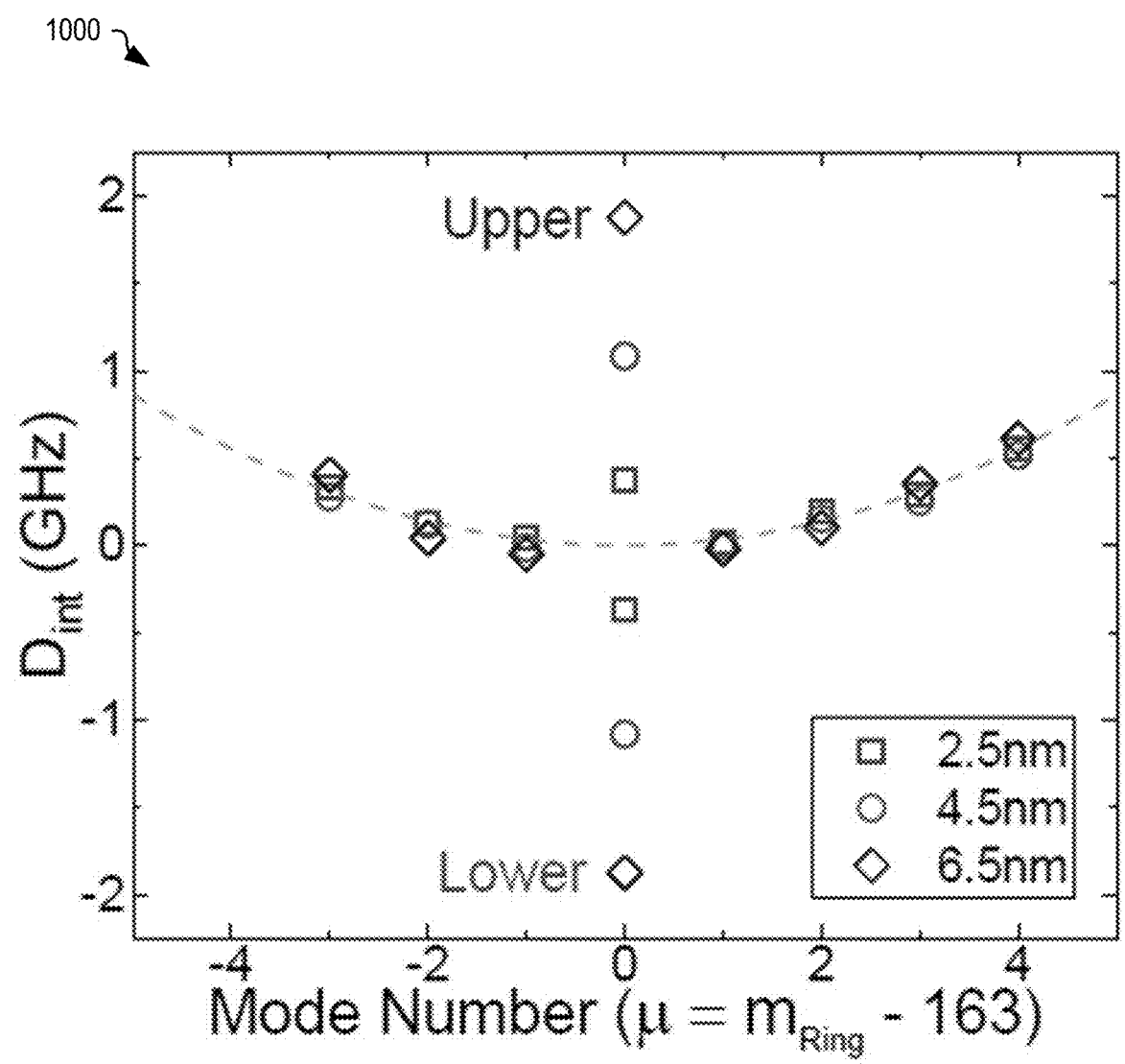
FIG. 10 is a graph illustrating that adjusting of the amplitude of the nanopattern of FIG. 2 through e-beam lithography, systematically varies $\epsilon_{PhC}$, in embodiments.

By experiment with PhCR 200, $\epsilon_{PhC}$ is characterized by spectroscopy measurements. Up to ~75 PhCRs are fabricated on a chip with a systematic, few-linewidth variation of $\epsilon_{PhC}$ and the waveguide-resonator coupling gap to optimize the conditions for spontaneous soliton formation. To measure $\epsilon_{PhC}$, light is coupled to and from the chip with a standard lensed-fiber system. Using a 1550-nm tunable laser as input, the transmission at the output is recorded by a photodetector. FIG. 9 is a graph 900 illustrating several PhCR mode resonances, indicated by lines 902 (1)-(9), in the 1550-nm band, with applied frequency offsets so the resonances coincide, that demonstrate a single mode frequency splitting. Non-degenerate modes are labelled as upper 904 and lower 906, with the latter at a setting of $\epsilon_{PhC}$ consistent with spontaneous soliton formation. Experiments have focused on gaps for near-critical coupling, and data of graph 900 indicates a loaded PhCR Q of ~400,000. FIG. 10 is a graph 1000 illustrating that adjusting of the amplitude of periodic nanopatterning 204 through e-beam lithography, systematically varies $\epsilon_{PhC}$. In the range of $A_{PhC}$ used in this work, the Q factors are unaffected, compared to conventional ring resonators (e.g., ring resonator 100, FIG. 1) fabricated on the same wafer. With periodic nanopattern 204 having an amplitude of only a few nm, $\epsilon_{PhC}$ is controlled for the $\mu=0$ mode, whereas the $\mu' \neq 0$ modes exhibit an anomalous GVD of $D_2 = 2\pi \cdot 69.0$ MHz/mode. The results confirm the chosen fabrication process provides the high device geometry resolution and low optical loss to build PhCRs to support the pulses.

Experiments were performed to find spontaneous soliton formation in a PhCR with $\epsilon_{PhC}=2.2$ by sweeping the frequency of the pump laser with ~36 mW of on-chip power.

Figure 11:
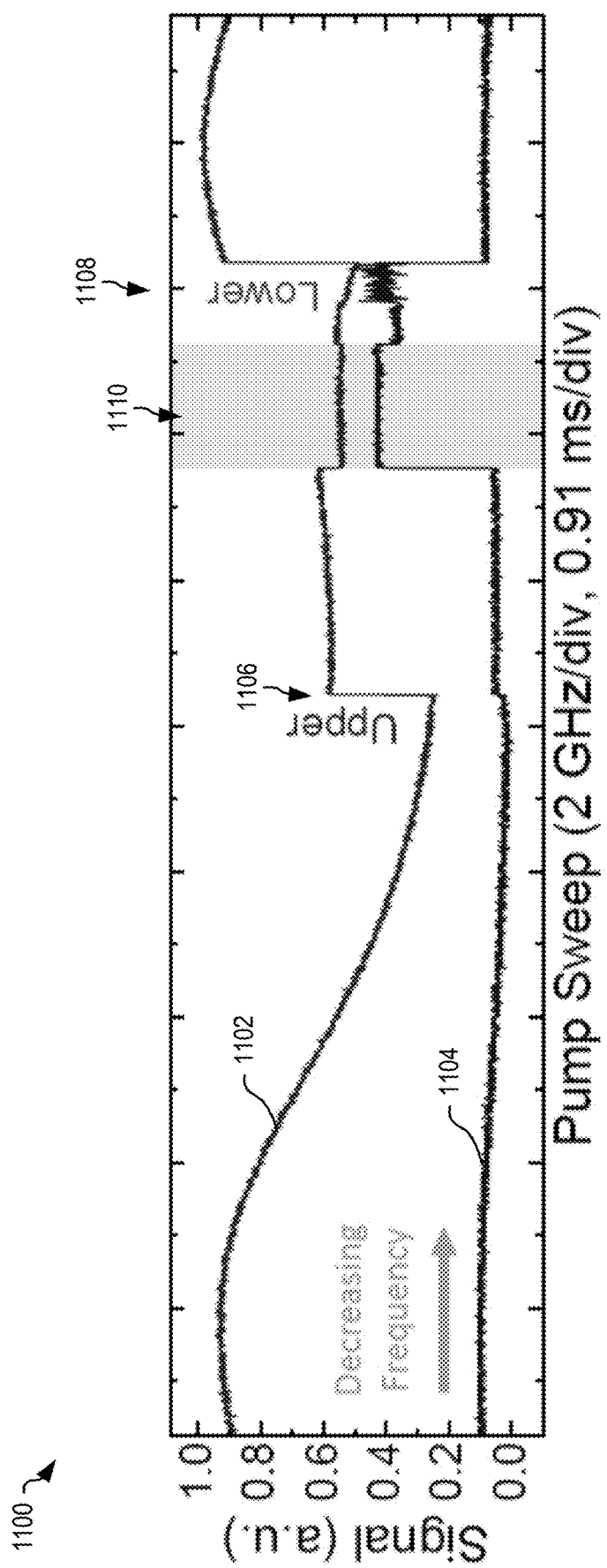
FIG. 11 is a graph showing a ~20 GHz sweep range from high to low frequency that spans the upper resonance and the lower resonance, in embodiments.

FIG. 11 is a graph 1100 showing a ~20 GHz sweep range from high to low frequency that spans the upper resonance 1106 and lower resonance 1108. Line 1102 (red trace) represents transmission through PhCR 200 and line 1104 (blue trace) represents the power of generated comb modes, which were obtained by filtering out the pump. This data shows the presence of thermal bistability effects, which distort the resonances into a triangle shape, and the effects of nonlinear comb generation. In particular, no comb power is observed at the upper resonance 1106, as the upper mode is shifted away from the $\mu'$ modes needed for FWM. Whereas at the lower resonance 1108, immediate comb formation is observed, corresponding to the step change in comb power that agrees with the simulation shown in FIG. 6. A nonlinear state on the lower resonance, indicated by the shaded range 1110 in FIG. 11, is a dissipative Kerr soliton that spontaneously forms under certain conditions of pump power and laser detuning. Additionally, a nonlinear state on the lower resonance that exhibits relatively higher comb power variance, likely a breather state 608 as indicated theoretically in FIG. 6. A breather state 610 at higher detuning than the stable state suggests a modified optical state phase diagram. Operationally, the pump power is adjusted to maximize the pump-frequency existence range of the low-noise spontaneous soliton step, and the laser frequency is adjusted into this range.

Figure 12:
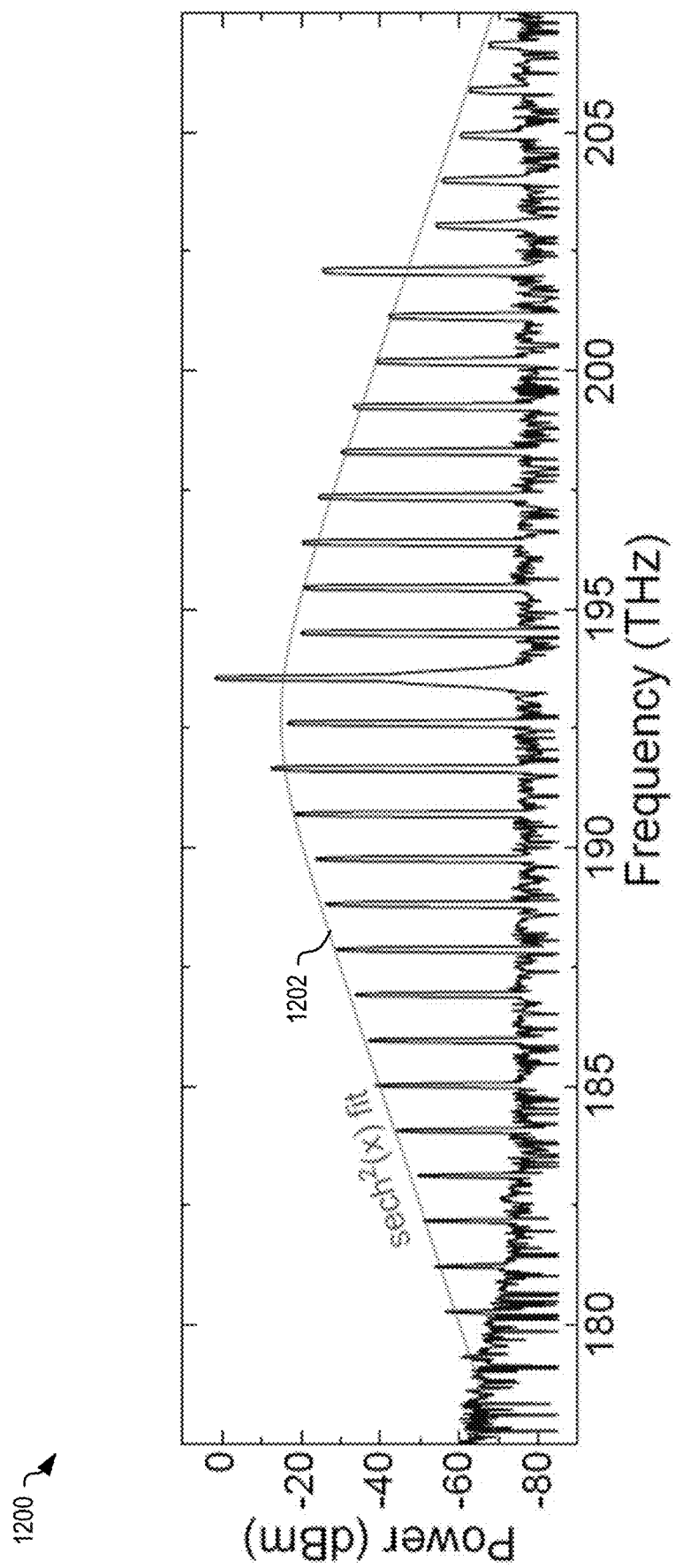
FIG. 12 is a graph illustrating the optical spectrum of the soliton comb, which exhibits a clear sech$^2$(v) profile, in embodiments.

FIG. 12 is a graph 1200 illustrating the optical spectrum of the soliton comb captured under these conditions, which exhibits a clear $\text{sech}^2(v)$ profile as shown by gray line 1202. The ease of spontaneous-soliton capture may be attributed to desirable thermal behaviors of PhCR 200. In conventional ring resonator 100, FIG. 1, capturing and sustaining a soliton is difficult as a result of rapid heating and cooling of the microresonator. Soliton initiation in ring resonator 100 under CW excitation is proceeded by Turing patterns or chaotic states, which are multiple-pulse states with high average intensity. Conversely, the desired soliton state is a single pulse with a relatively low average intensity. Hence, the root of thermal instability is the transition of nonlinear state in a microresonator. PhCR 200 spontaneous solitons offer two primary advantages: First, in soliton initiation, the high average intensity states are bypassed and their heating effects to the resonator are avoided. Second, the pump laser is kept on-resonance in the soliton state (note the drop in transmission trace in FIG. 11 as the pulse forms, indicating a more resonant condition), therefore minimizing changes to the in-resonator pump amplitude as the soliton forms.

Together, these factors minimize the intensity changes in the PhCR, allowing pulse capturing by hand-tuning alone.

Figure 13A:
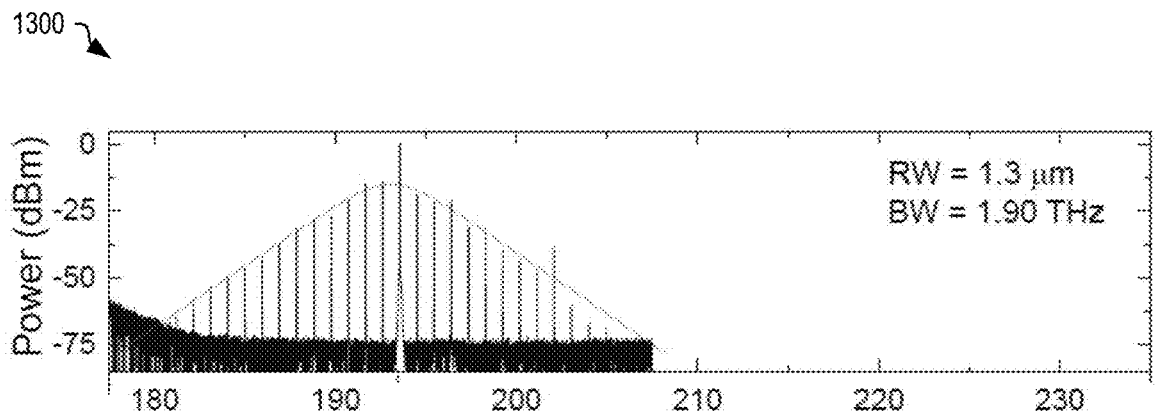
FIG. 13A plots optical spectra acquired from a first PhCR fabricated to have average RW=1.3 μm and where the pump was hand tuned to achieve the soliton state.
Figure 13B:
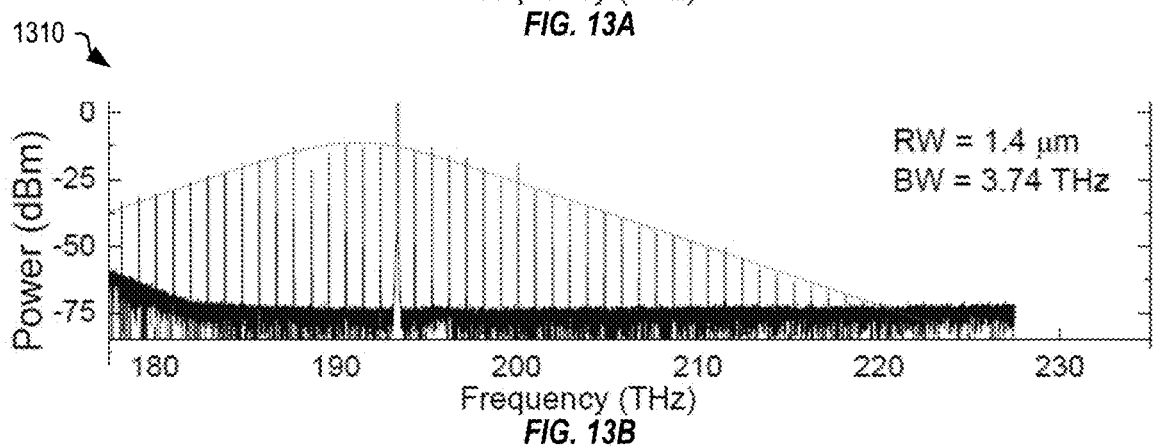
FIG. 13B plots optical spectra acquired from a second PhCR fabricated to have RW=1.4 μm and where the pump was hand tuned to achieve the soliton state.
Figure 13C:
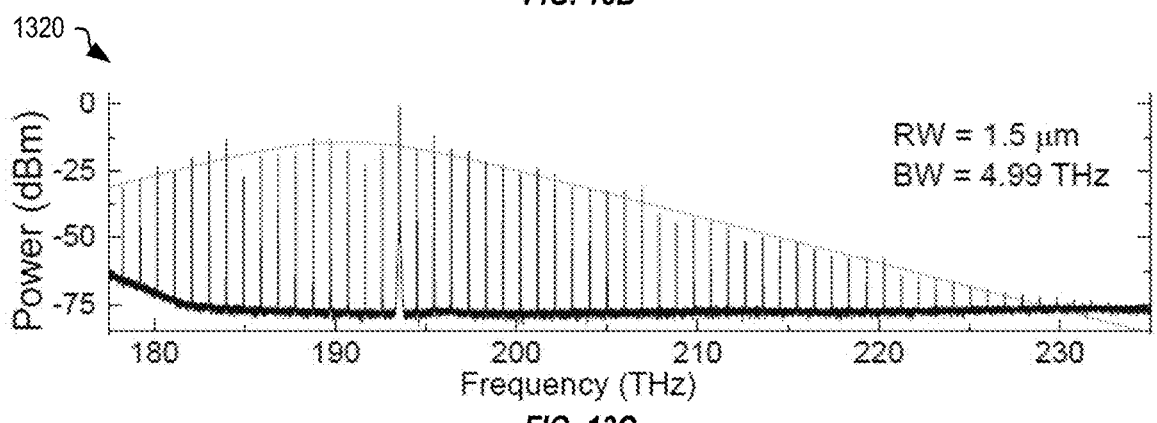
FIG. 13C plots optical spectra acquired from a third PhCR fabricated to have RW=1.5 μm and where the pump was hand tuned to achieve the soliton state.
Figure 13D:
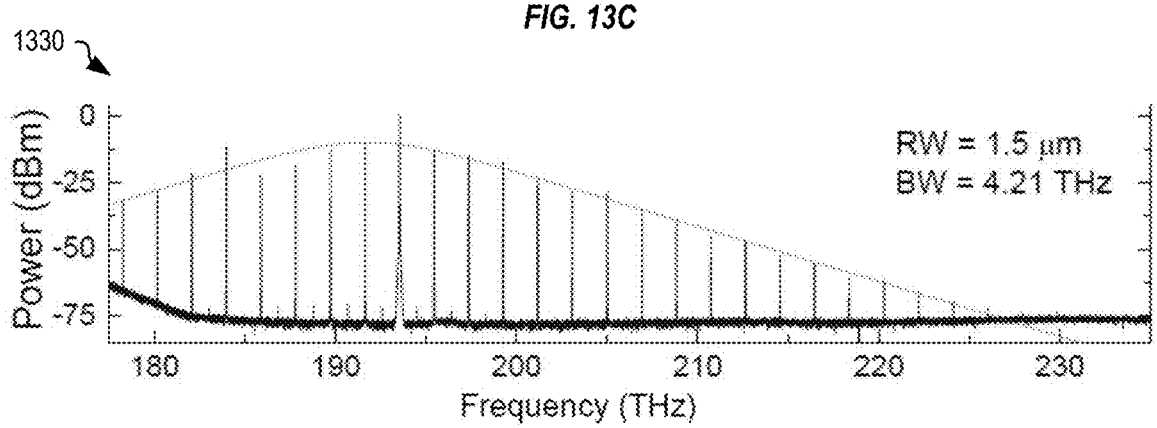
FIG. 13D plots optical spectra acquired from the second PhCR fabricated to have RW=1.4 μm and shows a stable two-pulse state at lower detuning.

The universality of spontaneous-soliton formation was explored by demonstrating soliton bandwidth control by tuning the GVD of PhCR 200 and the pump-laser power. GVD was directly controlled by varying the RW from 1.3 to 1.5 μm, providing decreasing anomalous GVD that is understandable from FEM calculation of the PhCR mode structure. Based on the LLE, this change should affect an increasing soliton bandwidth. FIG. 13A plots optical spectra 1300 acquired from a first PhCR 200 fabricated to have average RW=1.3 μm and where the pump was hand tuned to achieve the soliton state. FIG. 13B plots optical spectra 1310 acquired from a second PhCR 200 fabricated to have RW=1.4 μm and where the pump was hand tuned to achieve the soliton state. FIG. 13C plots optical spectra 1320 acquired from a third PhCR 200 fabricated to have RW=1.5 μm and where the pump was hand tuned to achieve the soliton state. Optical spectra 1300 has a bandwidth of 1.90 THz, optical spectra 1310 has a bandwidth of 3.74 THz, and optical spectra 1320 has a bandwidth of 4.99 THz. Accordingly, the spectrum bandwidth broadens with decreasing anomalous GVD as expected. FIG. 13D plots optical spectra 1310 acquired from second PhCR 200 fabricated to have RW=1.4 μm and shows a stable two-pulse state at lower detuning. The two-pulse state suggests that the parameter space of the PhCR—an interplay between dispersion and mode shift—supports more steady states beyond the single spontaneous pulse.

Figure 14:
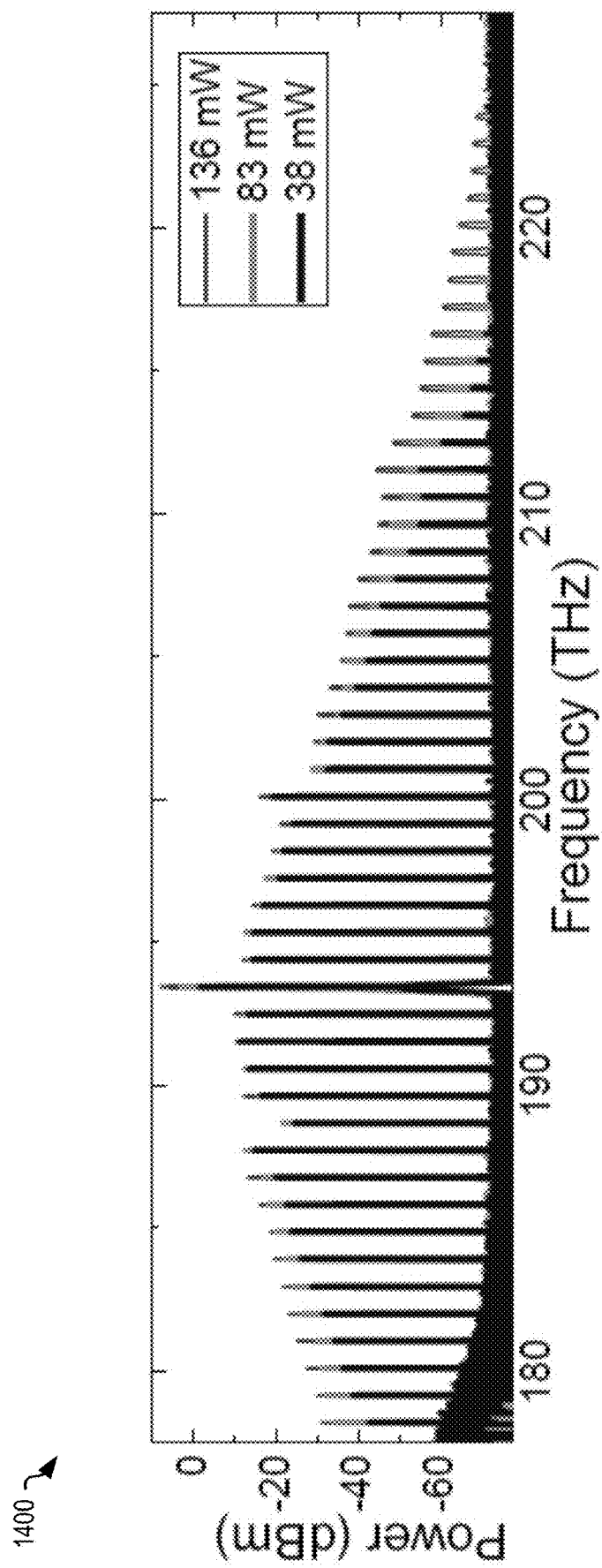
FIG. 14 plots optical spectra acquired from the second PhCR fabricated to have RW=1.4 μm where the pump laser power was varied, resulting in widening of the spectral envelope consistent with the DKS.

FIG. 14 plots optical spectra 1400 acquired from second PhCR 200 fabricated to have RW=1.4 μm where the pump laser power was varied, resulting in widening of the spectral envelope consistent with the DKS. However, unlike the conventional case where increasing pump power monotonically lengthens the soliton existence range, PhCR 200 produces strong breather states at high power.

Figure 15:
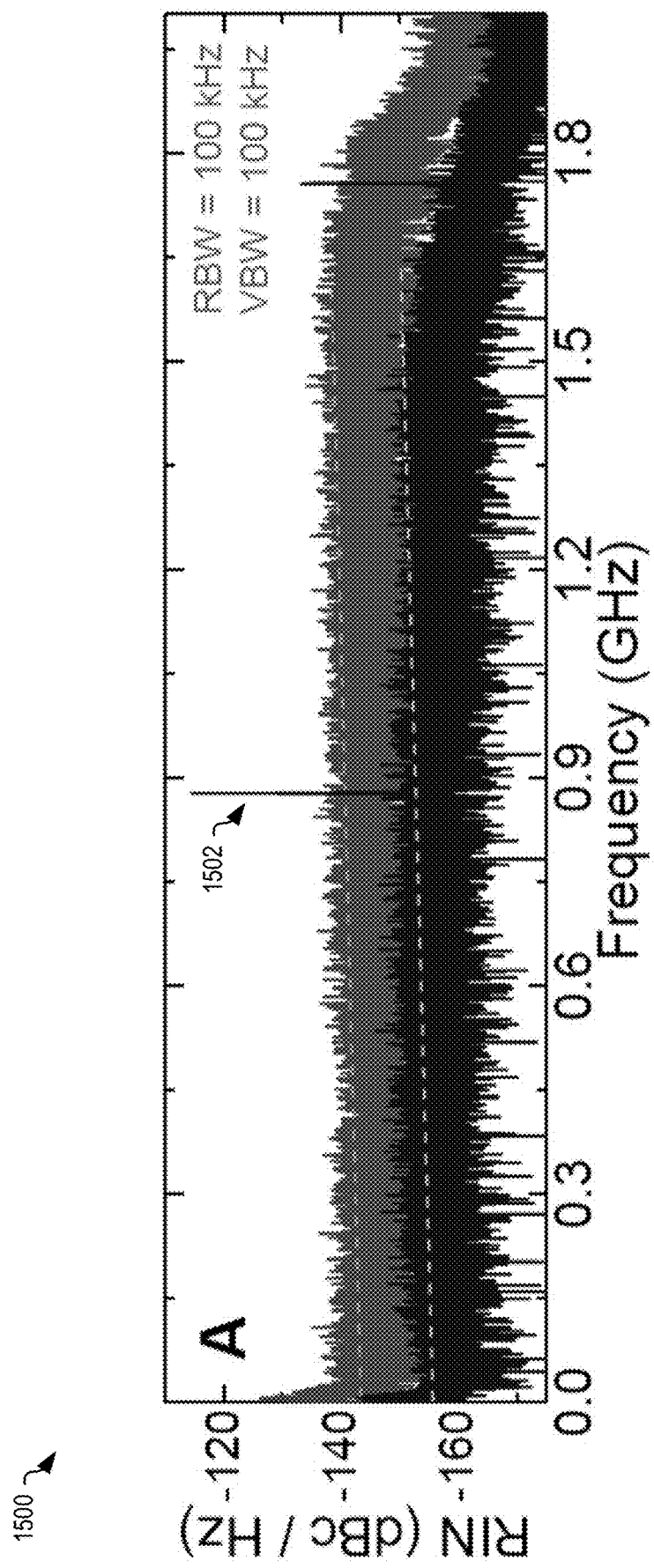
FIGS. 15-17 present intensity- and frequency-noise measurements, excluding the pump laser, of a spontaneous soliton generated by the PhCR of FIG. 2 fabricated to have RW=1.4 μm, $\epsilon_{PhC}$=3.0, in embodiments.
Figures 16A, 16B:
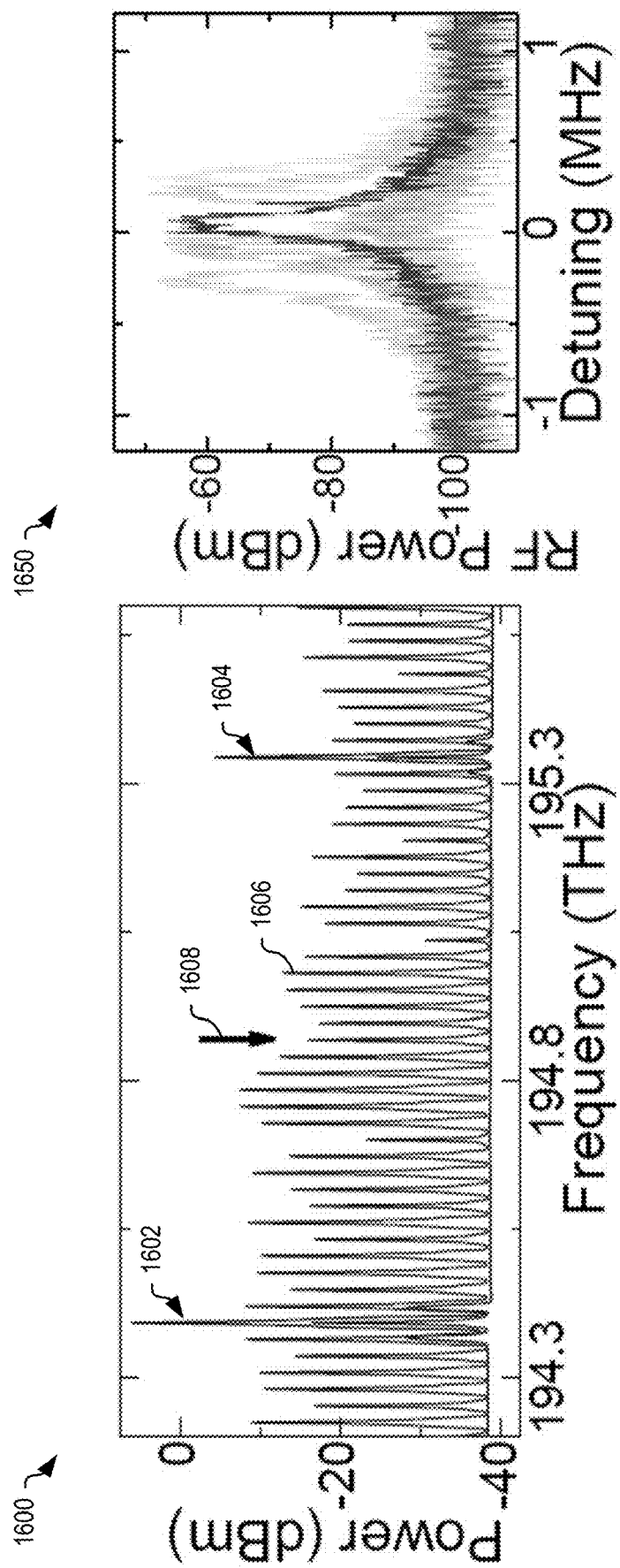
Figure 17:
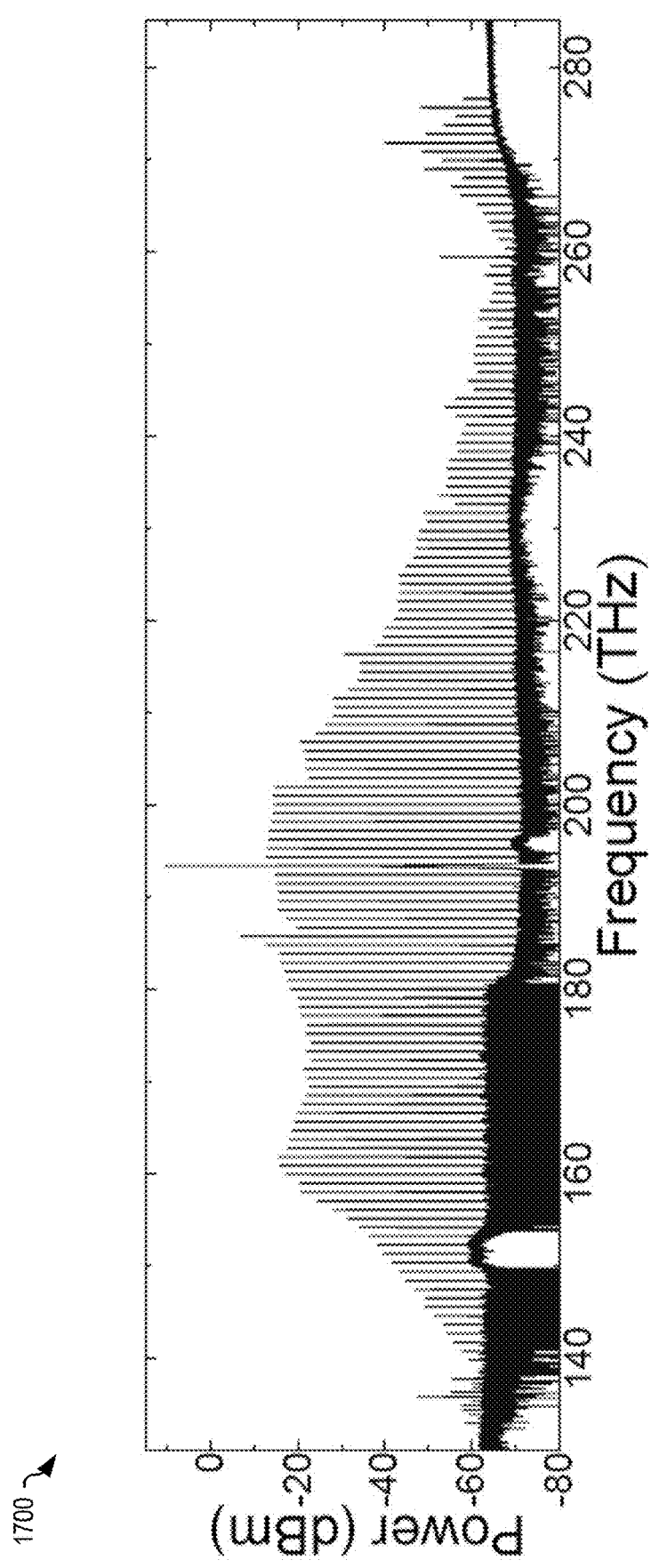

Stationary microresonator solitons output an optical pulse-train with fixed period, which composes a low-noise, equidistant frequency comb suitable for optical-frequency measurements. Therefore, verifying the spectral-noise properties of spontaneous solitons in PhCR is of utmost importance. FIGS. 15-17 present intensity—and frequency—noise measurements, excluding the pump laser, of a spontaneous soliton, generated by PhCR 200 fabricated to have RW=1.4 μm, $\epsilon_{PhC}$=3.0. FIG. 15 is a graph 1500 illustrating the relative intensity noise (RIN) of a stationary soliton and a breather soliton is below −140 dBc/Hz over a Fourier frequency range to 1.8 GHz. The photodetected soliton power is 282 W and the spur-free dynamic range is excellent, whereas the breather state manifests a single peak 1502 at 878 MHz and supports higher power and hence lower RIN. These measurements are currently limited by the comb power and the detector noise floor.

To measure the ~1 THz PhCR soliton repetition frequency, electro-optic (EO) phase modulation is applied to create a low-frequency heterodyne beat between two soliton comb modes. FIG. 16A is a graph 1600 illustrating an optical spectrum trace where soliton modes 1602 and 1604 (in blue) and the EO sidebands indicated by line 1606 (in red). The EO drive frequency is selected such that the ±17$^{th}$ order sidebands (indicated by arrow 1608 in FIG. 16A) generate an optical heterodyne on a photodetector, after filtering out that pair (e.g., soliton modes 1602 and 1604). The tone thus generated is identified as the heterodyne, as it varies with the EO drive frequency at 34.2 MHz/MHz in agreement with the sideband orders. FIG. 16B is a graph 1650 illustrating the heterodyne spectrum, which shows the typical lineshape with ~50 kHz linewidth and <1 MHz fluctuations. These properties are attributed to thermal noise and thermal drift of the microresonator. FIG. 17 is a graph illustrating a spontaneous DKS with near-octave bandwidth generated by PhCR 200 with optimized dispersion. The $F^2$ value for this trace is estimated to be 8.7, normalized to threshold power of μ=±1 modes. It is anticipated that these optimized devices to enable f-2f self-referencing.

Materials and Methods

Figure 18:
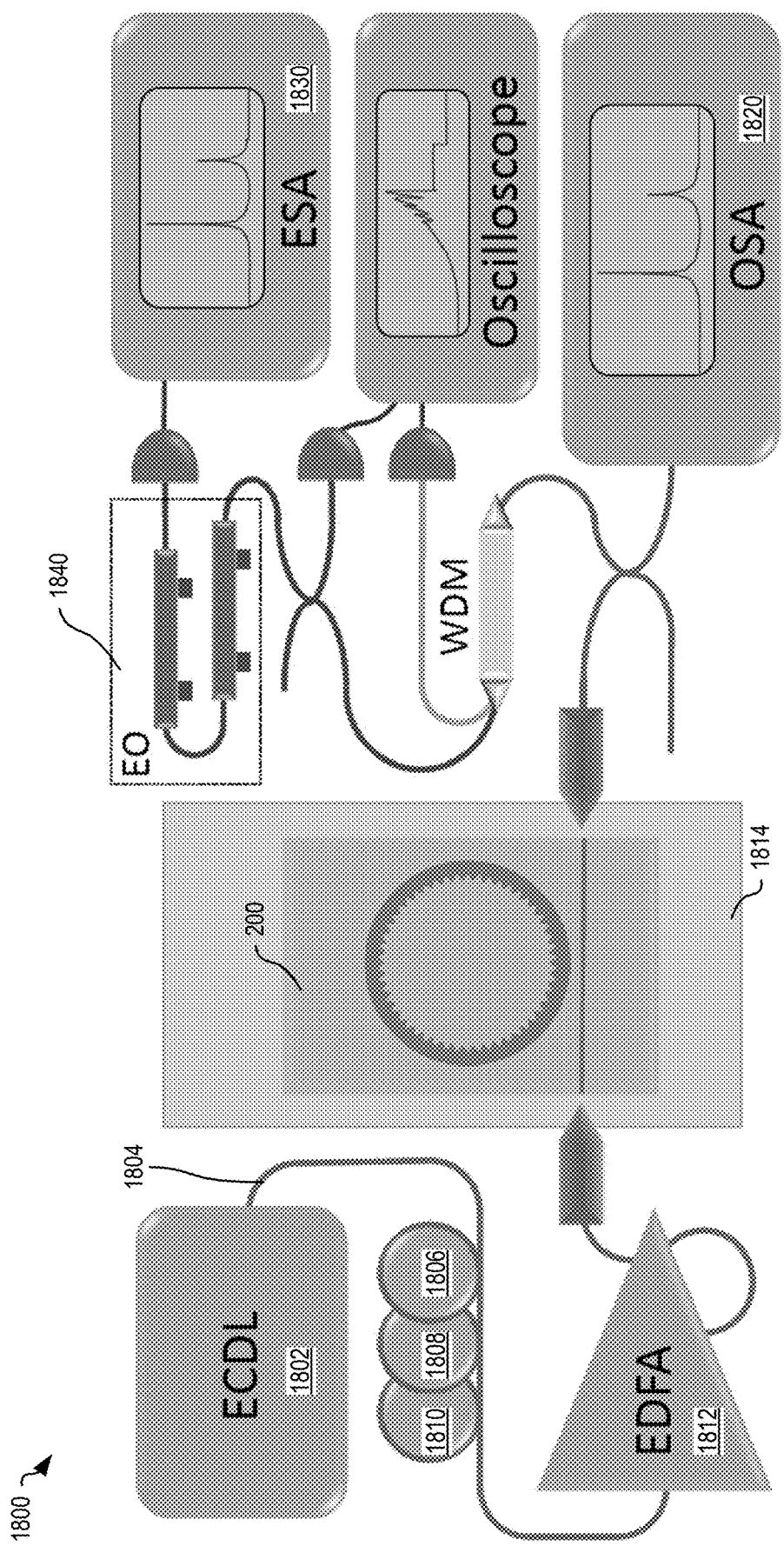
FIG. 18 is a schematic diagram illustrating one example optical system used to evaluate the PhCR of FIG. 2, in embodiments.

FIG. 18 is a schematic diagram illustrating one example optical system 1800 used to evaluate PhCR 200 of FIG. 2. Optical system 1800 includes a light source 1802 (e.g., a C-band tunable external-cavity diode laser (ECDL)) with fiber-coupled output 1804. The light goes through a fiber isolator 1806 and then to a set of fiber polarization controllers 1808. A 90% fused fiber coupler is added between the laser and the polarization controller to tap the laser light for a Mach-Zehnder interferometer and a wavelength meter (wavemeter, 40 MHz resolution) for frequency measurements. We use the wavemeter to precisely measure modes frequencies within a tuning range of light source 1802 (e.g., ECDL), enabling characterization of the dispersion of PhCR 200. For comb generation experiments, the laser is amplified using an erbium-doped fiber amplifier (EDFA) 1812, with a tunable band-pass filter to suppress the amplified spontaneous emission of the EDFA for cleaner spectra. For passive measurements, EDFA 1812 and the filter are bypassed. The light is sent into PhCR 200 using a lens fiber mounted on a three-axis flexure stage, controlled by manual micrometers. The damage threshold of PhCR 200 is typically above 1 W incident power. The typical coupling efficiency between fiber and chip is ~25% per facet, limited by the mode mismatch between the air-clad waveguides and lens fibers. PhCR 200 is placed on a copper block 1814 for thermal contact. The output is collected with another lens fiber on translation stage. For passive measurements, the outcoming power is measured using an amplified photodetector, plotting the transmission versus frequency on an oscilloscope.

During the comb generation experiments, we continuously monitor a portion of the outcoupled light was continuously monitored using an optical spectrum analyzer (OSA) 1820. Photodetectors having a 150 MHz bandwidth were used to monitor the pump-laser transmission of the resonator and the comb power, which is obtained by filter out the pump contribution. The comb power signal provides critical information on breakup of the flat background and soliton initiation, and for monitoring the intensity-noise level of soliton states. To diagnose breather soliton oscillations and perform intensity-noise measurements, a high-speed photodetector (1.6 GHz bandwidth) and an electronic spectrum analyzer (ESA) 1830.

The comb-power channel, after filtering out the pump, is also used for the beatnote measurements. The comb light is passed through two cascaded EO phase modulators 1840, driven far above $V_\pi$ to introduce multiple sidebands to span the 1 THz frequency spacing between the comb lines, shown in FIG. 16A. The EO modulation frequency is chosen to be 28.000 GHz so the ±17$^{th}$ sidebands from adjacent comb lines are in close vicinity. To improve the signal to noise ratio for the beatnote measurements, the EO output is amplified with a semiconductor optical amplifier and the overlapping modes are selected using a tunable optical filter with a 50 GHz passband.

Design and Fabrication

To evaluate and understand performance of PhCR 200, a plurality of PhCR 200 having varying characteristics and designed and fabricated on a chip, which is then evaluated using optical system 1800 of FIG. 18. The dispersion and photonic bandgap of ring resonator 100 is calculated using a finite-element method program. The dispersion calculation yields the propagation constant $k_{eff}$ for each RW, ring radius R, and frequency of each of the plurality of PhCR 200 on the chip. The azimuthal mode order m of the PhC is then calculated by the boundary condition $k_{eff} \cdot 2\pi R = 2m\pi$. The PhCR modulation (e.g., periodic nanopatterning 204, FIG. 2) is then introduced with the periodicity $2\pi R/2m$ and sinusoidal peak-to-peak amplitude $A_{PhC}$ on inner radial wall 205 of ring 206. The sinusoidal shape is chosen as it can be fabricated reliably to very small amplitude using lithography and plasma etching. A bus waveguide (e.g., waveguide 202) is tangential to the smooth outer radial wall 212 of the resonators (e.g., nanopatterned rings 206). The strength of the evanescent coupling between the resonator and the bus is controlled by the gap between waveguide 202 and outer radial wall 212. On the edges of the chips where the bus waveguides terminate, the waveguides are inversely tapered to improve mode-matching to lens fibers. The mask files are generated using a pattern-defining script and the CNST Nanolithography Toolbox. Typically, up to 70 PhCRs and their bus waveguides are fabricated on each chip in an evenly spaced array, where each PhCR on the chip are also varied based on fine sweeps of $A_{PhC}$ and coupling gap to achieve the correct mode shifts and near-critical coupling.

The chip fabrication procedure is as follows: 3-inch silicon wafers with 380 µm thickness and 3 µm thermal silicon dioxide on both sides are obtained. The tantala device layer is deposited onto the wafer to 570 nm thickness by an external supplier. For lithography, a double spin-coating of ZEP520A resist to reach a total resist thickness of 1 µm is carried out, then the resist is exposed in electron beam lithography (EBL) operating at 100 kV. All device patterns are defined on this EBL step. The resist is developed, and the pattern is transferred using plasma etching with an inductively coupled plasma etching tool, and a $CHF_3+CF_4+Ar$ chemistry. The ratio between $CHF_3$ and $CF_4$ is varied to achieve vertical sidewall, and the Ar gas was used to improve sidewall smoothness. The etch selectivity is sufficient to clear the device layer with the resist thickness used. A dicing pattern is put onto the wafer using UV lithography and the SPR-220 photoresist. The bottom thermal oxide layer is etched using a plasma etch with $CHF_3+O_2$ chemistry. The resist is stripped using solvents, and the UV lithography step is repeated for the deep-RIE dicing using the $C_4F_8+SF_6$ chemistry. The wafer is cleaned of the fluoropolymer deposited during the RIE steps using DuPont EKC265 solvent, followed by a Cyantek Nanostrip soak for final cleaning. The chips are then mechanically removed from the wafer and are ready for testing.

Derivation of Modified LLE

To accommodate the influences of the shifted pump mode, a modified LLE is provided. Importantly, the form of the modified LLE admits the steady-state solutions of the LLE, with an effective pump field reflecting the influence of the shifted mode. Starting with the LLE in the modal basis, $$\partial_\tau a_\mu = -(1+i\alpha)a_\mu + \frac{i}{2}\beta\mu^2 a_\mu + \delta_{\mu 0}F + \hat{\mathcal{F}}\{i|\psi(\theta)|^2\psi(\theta)\} \tag{1}$$

where $a_\mu$ is the field amplitude in mode µ, $$\beta = -\frac{2}{\kappa}D_2$$

stands for the second-order dispersion normalized to linewidth κ, $\delta_{\mu 0}$ the Kronecker delta function $\delta_{00}=1$, zero otherwise, and $\hat{\mathcal{F}}$ the Fourier transform. The equation is generalized to arbitrary dispersion profiles by identifying $$\frac{i}{2}\beta\mu^2 = -\frac{2i}{\kappa} \cdot \frac{1}{2}D_2\mu^2 \text{ to be } -\frac{2i}{\kappa}D_{int}(\mu),$$

where $D_{int}(\mu)$ is the integrated dispersion. The pump mode shift is implemented with an additional term to the total dispersion:

$$D_{int}^{Shifted}(\mu) = D_{int}^{Base}(\mu) + \Xi(1-\delta_{\mu 0}) \tag{2}$$

where a constant shift of strength Ξ is applied to all modes except zero, so that the zero of detuning α remains defined on the pump mode. A red-shift of the pump mode is associated with $\Xi > 0$. The equation becomes:

$$\partial_\tau a_\mu = -(1+i\alpha)a_\mu + \delta_{\mu 0}F + \hat{\mathcal{F}}\{i|\psi(\theta)|^2\psi(\theta)\} \tag{3}$$
$$-\frac{2i}{\kappa}(D_{int}^{Base}(\mu) + \Xi(1-\delta_{\mu 0}))a_\mu$$

inverse Fourier transform is carried out, under the normalization that $\hat{\mathcal{F}}^{-1}(\delta_{\mu 0})=1$, and that $$\hat{\mathcal{F}}^{-1}(\delta_{\mu 0} \cdot a_\mu) = \frac{1}{2\pi}\oint \psi(\theta)d\theta := \bar{\psi},$$

to get the pump-shifted LLE in the time domain:

$$\partial_\tau \psi(\theta) = -(1+i(\alpha+\epsilon))\psi(\theta) - \frac{i}{2}\beta\partial_\theta^2\psi(\theta) \tag{4}$$
$$+i|\psi(\theta)|^2\psi(\theta) + F + i\epsilon\bar{\psi}$$

where $$\epsilon = \frac{2\Xi}{\kappa}$$

is the normalized mode shift. Two observations are made from the shifted LLE formula: First, in the case of an amplitude that is a constant in θ, $\bar{\psi}=\psi$ and the shift terms cancel, indicating that the resonator responses identically to the unmodified LLE prior to pattern generation. Second, assuming a time-stationary pattern ψ is formed, the $\bar{\psi}$ term is constant in the resonator, and the equation may be interpreted as an LLE with modified parameters $$\alpha' = \alpha + \epsilon \text{ and } F' = |F + i\epsilon\bar{\psi}|. \tag{5}$$

This is to say any stationary-state solutions ψ of the modified LLE with parameters F, α also satisfies the LLE with parameters F', α', the later include Turing patterns and Kerr solitons. This equivalence enables the pump-shifted LLE to produce Kerr solitons.

Kerr Shift Calculation

The following presents an interpretation of the Kerr shift term in the modal basis. Under this interpretation, each of the resonator mode μ behaves as a nonlinear harmonic resonator, therefore giving physical meanings to the hot-resonator modes in the main text. In the case of a single-mode nonlinear oscillator:

$$\partial_t a = -i\omega' a - \gamma_0 a + F e^{i\omega t} \quad (6)$$

where the resonance frequency $\omega'=\omega_0-g|a|^2$ depends on the field amplitude $|a|^2$ through nonlinear coefficient g. This cubic term is identified as the Kerr term $ig|a|^2 a$ which results from the resonance frequency change induced by the field amplitude. In the case of the LLE, starting with the Kerr term instead and assigning an inferred modal frequency for each field component aμ by casting the time-evolution of the mode in the form of a harmonic oscillator:

$$\partial_\tau a_\mu = -i\alpha a_\mu + i\delta_\mu \cdot a_\mu + g_\mu \cdot a_\mu + \delta_{\mu 0} F \quad (7)$$

where the detuning α was chosen so the pump field F is not time-dependent in the rotating frame, and $\delta_\mu$ and $g_\mu$ can depend on the in-resonator field profile. This form enables the modal frequency and gain from the instantaneous rate of change of the phase and amplitude induced by the Kerr effect to be identified. These rates are calculated by Fourier transforming the Kerr term $|\psi|^2\psi$ for a given field profile ψ(θ):

$$\partial_\tau a_\mu|_{Kerr} = \hat{\mathcal{F}}\{i|\psi(\theta)|^2\psi(\theta)\}_{,\mu} \quad (8)$$

where the subscript μ for the Fourier transform specifies the μ-th component. Casting this into the harmonic oscillator form, gives:

$$\delta_\mu^{Kerr} = \mathrm{Re}(\hat{\mathcal{F}}\{|\psi(\theta)|^2\psi(\theta)\}_{,\mu}/a_\mu) \quad (9)$$

$$g_\mu^{Kerr} = -\mathrm{Im}(\hat{\mathcal{F}}\{|\psi(\theta)|^2\psi(\theta)\}_{,\mu}/a_\mu) \quad (10)$$

where $\delta_\mu^{Kerr}$ and $g_\mu^{Kerr}$ are the modal Kerr shift and induced gain on mode μ.

An example for this formula is the modal frequency behavior near the Turing pattern onset threshold. In order to extract the frequency of the modes, the modal fields in the resonator are assumed to take the form:

$$\psi(\theta) = a_0 + \eta \cdot u_{\mu'}(\theta) \quad (11)$$

where $a_0$ is the pump mode amplitude, a constant in the resonator, and $a_{\mu'}=\eta$ an infinitesimal field amplitude in the μ'-th mode, $u_{\mu'}(\theta)=\exp(i\mu'\theta)$ is the basis function in the μ'-th mode. To obtain the pump mode shift, the Kerr shift term $|\psi|^2\psi$ to zeroth order in η is evaluated. Since $a_0$ is a constant over θ, the form trivially gives:

$$\delta_0^{Kerr} = \mathrm{Re}(\mathcal{F}\{|a_0|^2 a_0\}_{,0}/a_0) = |a_0|^2 \quad (12)$$

which is just the pump mode intensity. To get the shift for the μ'-th mode, the Kerr shift term is evaluated to first order in η:

$$|\psi|^2\psi = (|a_0|^2 + \eta \cdot (a_0 u_{\mu'}^* + a_0^* u_{\mu'}) + O(\eta^2)) \cdot (a_0 + \eta u_{\mu'}) = \quad (13)$$
$$|a_0|^2 a_0 + 2|a_0|^2 \cdot \eta u_{\mu'} + a_0^2 \cdot \eta u_{\mu'}^* + O(\eta^2)$$

where $u_{\mu'}^* = u_{-\mu'}$. Fourier transforming this expression and taking the μ'-th component, only the term with $u_{\mu'}$ is non-vanishing. This gives:

$$\delta_{\mu'}^{Kerr} = \mathrm{Re}(2|a_0|^2 \cdot \eta/\eta) = 2|a_0|^2 \quad (14)$$

which is twice the shift compared to the pump mode, in agreement to the form in.

These theoretical tools allow study of the Kerr balancing for the soliton states. The soliton field profile is generated using the LLE for sets of parameters (F, α, ε), then the dispersion balancing conditions are calculated for each mode, namely $-D_{int}(\mu)+\delta_\mu$. The term equals α for all non-pump modes, while the gain terms equal 1 to balance loss. The balancing effect enables a stationary, time-independent waveform in the reference frame of the LLE. In the case ε=0, the balance is not achieved for the pump mode, but the mismatch is compensated by the pump field F in a manner similar to the forced harmonic oscillator. To study the Kerr mismatch in response to the shifted pump mode, LLE simulations are carried out to obtain the field profiles of the stable pulse states in a resonator for some ε>0, and the Kerr shifts are calculated for each mode.

Figure 19A:
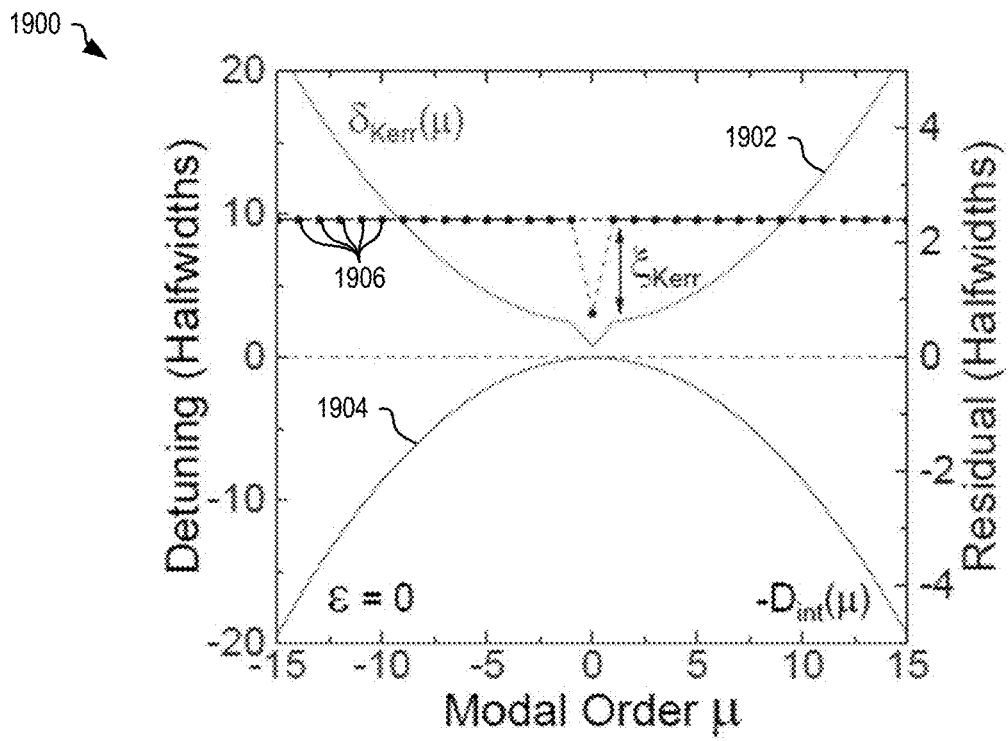
FIG. 19A is a graph illustrating Kerr shift and $D_{int}$ plots for $\epsilon$=0, in embodiments.
Figure 19B:
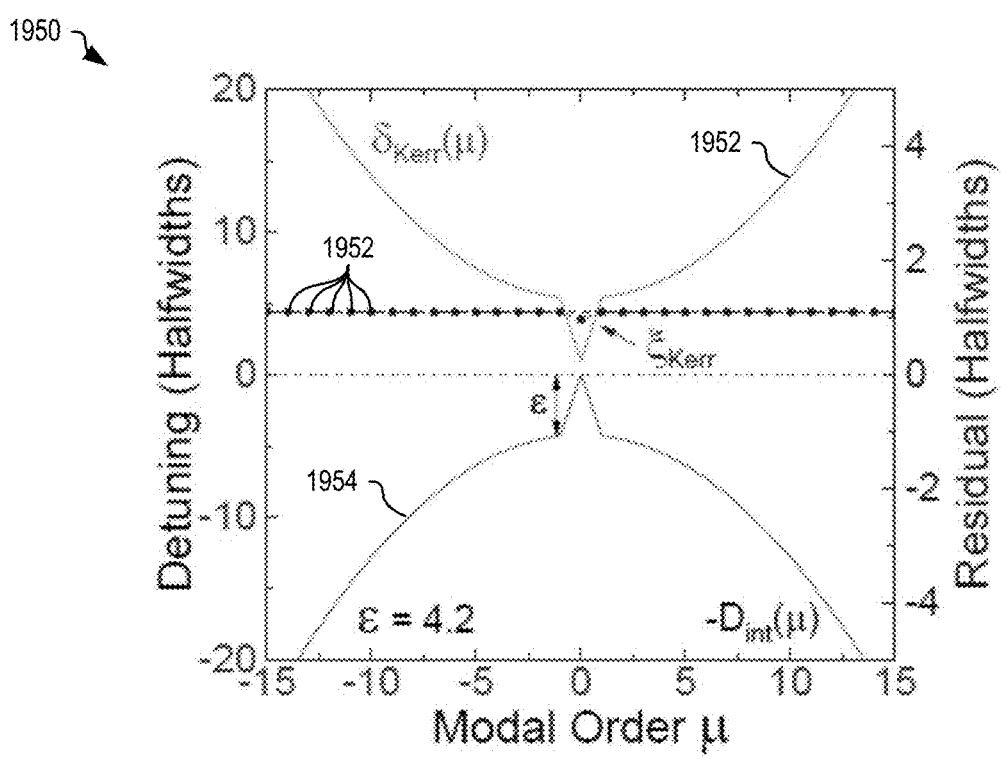
FIG. 19B is a graph illustrating Kerr shift and $D_{int}$ plots for $\epsilon$=4.2, in embodiments.

FIG. 19A is a graph 1900 illustrating Kerr shift 1902 and $D_{int}$ 1904 plots for ε=0. FIG. 19B is a graph 1950 illustrating Kerr shift 1952 and $D_{int}$ 1954 plots for ε=4.2. In FIG. 19A, dots 1906 (blue) show a sum of Kerr shift 1902 and $D_{int}$ 1904, balancing to the horizontal lines at the value of α, except for the pump mode. In FIG. 19B, dots 1956 (blue) show a sum of Kerr shift 1952 and $D_{int}$ 1954, balancing to the horizontal lines at the value of α, except for the pump mode. A pronounced Kerr mismatch $\xi_{Kerr}$ is observed for the ε=0 case of FIG. 19A but is suppressed in the ε=4.2 case of FIG. 19B.

Figure 20:
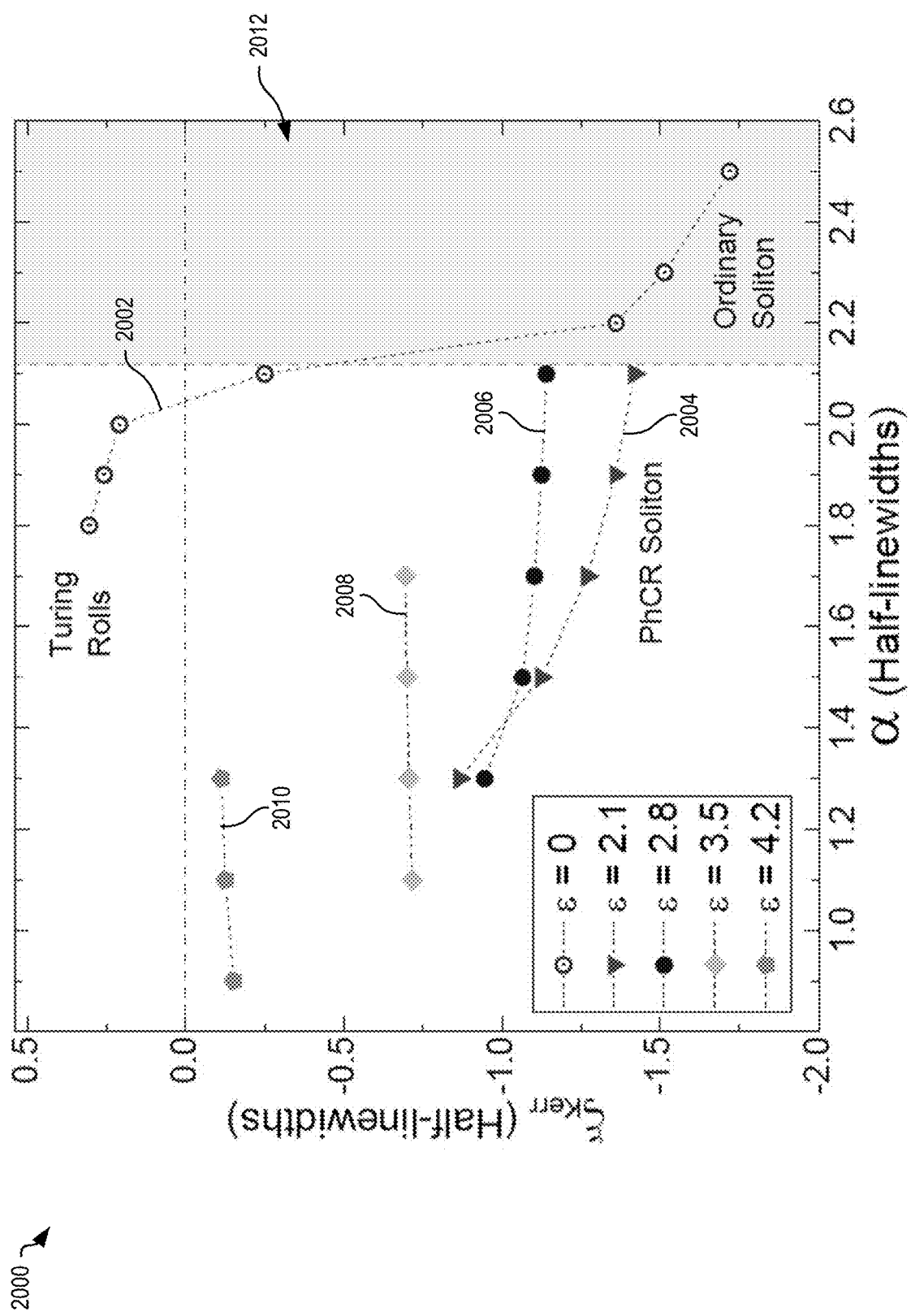
FIG. 20 is a graph illustrating $\xi_{Kerr}$ for calculations of intermediate values of $\epsilon$, in embodiments.

FIG. 20 is a graph 2000 illustrating $\xi_{Kerr}$ for calculations of intermediate values ε=0 of line 2002, ε=2.1 of line 2004, ε=2.8 of line 2006, ε=3.5 of line 2008, and ε=4.2 of line 2010. The increasing of ε results in a gradual reduction of mismatch $\xi_{Kerr}$, down to approximately one quarter of a linewidth for ε=4.2 of line 2010. Lines 2004, 2006, 2008, and 2010 are plotted for α ranges where the soliton state is stable for that ε. It is observed that the soliton is stable in detuning ranges in the single-stability range for the given F value for the shifted-pump cases, while in the ε=0 case of line 2002, the soliton is only stable in the bistability range (shaded area 2012 in FIG. 20). This leads to the difference that the flat state is stable on the lower branch of the bistability in the ϵ=0 case, versus the spontaneous generation of patterns from the flat state in the shifted-pump case. Initiating the ϵ=0 case with a pulse in the single-stability range results in the mode reverting spontaneously to multiple-pulse Turing patterns. This suggests that the mode shift modifies the phase diagram to enable stable soliton states in ranges where the flat background amplitude is unstable.

Pulse Formation Dynamics

Figure 21A:
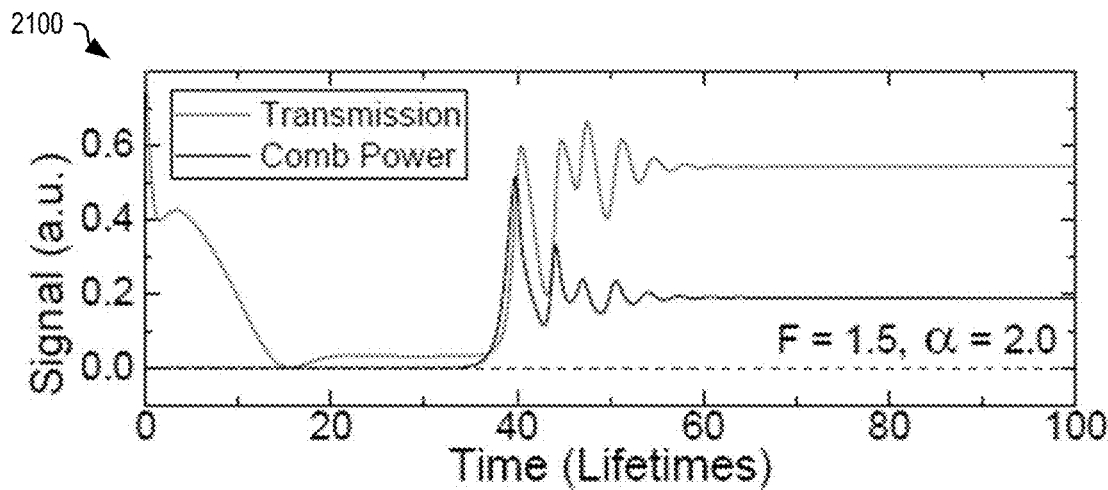
FIGS. 21A and 21B are graphs illustrating time-evolution of spontaneous generation of a single pulse in LLE simulation.
Figure 21B:
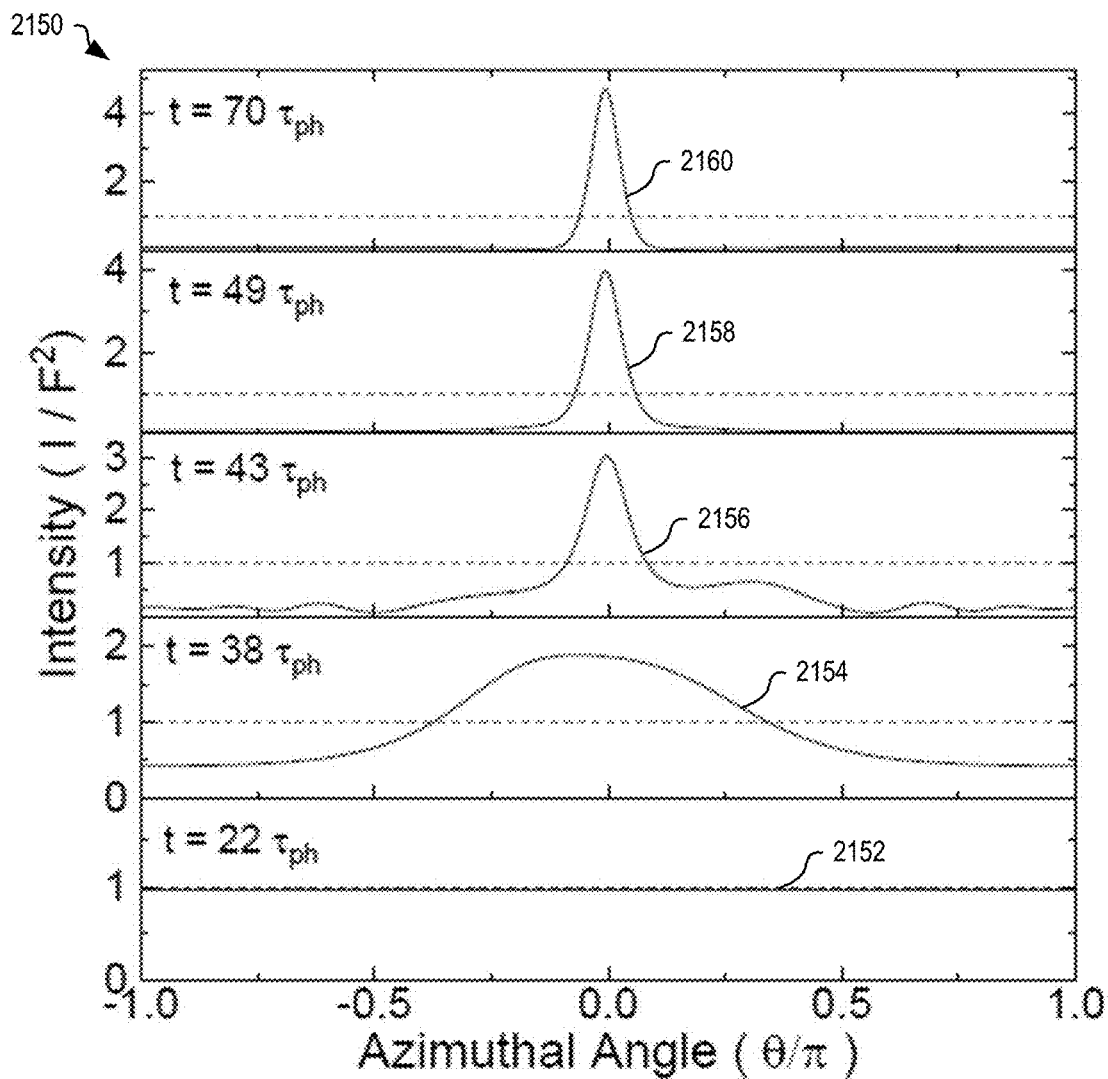
Figure 22A:
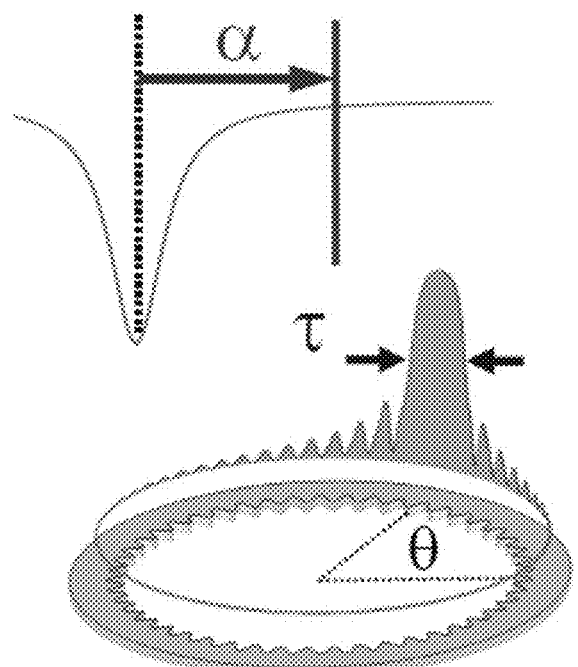
FIGS. 22A-25 illustrate the important objective of unifying and controlling the available states in normal-GVD Kerr resonators.
Figure 22B:
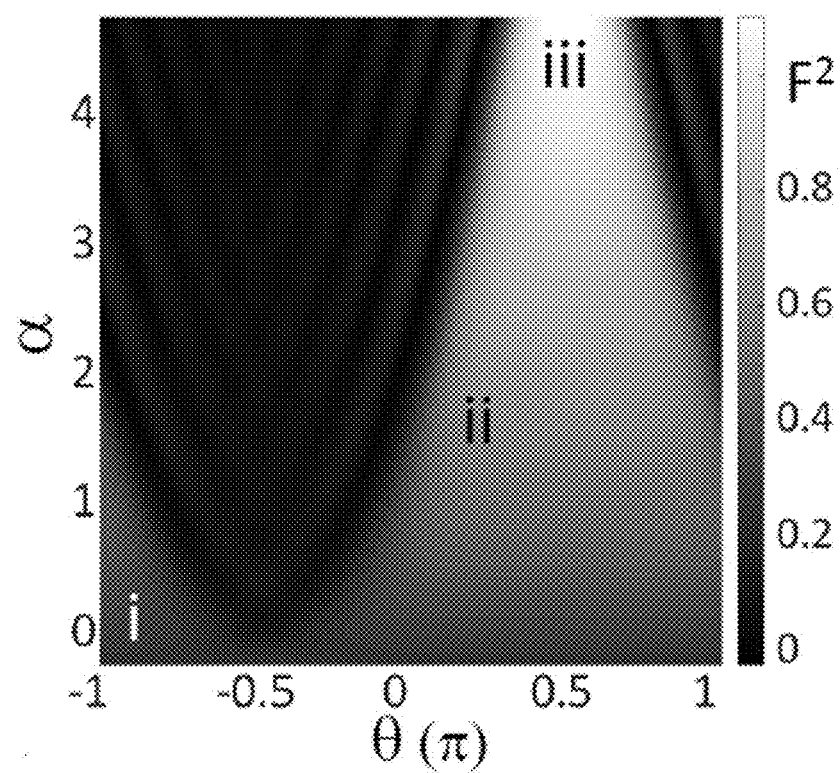

FIGS. 21A and 21B are graphs, 2100 and 2150 respectively, illustrating time-evolution of spontaneous generation of a single pulse in LLE simulation. Here the pulse arises spontaneously from the flat state with constant pump F and detuning α, seeded only by vacuum fluctuation. The LLE simulation of pulse generation shows several transient states the resonator goes through to arrive at the DKS state. In this simulation, the resonator is initiated with zero amplitude, and is energized with a fixed pump field F at fixed detuning α for some time until the pulse state stabilizes. Graph 2150 shows four transient states in the pulse generation, starting from its bottom panel: Line 2152 indicates that a flat amplitude energizes without producing comb power. This flat state occurs until it is sufficiently large that the flat state becomes unstable. Unlike the conventional resonator where the FWM condition is reached by the large mode density near the pump mode to form Turing patterns order $\mu'$ determined by dispersion, the phase matching is prohibited by the shifted pump mode. Line 2154 illustrates a second state where, with the shifted pump mode, the PhCR instead makes a one-lobe sinusoidal pattern once the flat amplitude is sufficiently high. This may be intuitively understood by drawing a quadratic curve across the three modes $\mu=0$, $\mu'=\pm 1$ for the PhCR mode structure. The high positive curvature of this curve affects a local strong anomalous dispersion, causing a transient Turing pattern of order $\mu'=1$ to form. This transient pattern breaks the θ-symmetry in the resonator, seeding the resonator for a single pulse. Line 2156 illustrates the one-lobe pattern beginning to sharpen. This is because unlike a true high-anomalous-dispersion resonator where $\mu'>\pm 1$ modes are FWM-mismatched from strong dispersion, the $\mu'>\pm 1$ modes of the PhCR follow the base dispersion, therefore are sufficiently phase-matched and can be energized. The energizing of $\mu'>\pm 1$ modes lead to sharpening of the peak in time domain, and the broadening of its spectrum. Line 2158 illustrates that the pulse stabilizes as the transient components decay away. Note that at this stage the flat amplitude background is significantly lower than prior to the pulse formation, a curious result from the modified LLE changing its effective pump field F' in response to the existing pulse in the resonator. The reduced flat amplitude will no longer spontaneously generate patterns, preventing further pulse generation beyond the first pulse. The set of transient steps, illustrated by lines 2152, 2154, 2156 and 2158, eventually result in deterministic placement of one broad-band pulse in the resonator, shown as line 2160 of FIG. 21B.

A Continuum of Bright and Dark Pulse States in a Photonic-Crystal Resonator

Nonlinearity is a powerful determinant of physical systems. Controlling nonlinearity leads to interesting states of matter and new applications. In optics, diverse families of continuous and discrete states arise from balance of nonlinearity and group-velocity dispersion (GVD). Moreover, the dichotomy of states with locally enhanced or diminished field intensity depends critically on the relative sign of nonlinearity and either anomalous or normal GVD. Here, we introduce a resonator with unconditionally normal GVD and a single defect mode that supports both dark, reduced-intensity states and bright, enhanced-intensity states. We access and explore this dark-to-bright pulse continuum by phase-matching for soliton generation with a photonic-crystal resonator, which mediates the competition of nonlinearity and normal GVD. These stationary temporal states are coherent frequency combs, featuring highly designable spectra and ultralow noise repetition-frequency and intensity characteristics. The dark-to-bright continuum illuminates physical roles of Kerr nonlinearity, GVD, and laser propagation in a gapped nanophotonic medium.

Introduction

Complex systems generate patterns from a fundamental set of rules, which govern interactions between system components. Fractals are a good example in which mathematical relations produce intricate patterns, depending on a set of parameters that characterize the relations. Similarly, in nonlinear optics, spatiotemporal laser patterns readily manifest in a medium, and their dynamics enable detailed, precise, and controllable tests of how light and matter interact. We focus on a ubiquitous nonlinearity of materials, the Kerr effect, which underlies fascinating behaviours in nonlinear optics, such as the formation of discrete states of patterns and pulses. However, the Kerr effect only represents half of the picture in the dynamics, since the frequency dependence of group-velocity dispersion (GVD or simply dispersion) typically controls what optical state forms at the balance against nonlinearity. Simply the sign of GVD differentiates optical states, for example in the case of anomalous GVD that balances with the Kerr effect for soliton formation. Beyond illuminating complex systems, nonlinear-optical states are being applied and optimized. Dissipative Kerr solitons in microresonators enable ultraprecise optical-frequency metrology and many other functionalities. More advanced device topologies promise to yield enhanced nonlinear laser sources, through coupled resonators, dispersion engineering in nanophotoncis, and inverse-design methods.

To understand the interplay of nonlinearity and either anomalous or normal GVD, we utilize the mean-field Lugiato-Lefever equation (LLE) for the field in a Kerr resonator. The LLE describes several states: the flat state of a sufficiently low intensity pump laser; oscillatory Turing patterns that extend over the entire resonator; and localized bright and dark solitons, which are the canonical stationary states at anomalous and normal GVD, respectively. In particular, the LLE framework for optical states subject to normal GVD (and a positive nonlinear coefficient) is relatively sparse, since the nearly unconditional imbalance of GVD and nonlinearity at constant excitation suppresses phase matching. Still, particular nonlinear states have been observed through fortuitous mode-structure defects that create bands of anomalous GVD in an otherwise normal-GVD resonator to seed dark-soliton formation.

Experiments with dark-soliton states exhibit strikingly different behavior from its anomalous GVD counterpart, such as the development of complex spectral modifications with pump-laser detuning, for example. Moreover, effectively bright-pulse states such as the platicon have been described through simulation and may form through multi-frequency pumping or the Raman effect. Beside interesting physics, normal GVD systems are advantageous for applications, including the relative ease of obtaining normal GVD, self-starting pulses, and focused spectral power distribution. These characteristics provide complementary functionalities to the current paradigm for laser synthesis and optical clockwork with anomalous dispersion Kerr combs. It is therefore important to understand the physics underlying the emergence of normal GVD solitons, and to develop reliable methods to create these curious states.

A photonic-crystal resonator (e.g., PhCR 200, FIG. 2) is used to phase-match for pattern formation in normal GVD. The tailored point-defect in PhCR dispersion enables discovery and assessment of a complete continuum of bright- and dark-pulse states under normal GVD. The PhCR defect modifies the pump-versus-loss energy balance within the resonator, providing the key that uncovers dark- and bright-pulse states in the same physical device. PhCR 200 is a microresonator with periodic modulation that demonstrates Bloch symmetry, opening a bandgap in the resonator dispersion. An edge-less boundary condition—an azimuthally uniform pattern around the resonator—is used to create the frequency-domain equivalent of a point-defect on a targeted azimuthal mode of the resonator. By tuning a pump laser onto resonance with this point-defect mode, phase-match for modulation instability in the normal GVD regime is performed. Further, by designing the PhCR bandgap for specific regimes of pump laser power and detuning, both bright- and dark-pulse states of the resonator field are realized. Experiments explore their tuning behavior with the pump laser and bandgap, establishing a full continuum between the bright- and dark-pulse states. Moreover, the utility of states in the dark-to-bright soliton continuum is characterized for applications through ultraprecise optical-frequency measurements.

Phenomenon

Unifying and controlling the available states in normal-GVD Kerr resonators is an important objective; see FIGS. 22A-25. The bandgap of PhCR 200 enables a controllable frequency shift of the mode excited by the pump laser, which unconditionally satisfies phase matching for four-wave mixing. In experiments on this system, we observe spontaneous formation of optical states with spectra that suggest localized patterns. Analyzing these states highlights the curious characteristic in which the high-intensity duration $\tau$ (FIG. 22A) varies dramatically with the laser detuning $\alpha=\omega_r-\omega_l$, where $\alpha>0$ for laser frequency $\omega_l$ lower than the resonance $\omega_r$. Indeed, these states are identified as pulses that transition continuously from dark to bright for a prescribed tuning range of $\alpha$. This is characterized by the intensity filling fraction $t_c=\tau/\tau_{rep}$, which is the pulse duration normalized to the round-trip time $\tau_{rep}$ or equivalently the fraction of the azimuthal angle $\theta$ occupied by higher-than-average optical intensity. FIG. 22B illustrates this dark-to-bright continuum with an accurate LLE simulation for PhCR 200 of FIG. 2. The PhCR shift modifies the phase-matching condition and therefore what states may be reached in the resonator. In this example, a pump-laser mode (number $\mu=0$) red-shifted by 2.0 $\kappa$ from the baseline normal GVD is chosen, where the half-linewidth of the resonator is $\kappa/2\pi$. The plot shading indicates the continuous evolution between diminished and enhanced peak intensity, state i and iii in FIG. 22B, respectively. The intermediate state ii represents a half-filled resonator.

Figure 23:
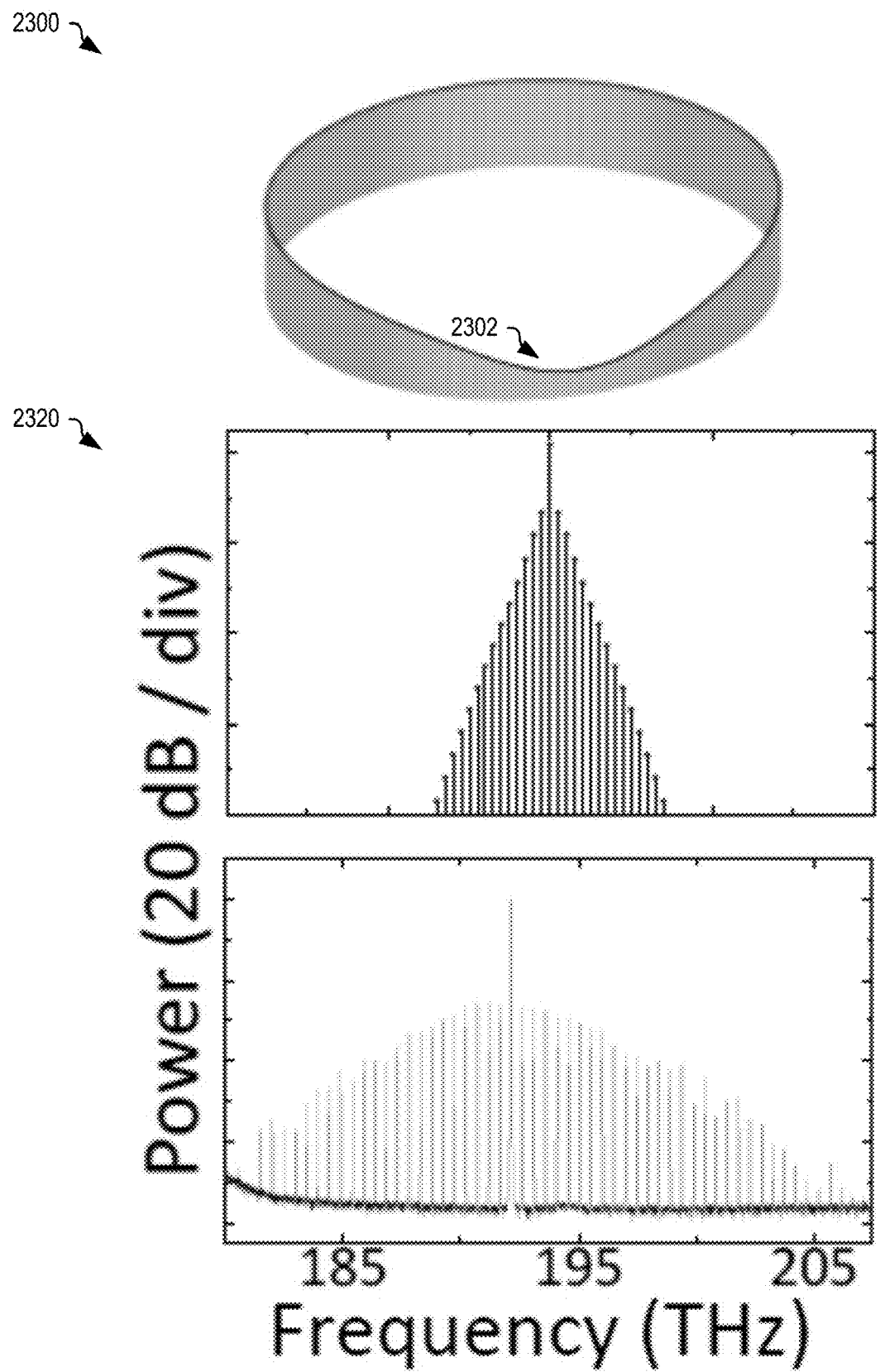
Figure 24:
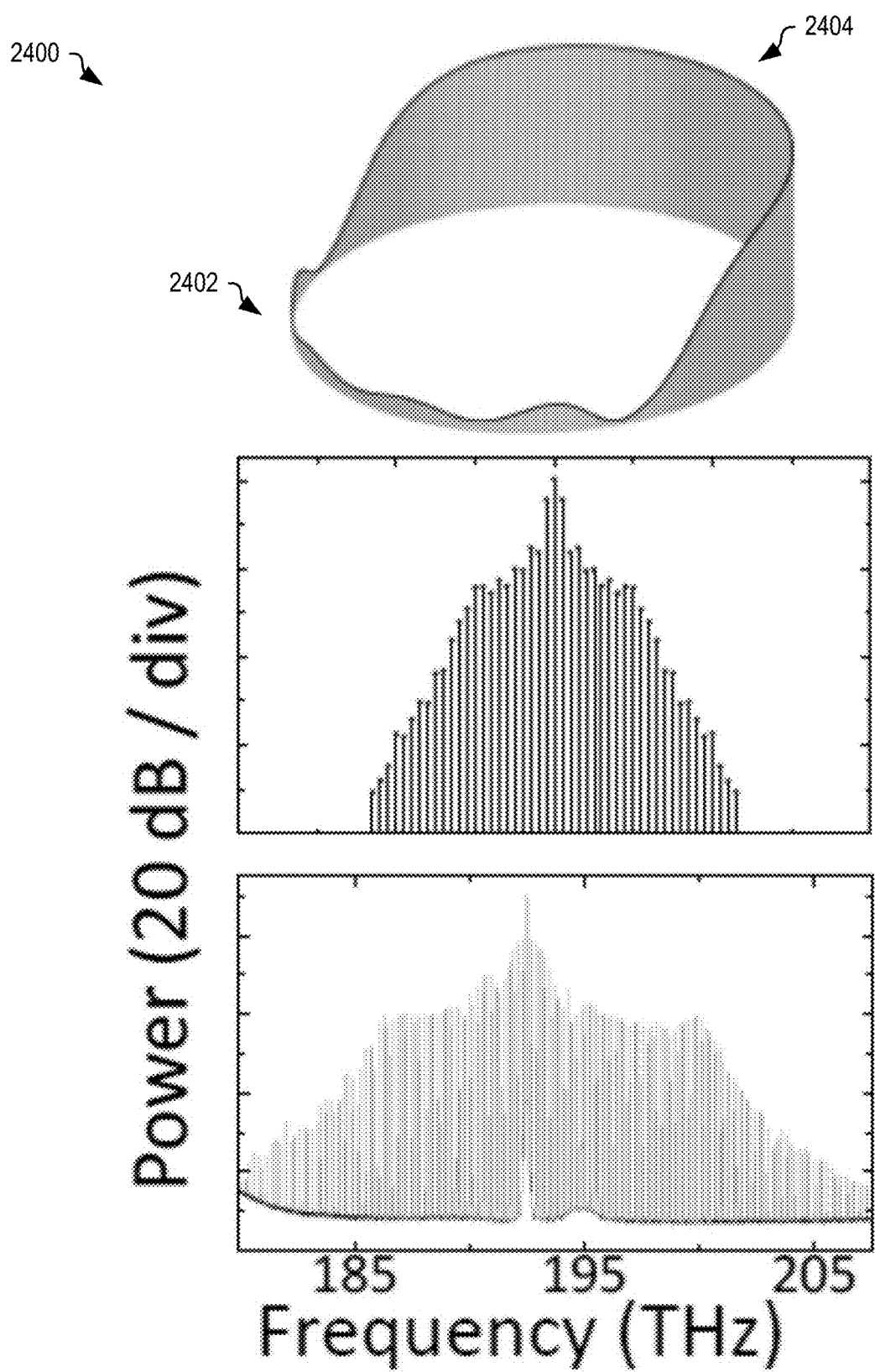
Figure 25:
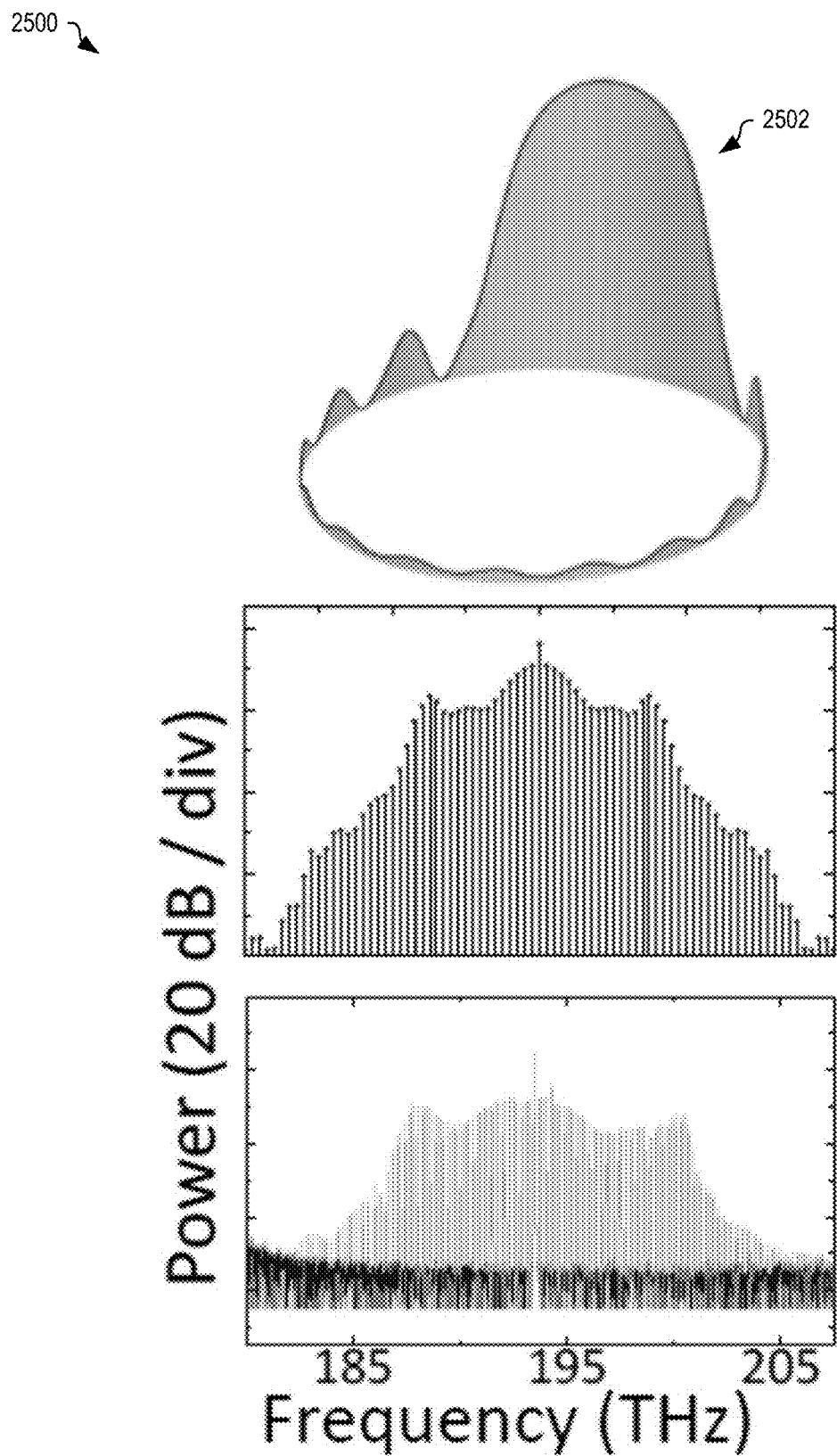

FIGS. 23-25 analyze specific states in the dark-to-bright soliton continuum, making the connection between simulated spectra and pulse waveforms and spectrum measurements of states created in normal-GVD PhCR devices. FIG. 23 shows a ring 2300 with an anti-pulse state 2302 where, as a function of $\alpha$ starting near zero, the stationary state begins as a dark soliton where a localized intensity dip exists over an otherwise flat background. As $\alpha$ increases, the anti-pulse 2302 grows in duration and develops multiple intensity minimums that extend about $\theta$. FIG. 24 shows a dark pulse 2402 with five minimums and occupying approximately half of the $\theta$ space within the resonator (e.g., PhCR 200). This half-filled state may be equivalently interpreted as a bright pulse 2404 occupying the other half of the resonator. Increasing a further causes the bright pulse 2404 to shorten temporally and increase in intensity to form the platicon state, which phenomenologically describes this bright-pulse state. FIG. 25 illustrates an example platicon 2502, described by their plateau-like temporal shape and localized oscillations trailing the pulse. These results provide a link between the bright- and dark-pulse states as the two extremes of a continuously tuned intensity pattern.

According to the intrinsic temporal- and spectral-domain relationships of nonlinear states, the pulse waveforms spanning the dark-to-bright pulse continuum in FIGS. 22A-25 exhibit identifying features. The following description focuses on three primary features according to their spectral-domain appearance: center lobe, wing, and horn. The center lobe refers to the high-power modes near the pump laser, and its bandwidth inversely represents the temporal size of a bright or dark localized pulse. Indeed, both dark- (FIG. 23) and bright-pulse states (FIG. 25) prominently feature a center lobe, and the prototype dark soliton is almost entirely composed of it. The more exotic wing feature develops outside the bandwidth of the center-lobe at larger a. It represents the deviation of the temporal pattern from a pulse and is most visible when the pattern is temporally extended (e.g., see FIG. 24), reminiscent of the spectrum of a bandwidth-limited square wave. Indeed, the power spectrum of the half-filled state is primarily composed of the $\mu=\pm 1$ modes and a $1/\mu^2$ asymptotic envelope forms the wing. Moreover, the half-filled state demarcates the condition of center-lobe broadening and temporal pulse compression either to a dark or bright state with any change to $\alpha$. This behavior stands apart from anomalous dispersion Kerr solitons in which increasing $\alpha$ leads to a monotonic increase in the soliton bandwidth while approximately maintaining the power-per-line near the pump. The horn feature refers to the heightened spectral power on the edges of the spectral bandwidth (e.g., see FIG. 25). It represents the rapid oscillation trailing the pulse, a normal GVD correspondence of the dispersive waves. These features help to extract waveform information from the optical spectra in the following sections.

Mechanism

A theoretical framework is developed for the pulse-duration-tuning behavior throughout the dark- to bright-pulse continuum. Specifically, the relation between the intensity filling ratio $t_c$ and the laser detuning $\alpha$ is established. Normal GVD waveforms consist of two intensity levels, which depend on $\alpha$ and the pump F. The two levels are connected by switching fronts. Here, it is shown that PhCR 200 disturbs these levels through an effective pump contribution F', which introduces an additional energy exchange between the two levels that determines $t_c$.

Figure 26A:
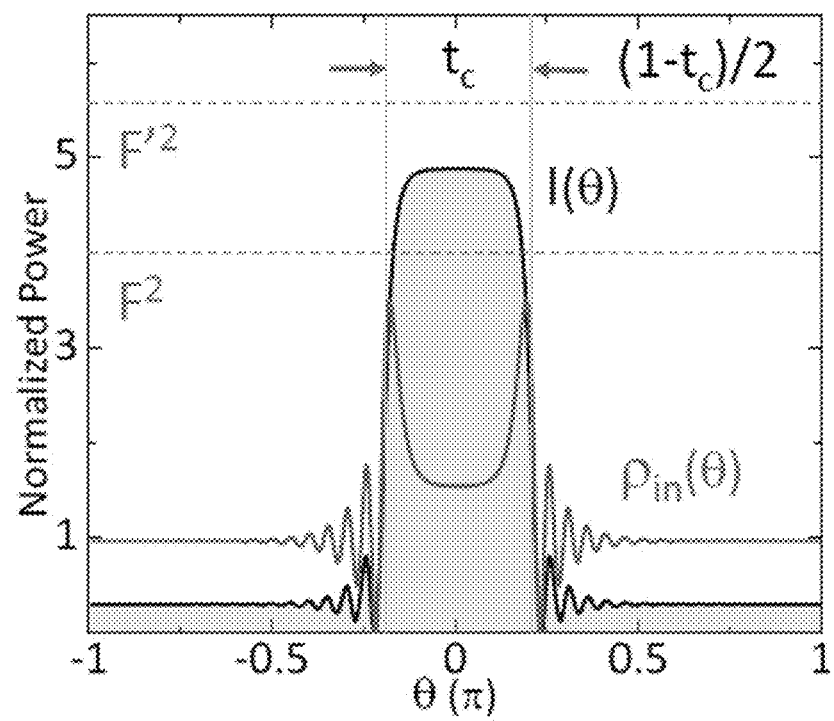
FIG. 26A shows an Intensity profile I(θ) of a waveform with bright-pulse fraction $t_c$. $F^2$<I(θ)<$F'^2$ for the high-intensity level.

FIG. 26A shows an Intensity profile I($\theta$) of a waveform with bright-pulse fraction $t_c$. $F^2<I(\theta)<F'^2$ for the high-intensity level. The pump energy in-flow $\beta_{in}(\theta)$ is also shown.

Figure 26B:
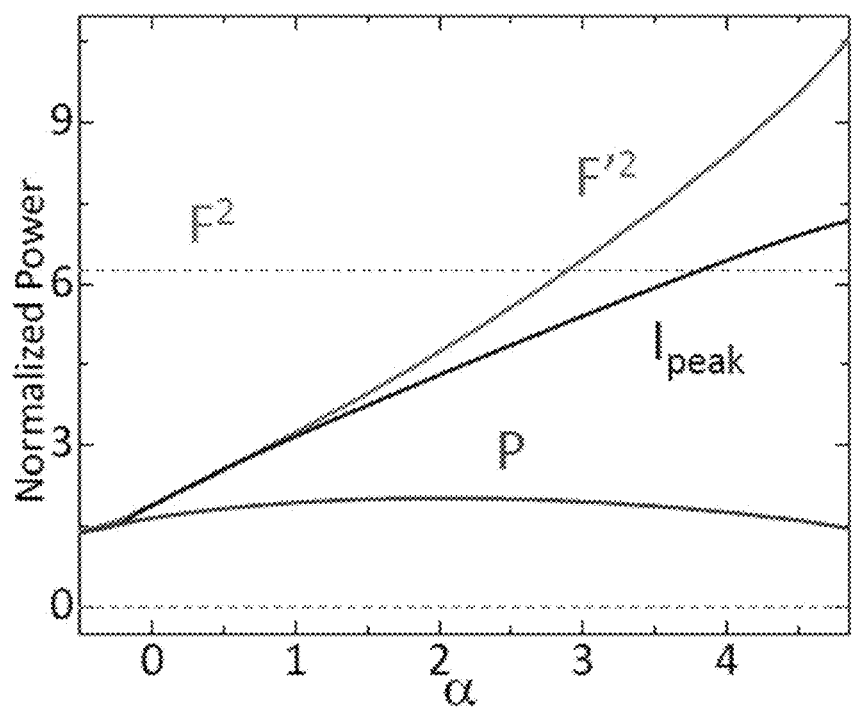
Figure 27A:
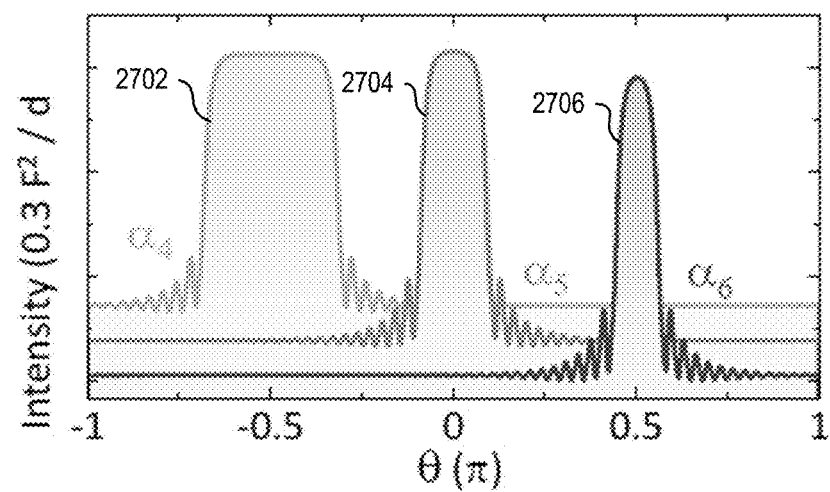
Figure 27B:
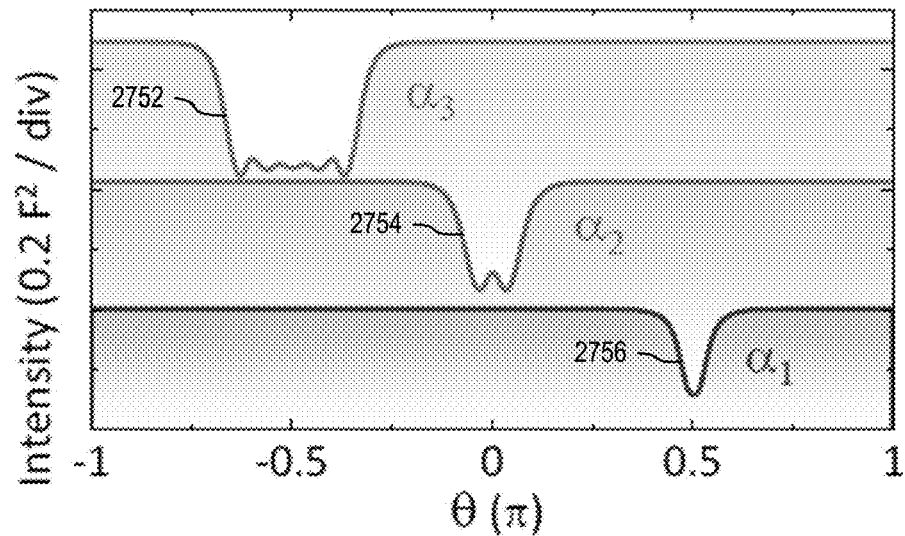

FIG. 26B shows calculated parameters $F'^2$, $I_{peak}$, and P in the LLE. Note that $I_{peak}>F^2$ at high $\alpha$. FIGS. 26B, 27A, and 27B plot the waveform on the red- and blue-detuned ranges of an $\alpha$ sweep ($\alpha_1<\alpha^2 \ldots <\alpha_6$), showing the increase of dark-pulse duration and the decrease of bright-pulse duration with a.

Figure 28:
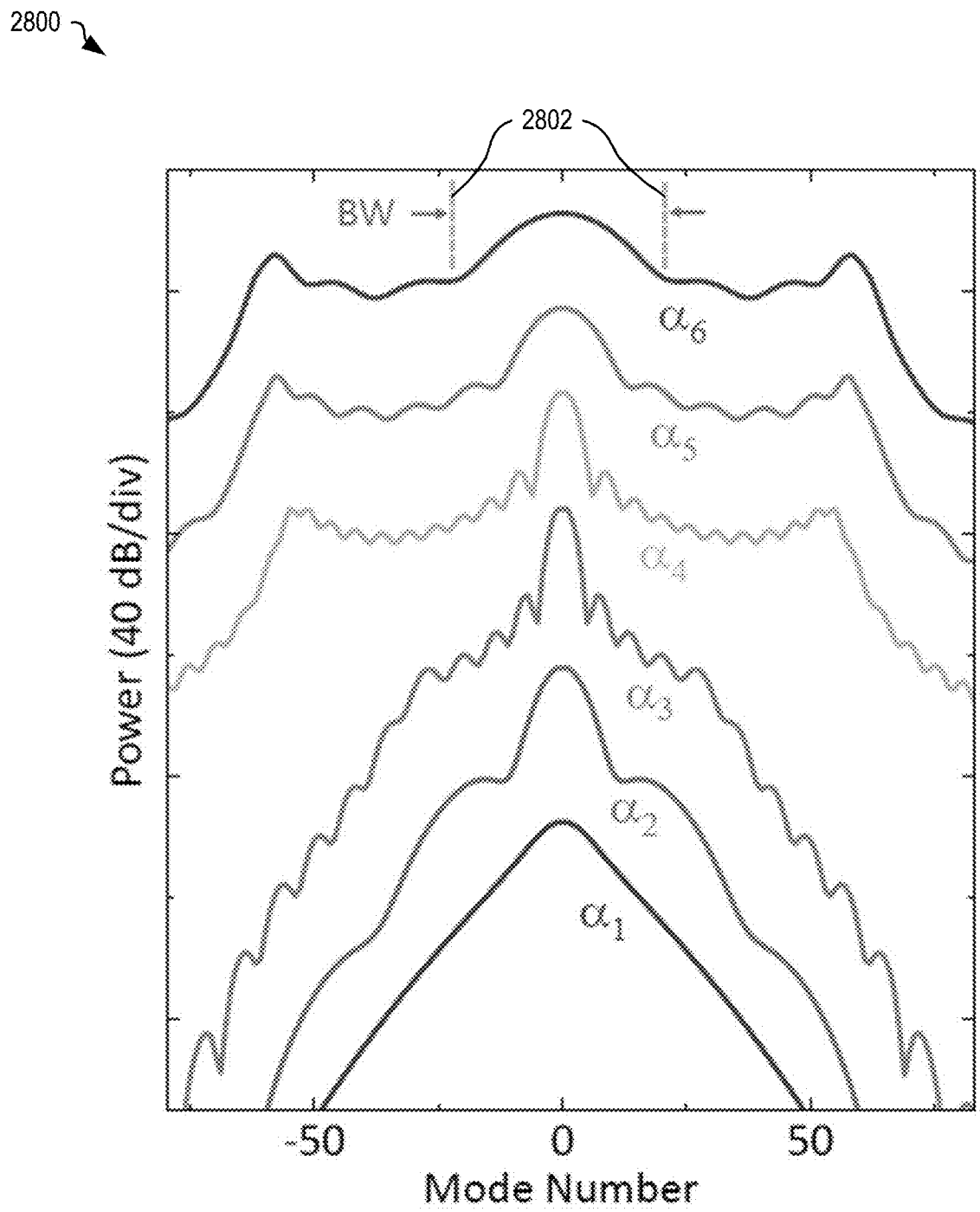
FIG. 28 shows a plot of the corresponding spectra.

FIG. 28 shows a plot of the corresponding spectra. Note the behavior of the center lobe bandwidth BW 2802 marked in gray.

The relation $t_c(\alpha)$ is explored by characterizing the waveform under normal GVD, using the pump-shifted LLE (hereafter PS-LLE) that accurately describes the field of PhCR 200:

$$\partial_t \psi = -(1 + i\alpha)\psi - \frac{i\beta}{2}\partial_\theta^2 \psi + i|\psi|^2\psi + F + i\epsilon(\overline{\psi} - \psi), \quad (15)$$

where $\overline{\psi}$ denotes the average field over $\theta$. For time-stationary solutions, $\partial_t \psi = 0$, the interaction between dispersion and nonlinearity manifests in the imaginary part of this equation. This yields in absence of the PhC term (assuming a real-values pulse $\psi$ for simplicity):

$$\frac{-\beta}{2}\partial_\theta^2 \psi/\psi + |\psi|^2 \simeq \alpha.$$

For example, in anomalous GVD ($\beta<0$), the peak of a pulse shows negative curvature and positive Kerr shift. Partial cancellation or balance between the two enables sharp waveforms like the Kerr soliton. This system is in normal GVD ($\beta>0$), leading to competition between dispersion and nonlinearity, which sum to a particular $\alpha$ to phase-match to the pump laser. This leads to a mutually exclusive relation between local intensity and curvature—where the intensity is high, the waveform is flat-leading to the flat-top waveform with switching edges in-between shown in FIG. 26A. $t_c$ corresponds to the fraction of the high-intensity level.

This two-level waveform already exists in the normal-GVD regime of conventional resonators. The waveform corresponds to the flat-amplitude levels of the bi-stable, continuous-wave (CW) resonator field, controlled by F and $\alpha$ through solutions to $F^2 = (1+(|h|^2-\alpha)^2)|h|^2$, where formally $h = F/(1+i(\alpha-|h|^2))$ is the field at each level. These levels are stationary in time because the loss $\rho_{loss}$ and pump power in-flow $\rho_{in}$ per unit $\theta$ balance $$\rho_{loss}(\theta) = \kappa \cdot I(\theta) = |\psi(\theta)|^2 \quad (16)$$
$$\rho_{in}(\theta) = F \cdot \text{Re}(\psi(\theta))$$

where $I(\theta)$ is the intensity, $\kappa=1$ is the normalized loss rate; see details below in the section titled: Derivation of Local Energy Flow. In a conventional, normal-GVD resonator, the balance $\rho_{in}=\rho_{loss}$ is satisfied locally for all $\theta$ at the bi-stability levels. Therefore, switching edges may translate independently about $\theta$ without perturbing the input-output energy flow, although weak oscillating tails of the edges can trap some waveforms in a specific configuration.

The mode structure of a PhCR perturbs the energy balance of the two levels, leading to novel nonlinear dynamics. The impact of the PhCR frequency shift term is identified in Eq. (15) by casting it in a conventional LLE with effective pump parameters F', $\alpha'$:

$$F' = |F + i\epsilon\overline{\psi}| \quad (17)$$
$$\alpha' = \alpha + \epsilon$$

where the corresponding field amplitudes within each intensity level (neglecting the effect of curvature) are written as $$h = \frac{F'}{1 + i(\alpha' - |h|^2)}, \quad (18)$$

where $|h|^2$ approximates the high- and low-level intensities at $\theta=0$ and $\pi$ in FIG. 26A. With h determined by F' but $\rho_{in}$ still dependent on the physical pump F, $\rho_{in}$ and $\rho_{loss}$ are no longer equal (these rates have the same sign by our definition). In the PhCR case, h at the high-intensity level is driven to be larger by the effective F'. This is the mechanism that creates a larger peak intensity, forming a bright pulse.

FIG. 26A is a graph 2600 showing $\rho_{in}(\theta)$ and $\rho_{loss}(\theta)=\kappa I(\theta)$, calculated using the PS-LLE. The high-intensity level exhibits a deficit of energy, $I > \rho_{in}$, while the low-intensity level shows an energy surplus, $I < \rho_{in}$. When combined, the two levels maintain energy conservation. The surplus or deficit arises from the difference in the relations $I(\theta) \propto |h|^2$ and $\rho_{in} \propto |h|^1$, which increase with $\alpha$ and F'. Importantly, both F'>F and high-level intensity $I(0)=|h|^2>F^2$ may be reached at large detuning. FIG. 26B is a graph 2650 showing the behavior of F' and $I_{peak}$ for the same parameters as FIG. 22B, where the peak intensity $I_{peak}$ in the PS-LLE corresponds to the high-level $I(0)$. Both parameters surpass $F^2$ at large $\alpha$. To maintain the $I_{peak} > F^2$ intensity with the limited physical pump power $F^2$ available to the system, the pulse duration reduces as its intensity increases. This manifests as reducing $t_c$ (hence reducing the energy deficit) and also regularizing the increase of F' through the $\overline{\psi} \simeq h \cdot t_c$ dependence. As result, the total energy inflow $P = \oint \rho_{in}(\theta)d\theta$ in FIG. 26B remains relatively constant in contrast to the increase of F' or $I_{peak}$. This energy balance links $t_c$ to the peak field h, and thus to $\alpha$.

To calculate $t_c$ through the energy balance, all energy flow within the resonator is integrated. The energy conservation condition is obtained by multiplying Eq. (15) by $\psi^*$, followed by integrating the terms over $\theta$:

$$(1 + i\alpha)\oint |\psi|^2 d\theta = \quad (19)$$
$$\frac{i\beta}{2}\oint |\partial_\theta \psi|^2 d\theta + i\oint |\psi|^4 d\theta + F\overline{\psi}^* + i\epsilon\left(|\overline{\psi}|^2 - \oint |\psi|^2 d\theta\right)$$

where the second-derivative in $\theta$ term is integrated by part. The real part of this form is taken to obtain the energy-balance equation:

$$\oint |\psi|^2 d\theta = \oint F \cdot \text{Re}(\psi)d\theta \quad (20)$$

identifying the terms on the two sides corresponding to $\oint I(\theta)d\theta = \oint \rho_{in}(\theta)d\theta$. Expressing this form approximately in terms of the fields at $\theta=0$, $\pi$ and $t_c$, gives $$t_c \cdot I(0) + (1 - t_c) \cdot I(\pi) = t_c \cdot \rho_{in}(0) + (1 - t_c) \cdot \rho_{in}(\pi), \quad (21)$$

which is rearranged to $$t_c = \frac{\rho_{in}(\pi) - I(\pi)}{\rho_{in}(\pi) - \rho_{in}(0) + I(0) - I(\pi)}.$$

This form indicates how $t_c$ depends explicitly on the intensities of the two levels, and therefore implicitly on α.

FIGS. 27A and 27B show intensity graphs 2700 and 2750, respectively, that present time-domain PS-LLE solutions across the continuum at β=5.2×10⁻³, illustrating the soliton as α is varied to access both dark and bright pulses. α is tuned from a setting $α_1$ (indicated by line 2756) that yields the dark pulse, through medium-duration dark pulse $α_2$ (indicated by line 2754), to the longer-duration dark pulse $α_3$ (indicated by line 2752), across the half-filled state to a setting that yields the bright pulse $α_4$ (indicated by line 2702), then through medium bright pulse $α_5$ (indicated by line 2704), then to shortening bright pulse $α_6$ (indicated by line 2706). The PS-LLE calculations confirm the monotonic tuning of $t_c$ with α described in the mechanism. FIG. 28 shows the corresponding spectra for $α_1$ through $α_6$. The center-lobe bandwidth BW 2802 is governed by $t_c$. The monotonic increase of $t_c$ manifests as a lengthening dark pulse ($α_1$ through $α_3$) and reducing BW 2802, but as a shortening bright pulse ($α_4$ through $α_6$) and increasing BW 2802 with α. See details below in the section titled: Bandwidth to filling-fraction correspondence. The tuning of the center-lobe bandwidth is a parameter measured in experiments.

Apparatus and Procedures

Figure 29:
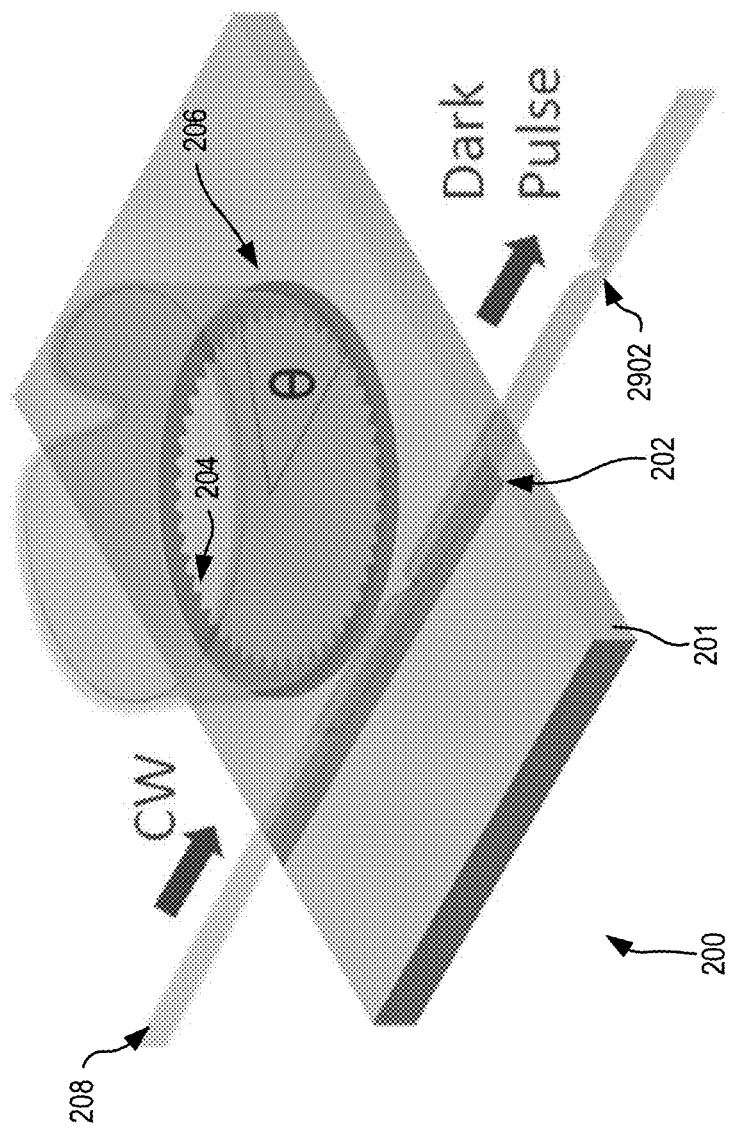
FIG. 29 is a schematic diagram illustrating dark pulse generation in the PhCR of FIG. 2.
Figure 30:
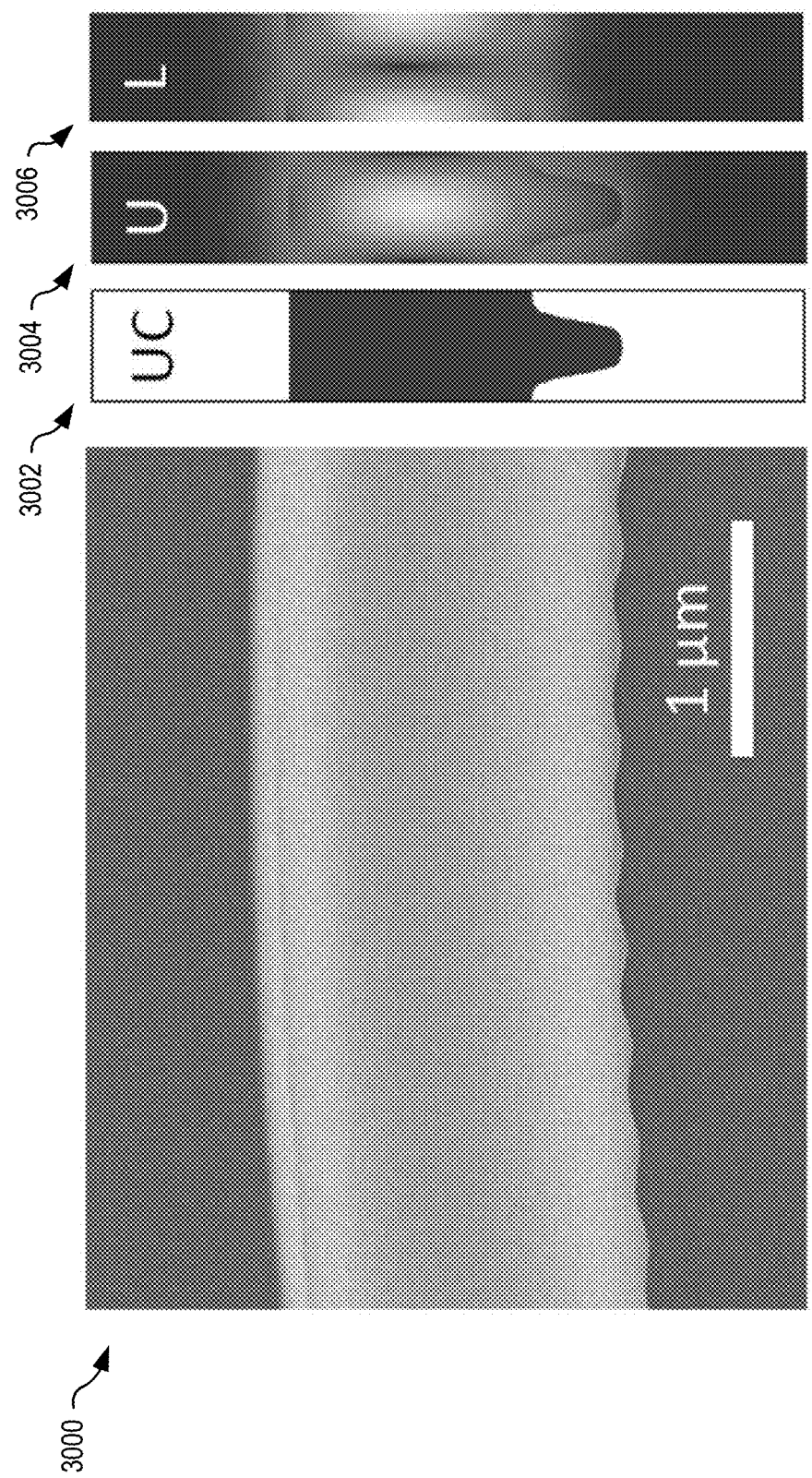
FIG. 30 is an electron microscopy image showing a section of the PhCR of FIG. 2, a unit cell (UC), and simulated electric field distributions for the (U) upper and (L) lower modes, respectively.
Figure 31:
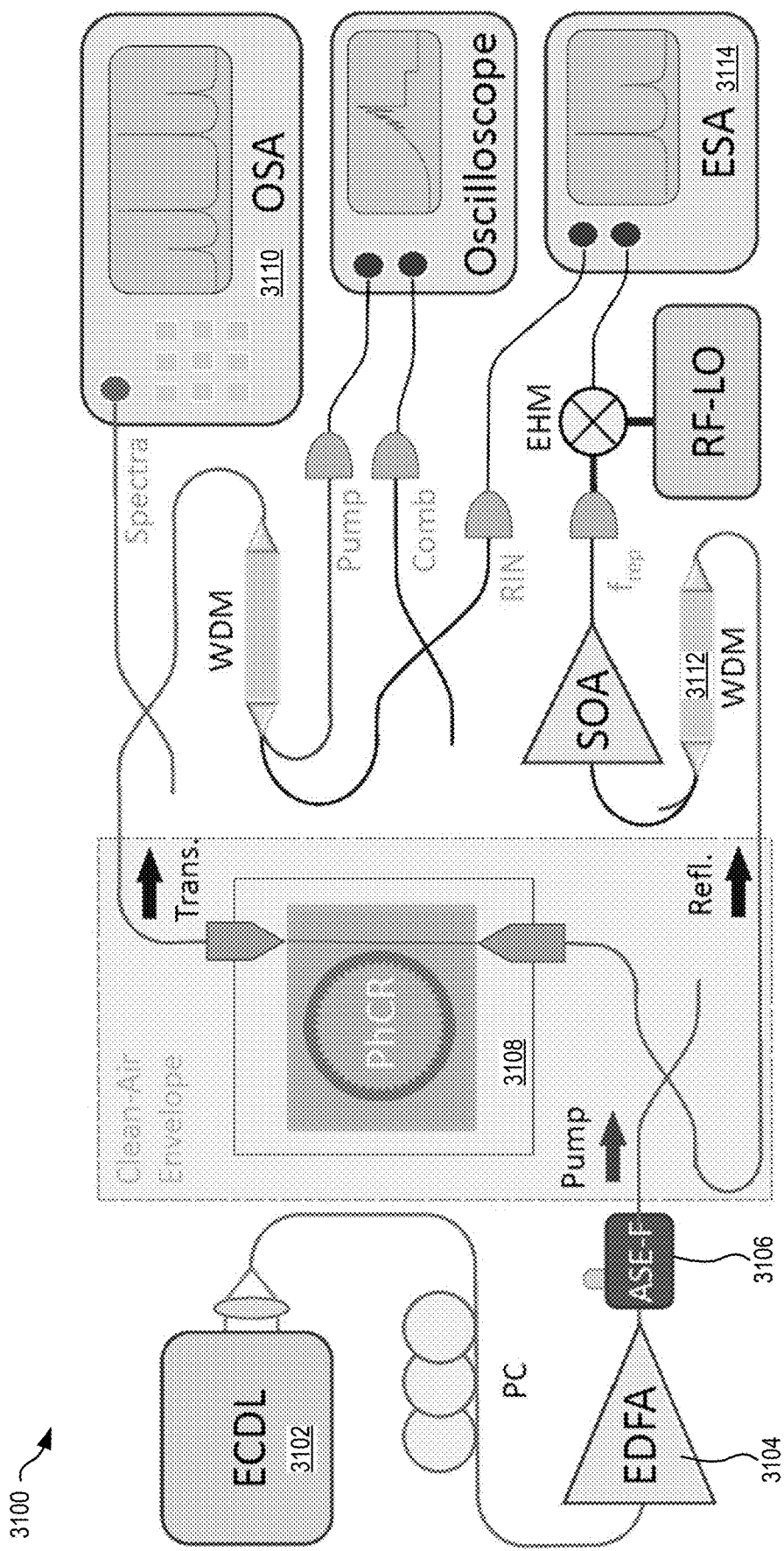
FIG. 31 is a schematic diagram of one example optical system used to evaluate the PhCR of FIG. 2.

FIG. 29 is a schematic diagram illustrating dark pulse generation in PhCR 200 of FIG. 2. FIG. 30 is an electron microscopy image 3000 showing a section of PhCR 200 of FIG. 2, a unit cell (UC) 3002, shown with exaggerated modulation for clarity, and simulated electric field distributions 3004 and 3006 for the (U) upper and (L) lower modes, respectively. FIG. 31 is a schematic diagram of one example optical system 3100 used to evaluate PhCR 200 of FIG. 2. System 3100 is similar to system 1800 of FIG. 18. FIGS. 29, 30, and 31 are best viewed together with the following description.

A plurality of normal-GVD PhCR 200 was fabricated and tested to explore the dark-to-bright pulse continuum. Objectives of the tests were to: create devices with the GVD and E settings that coincide with theoretical predictions; energize the devices with a range of α settings to create optical states; and identify the spectral characteristics of these states. As described above, PhCR 200 is a ring resonator with a sinusoidal modulation (e.g., periodic nanopatterning 204) of inner radial wall 205 of ring 206. The modulation amplitude is selected to determine the frequency shift E of one mode. PhCR 200 is evanescently coupled with waveguide 202 on chip 201, as shown in FIG. 29. Normal-GVD solitons are predicted to arise spontaneously from instability of the flat state, and the outcoupled laser pulse forms a frequency comb, which is characterized through spectral-domain measurements.

Similar to the above description, PhCRs are nanofabricated with tantalum pentoxide (hereafter tantala) material platform. A 570 nm thick ion-beam sputtered film of tantala is formed on a 3 μm thick oxidized silicon wafer. The pattern for the PhCRs and their corresponding waveguides are formed using electron beam lithography, and a fluorine inductively coupled plasma reactive-ion etch (ICP-RIE) transfers the pattern to the tantala layer. The wafer is separated, using a deep Si RIE, into chips 201, each chip having several PhCR 200. The PhCR coupling waveguides 202 extend to the chip edges, enabling pump laser insertion to the chip at ~5 dB loss per facet. Electron microscopy image 3000 of FIG. 30 shows a section of ring 206 with a radius of 22.5 μm. PhCR unit cell 3002 indicates the amplitude and period of the modulation (nanopatterning 204) that controls E and the azimuthal mode number, respectively. Specifically, one programmed azimuthal mode is frequency shifted to higher and lower frequency resonances, separated by a photonic bandgap. By tuning the pump laser onto resonance of the lower-frequency mode (hereafter the pump mode), adjust the settings of normal GVD, E, and α are adjusted to coincide with detailed theoretical modeling.

Similar to system 1800 of FIG. 18, FIG. 31 presents a test system and procedures used to evaluate PhCR 200. A pump laser 3102 is a tunable external-cavity diode laser (ECDL), and polarization is adjusted by straining single-mode fiber. The pump laser is amplified with an erbium-doped fiber amplifier (EDFA) 3104, followed by a filter 3106 that suppresses amplified spontaneous emission. Chips-under-test are mounted to a thermally stable platform 3108, and lensed fibers are aligned to chip 201 for input and output. PhCRs are carefully designed so that the pump mode falls within the 1550 nm wavelength range, which is convenient for commercial laser components. In experiments, the primary observable is the soliton spectrum, which is measured with an optical-spectrum analyzer (OSA) 3110 in both transmission and reflection from the chip. Therefore, a fiber coupler is used to access the reflection port and a wavelength-division multiplexer (WDM) 3112 to spectrally separate the pump laser from the transmission port. Assessing the soliton's noise characteristics is also important, since relatively low noise is an expected property of all the mode-locked states across the dark-to-bright continuum. The entire soliton is photodetected, except the pump laser, and the relative intensity noise is recorded with an electronic spectrum analyzer (ESA) 3114. Additionally, an ~150 GHz bandwidth modified uni-traveling carrier photodetector is used and ESA 3114 is used to record the outcoming pattern repetition frequency of suitable PhCRs 200.

Exploring the Dark-to-Bright Pulse Continuum

Figure 32:
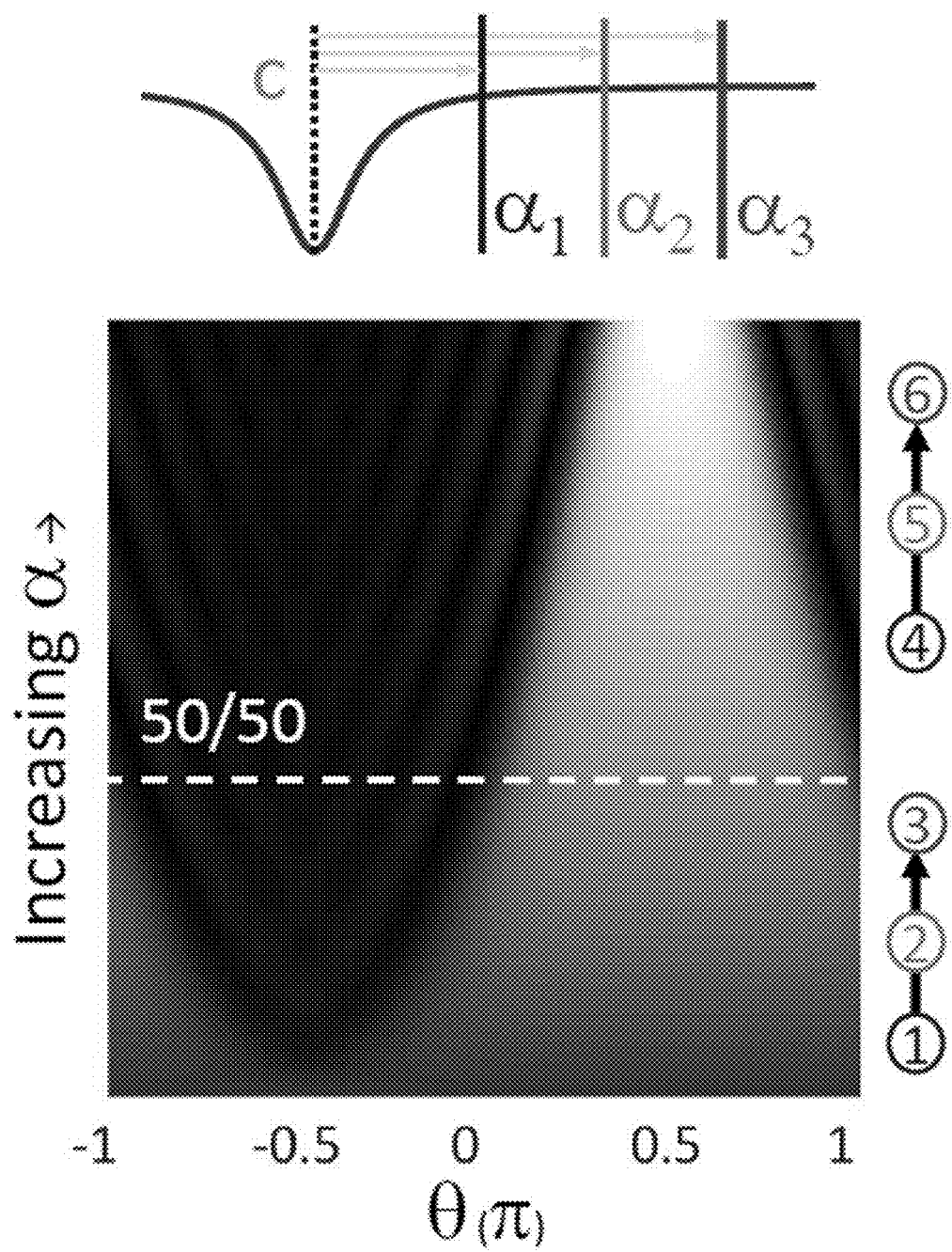
FIG. 32 is an accurate LLE simulation for the PhCR of FIG. 2 indicating detuning dependence of the transition from dark-to-bright pulses with respect to the half-filled state, in embodiments.

Normal GVD PhCRs are search for dark- and bright-pulse states with parameter settings derived from a theoretical model. FIG. 32 is an accurate LLE simulation 3200 for PhCR 200 of FIG. 2 indicating detuning dependence of the transition from dark-to-bright pulses with respect to the half-filled state. In a set of experiments examining both sides of the continuum, ε is systematically varied with each discrete PhCR 200, and α is varied according to the sequences 1→2→3 for dark pulses or 4→5→6 for bright pulses, shown in FIG. 32. For each setting of α, the state's optical spectrum is recorded, and the center lobe, wing, and horn spectral signatures are directly analyzed with respect to theoretical predictions, identifying the dark- and bright-soliton pulse shapes in normal GVD. In particular, the reversal of spectral bandwidth tuning behavior in response to the setting of α on either side of the continuum is identified; see FIG. 32.

Figure 33:
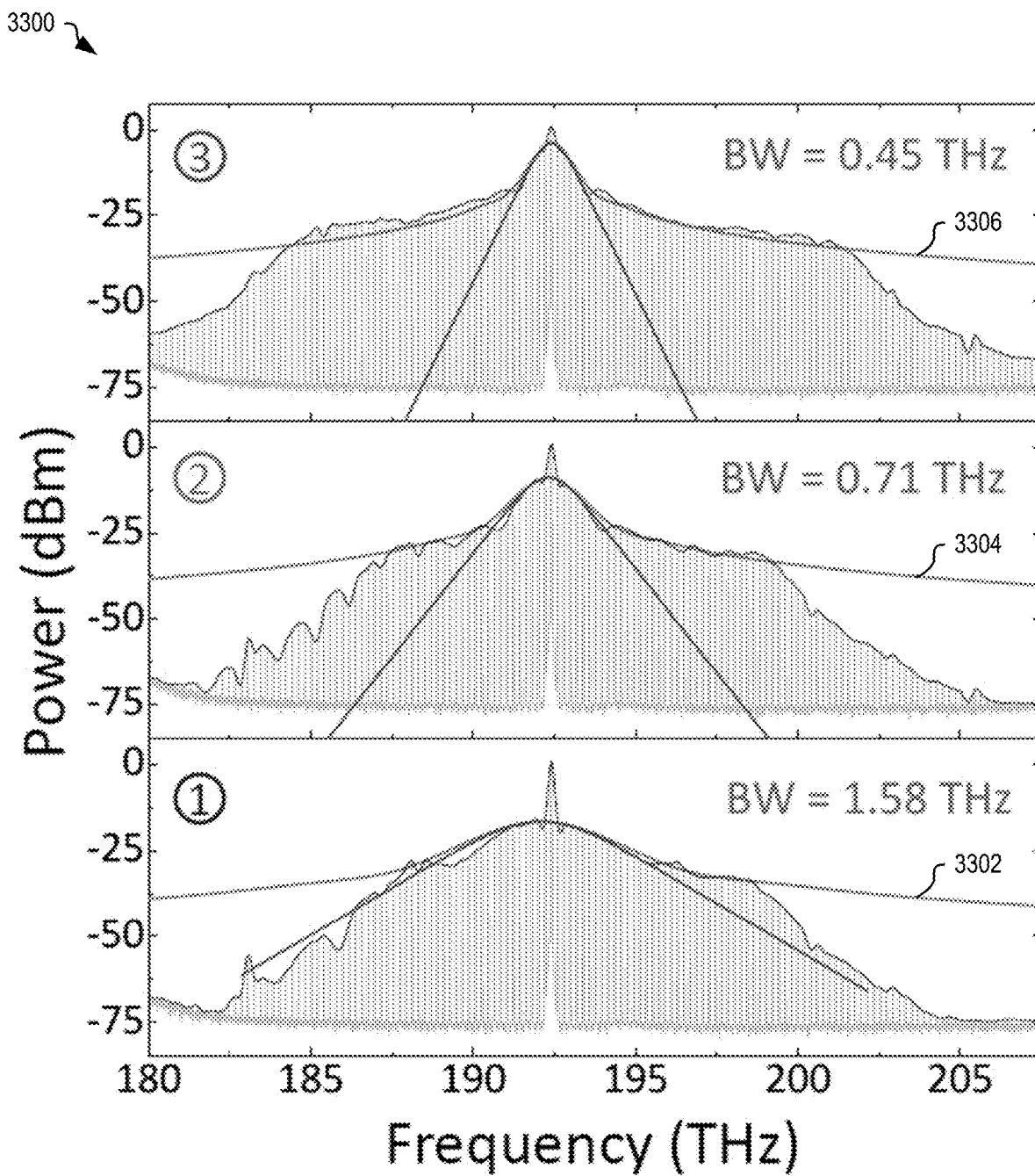
FIG. 33 is a graph illustrating spectrum measurements of dark pulses.

FIG. 33 is a graph 3300 illustrating spectrum measurements of dark pulses.

Specifically, a decrease in the center-lobe bandwidth as a function of increasing α is observed. By fitting the center-lobe portion of the spectrum to a model proportional to sech²

$$\left(\frac{v-v_0}{BW}\right)$$

where v is optical frequency, $v_0$ is the center of the spectrum, and BW is the bandwidth, we directly characterize the center lobe. Indeed, the center-lobe bandwidth is linked to the filling fraction $t_c$ by the expression BW=√3 FSR/π·(1−$t_c$)⁻¹, where FSR is the free-spectral range; see details below in the section titled: Bandwidth to filling-fraction correspondence. A reduction in center-lobe bandwidth from 1.58 to 0.45 THz is observed as α increases. In temporal units, the measurements in FIG. 33 indicate that $t_c$ varies from 0.07 to 0.25 with increasing α, a range in agreement to PS-LLE simulations. This data indicates a distinction of dark solitons in comparison to anomalous GVD bright solitons, which exhibit the opposite behavior with α. Furthermore, the dark-soliton pulses develop the wing feature outside the bandwidth of the center lobe as α increases and the localized dark pulse expands into the square-wave-like pattern of the half-filled state. To highlight this behavior in FIG. 33, the spectral envelope 3302 of a square wave with the same bandwidth as the center-lobe is overlayed. The characteristic $1/\mu^2$ roll-off of the square wave reproduces the envelope of the wing feature until the bandwidth limit set by the PhCR GVD. Both the center lobe and wing features behave according to theoretical prediction shown in FIG. 28.

Figure 34:
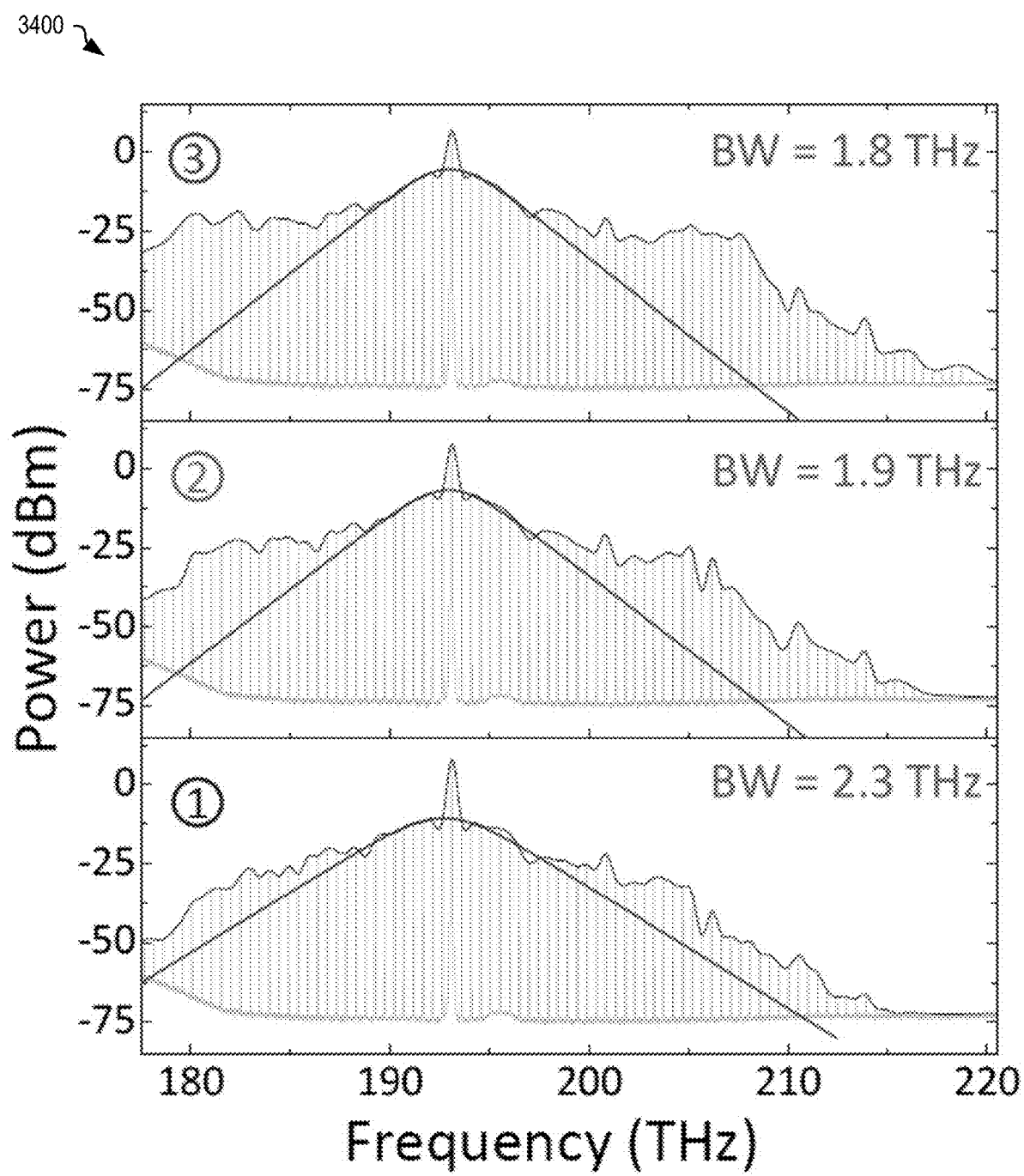
FIGS. 34 and 35 illustrate spectrum measurements in PhCRs designed to host dark and bright pulses, respectively.
Figure 35:
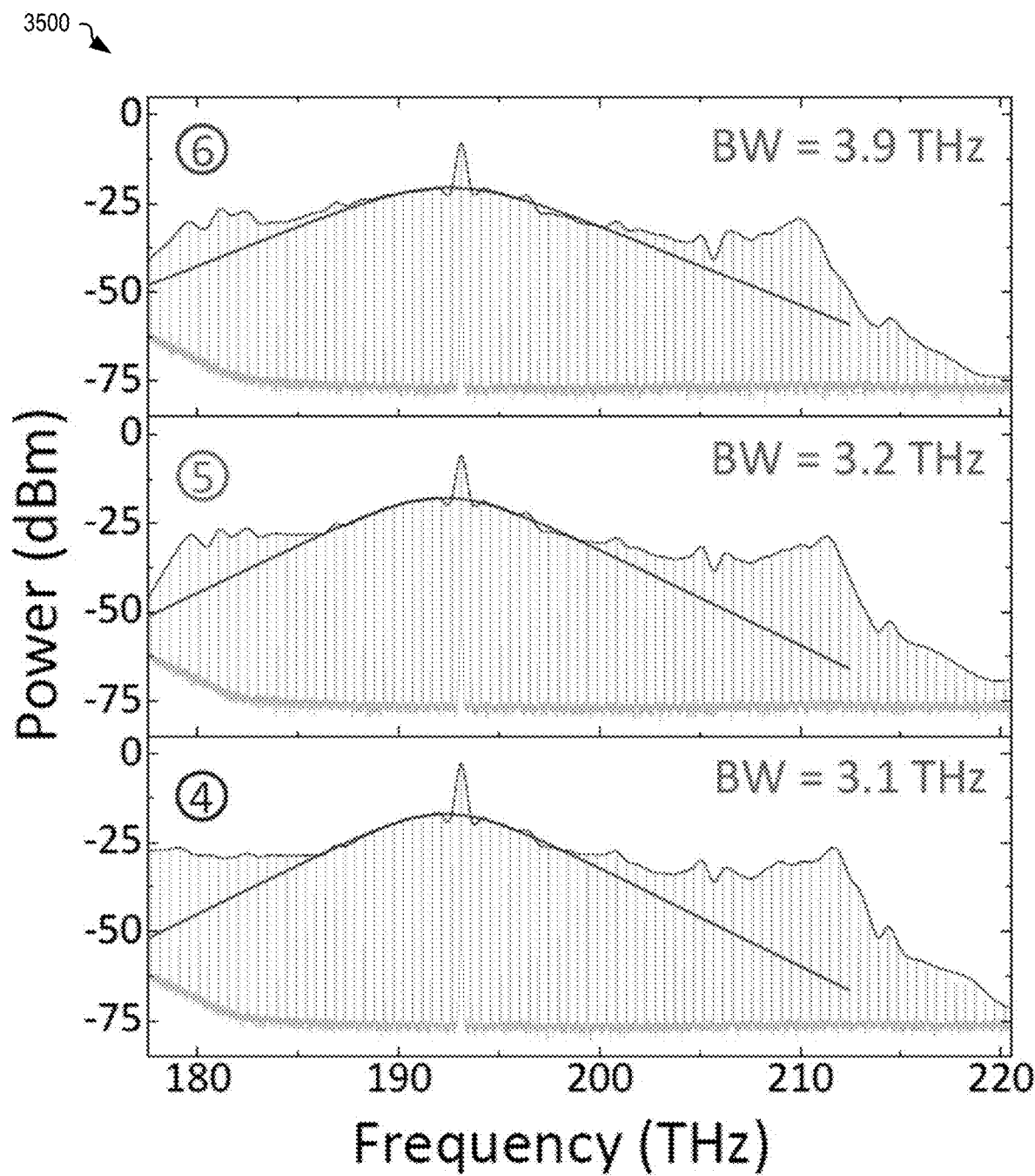

FIGS. 34 and 35 illustrate spectrum measurements in PhCRs designed to host dark and bright pulses, respectively. In FIG. 34, PhCRs has a 500 GHz FSR and settings of ε=4.5 κ to realize dark pulses and in FIG. 35, PhCRs has a 500 GHz FSR and settings of ε=5.9 κ to realize bright pulses. In an experiment, a was varied according to the sequences 1→2→3 for dark pulses or 4→5→6 for bright pulses by monotonically tuning the pump laser frequency. By varying α, both regimes of the dark-to-bright continuum were explored with the half-filled state as intermediate between them. Fitting the center lobe in both these regimes shows the characteristic increase in bandwidth as α is varied across the normal-GVD soliton continuum. Moreover, according to theoretical predictions in FIG. 28, these bright solitons (FIG. 35) exhibit a significant horn feature, which is the analog of more well-known dispersive waves in the anomalous-GVD regime. Measurements demonstrate the horn feature with an ~5 dB spectral enhancement near the PhCR GVD bandwidth limit of the soliton. Similar to the dispersive waves, the horn elevates the comb power above the center-lobe envelop, leading to the observed plateau-like spectral profile characteristic of these states. The set of normal-GVD soliton spectrum measurements in FIGS. 32-35, obtained by tuning α, presents a comprehensive test of the dark-to-bright continuum.

Frequency-Comb Sources from the Dark-to-Bright Pulse Continuum

Figure 37A:
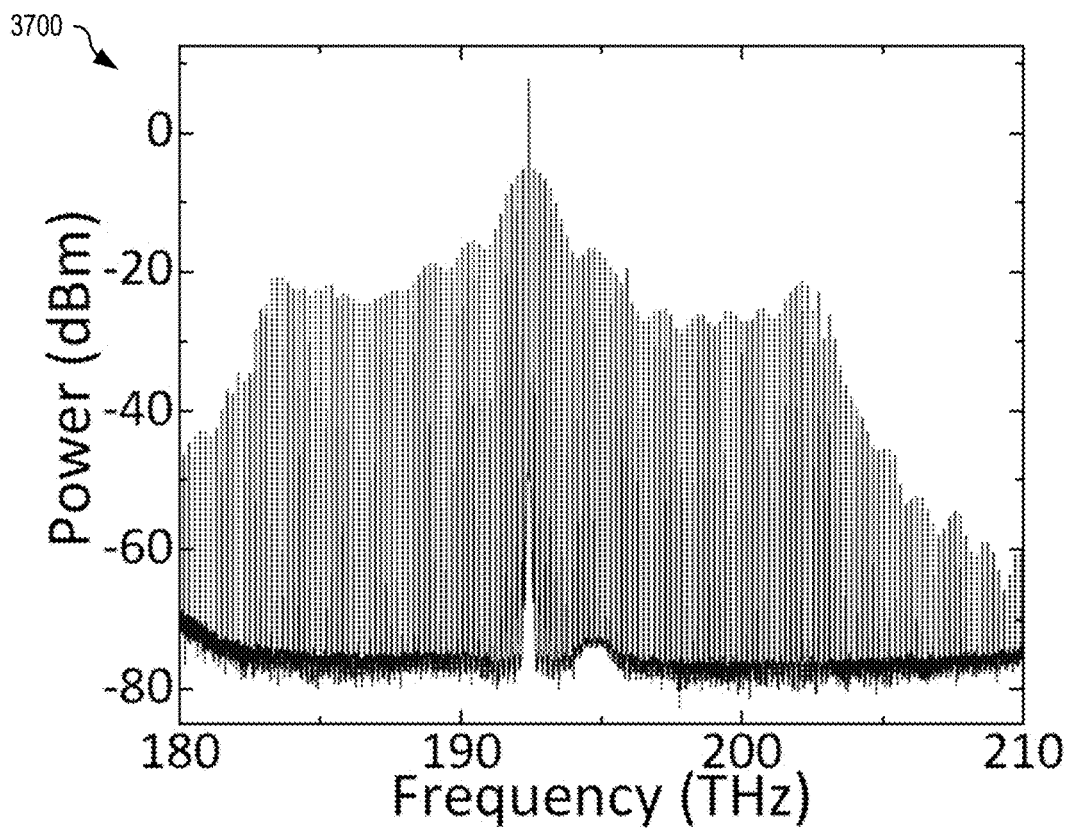
Figure 37B:
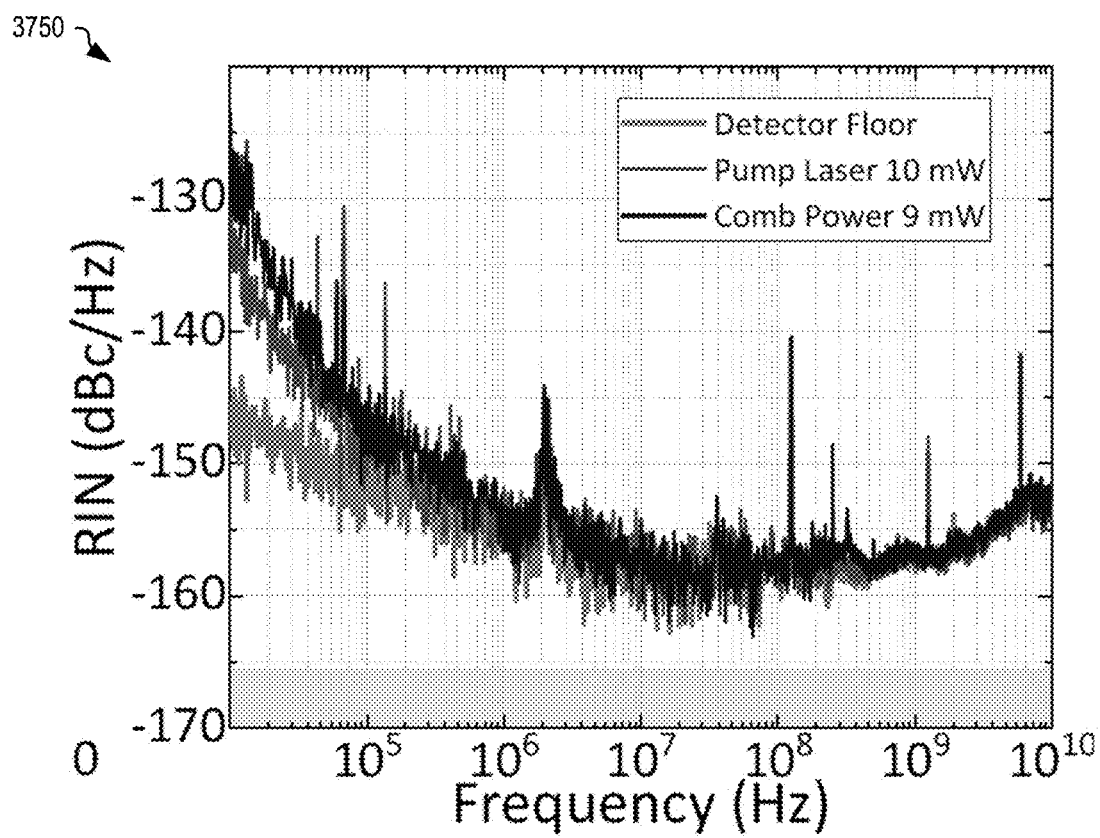
Figure 38:
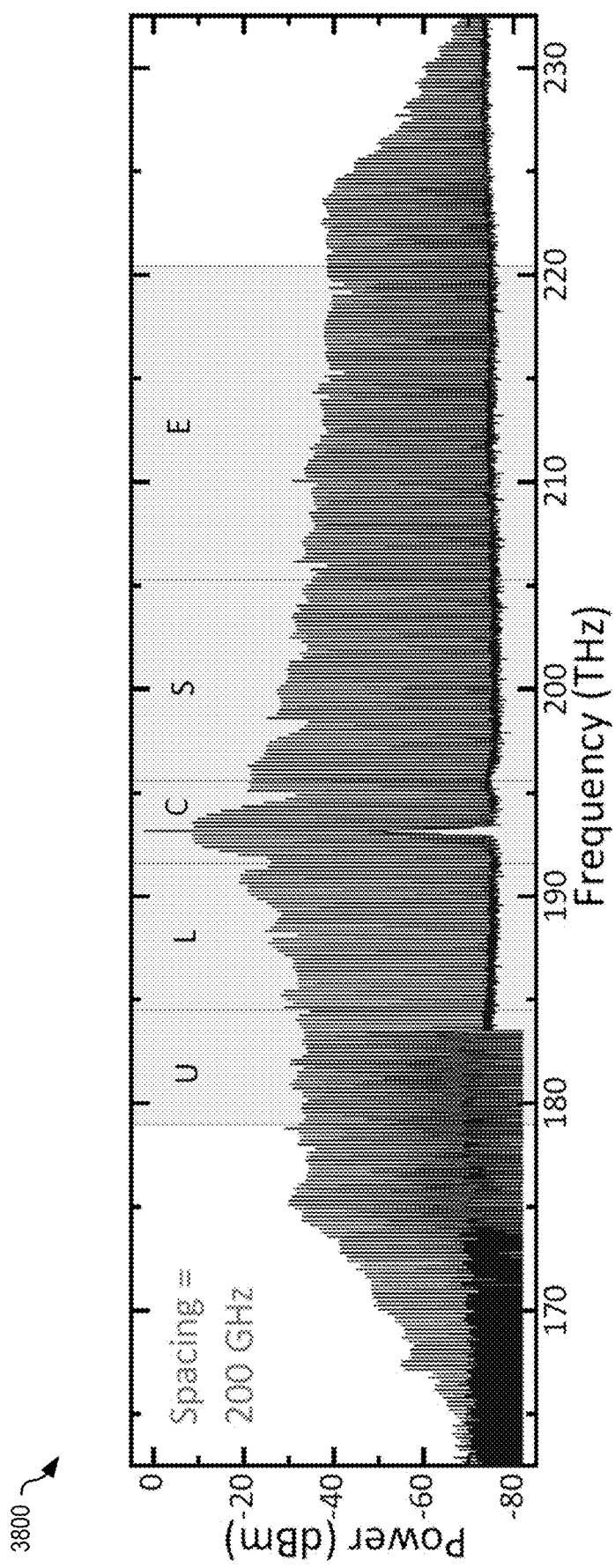

It is anticipated that nearly any state of the dark-to-bright pulse continuum yields a useful frequency-comb source. Moreover, the normal-GVD regime of Kerr frequency combs presents unique opportunities in terms of comb lasers with designable spectral coverage, relatively constant comb-mode power distribution, and high conversion efficiency of the pump laser to the integrated comb power. FIGS. 36-38 present examples of spectral design and noise measurements with a 200 GHz FSR PhCR.

Figure 36A:
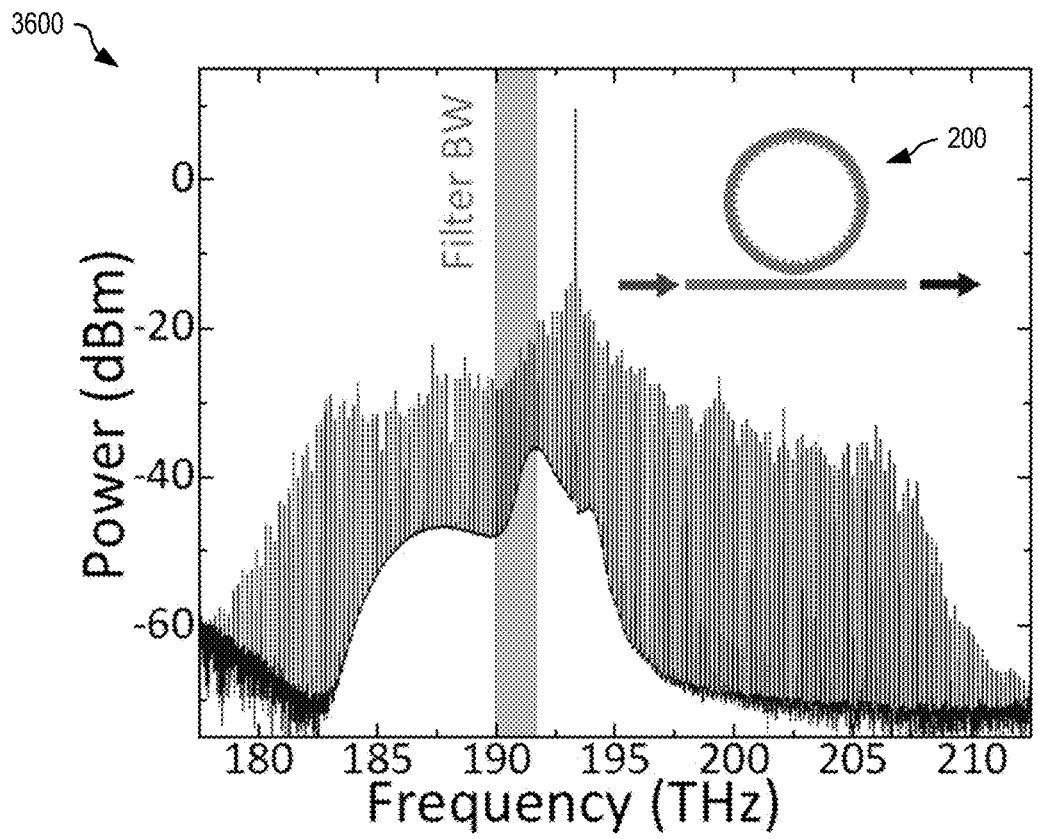
FIGS. 36A-38 present examples of spectral design and noise measurements with a 200 GHz FSR PhCR, in embodiments.
Figure 36B:
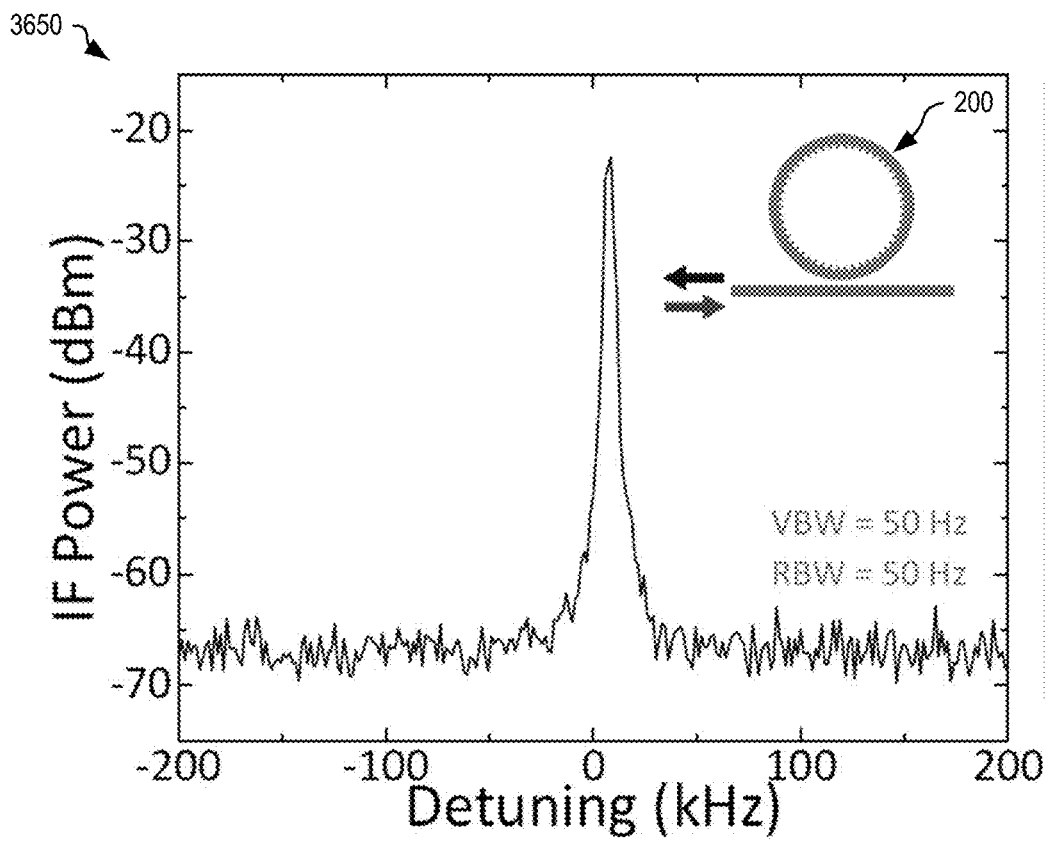

FIG. 36A is a graph 3600 illustrating optical spectrum monitoring at the transmission port of PhCR 200. FIG. 36B is a graph 3650 illustrating down-mixed electronic repetition rate beatnote measured at the reflection port of PhCR 200. FIG. 37A is a graph 3700 illustrating optical spectrum. FIG. 37B if a graph 3750 illustrating corresponding measured relative intensity noise on the comb power. FIG. 38 is a graph 3800 illustrating a 200 GHz repetition rate comb covering Telecom U through S bands. FIGS. 36A through 38 are best viewed together with the following description.

The concept of a frequency comb is generalized from the particle-like Kerr soliton to time-stationary patterns in a resonator with a single repetition frequency. But naturally the repetition frequency and comb power vary with the parameters of the PS-LLE. Moreover, the mode-frequency splitting of PhCR 200 arises from a coupling of forward and backward propagation direction, and we observe that the pulse propagation direction with respect to the pump laser primarily depends on the relative setting of α and ε. The noise measurements present here explore pulse propagation in both directions.

To characterize the repetition frequency, PhCR 200 is operated to generate a soliton pulse train reverse to the pump laser. In a graph 3600 of FIG. 36A a fraction of the comb spectrum through the transmission port is monitored. This signal results from a reflection of the backward-propagating comb to the forward transmission port. To measure the repetition frequency, a portion of the comb power is coupled to a ~150 GHz bandwidth, 0.2 A/W responsivity photodetector. An optical circulator and a 2 THz bandwidth optical filter are used prior to photodetection to reduce photocurrent from the pump laser. The 200 GHz photocurrent signal is extracted from the photodectector chip with a microwave probe, and a fourteenth-order harmonic mixer driven by a 13.92 GHz signal is used to down-convert the repetition frequency. Graph 3650 of FIG. 36B illustrates the repetition frequency at an intermediate 371.6 MHz frequency. The high signal to noise ratio of the repetition frequency is consistent with a low-noise frequency comb of equidistant modes operating in the soliton regime.

A second characterization experiment measures the relative intensity noise (RIN), which is a critical characteristic for example in applications that the comb modes are encoded with information. PhCR 200 is operated to generate a soliton pulse train in the forward direction with respect to the pump laser. The optical spectrum of a forward-emitting comb state in this measurement is shown in graph 3700 of 37A. The comb power is separated from the transmitted pump power using a wavelength-filtering element prior to photodetection. The photodiode has 12 GHz nominal bandwidth and 0.8 A/W responsivity to measure RIN, and 9 mW total comb power is delivered to the detector without amplification. Graph 3750 of FIG. 37B shows the (RIN) on the photdetected signal. The detector noise and the RIN of the pump laser are approximately at the same power level as the comb. The RIN level ranges from −130 dBc/Hz at 10 kHz to −160 dBc/Hz at higher frequencies, currently limited by the detector noise floor.

Frequency-comb lasers are revolutionizing optical communication systems, which require dense carrier grids in for example the 1300 nm and 1550 nm wavelength bands. Still, universal laser sources based on scalable photonics technology do not exist, primarily due to physical limitations of laser gain. Soliton microcombs are recognized as a promising technology for this application, but especially in the anomalous GVD regime there has been no demonstration of a microcomb that supports multiple wavelength bands. The embodiments disclosed herein demonstrate a normal-GVD PhCR with suitable properties to generate a broadband comb laser with relatively constant spectral envelope and a dense 200 GHz mode spacing. FIG. 38 shows the comb-laser spectrum, which spans the standardized telecommunication bands denoted U, L, C, S, E, and a portion of the O band. Such a spectral coverage of 50 THz exceeds what is possible with either fiber-based solid-state gain materials or semiconductor gain materials, highlighting the uniqueness of microcomb technology. Moreover, PhCR 200 soliton microcomb laser offers high conversion efficiency from the pump laser to the comb modes. Efficiency is a critical metric in hyperscale data centers for example where the demands of ever-increasing internet traffic and services causes massive energy consumption. More efficient laser sources, especially comb lasers, are one of the most important technology areas. Specifically, the comb conversion efficiency is characterized as $\eta=P_{comb}/F^2$ from the input pump power $F^2$, and that $\eta\approx25\%$ is predicted as attainable based on modeling with the PS-LLE. In experiments, a conversion efficiency as high as 21% is obtained in which PhCR 200 converts a 33 mW pump laser to soliton microcomb with 200 GHz mode spacing and 7 mW mode-integrated power that spans the optical frequency range from 180 THz to 210 THz. This information highlights the importance of normal-GVD PhCR soliton microcombs in the technology frontier.

Phase-Matching in Normal Dispersion

Figures 39A, 39B, 39C:
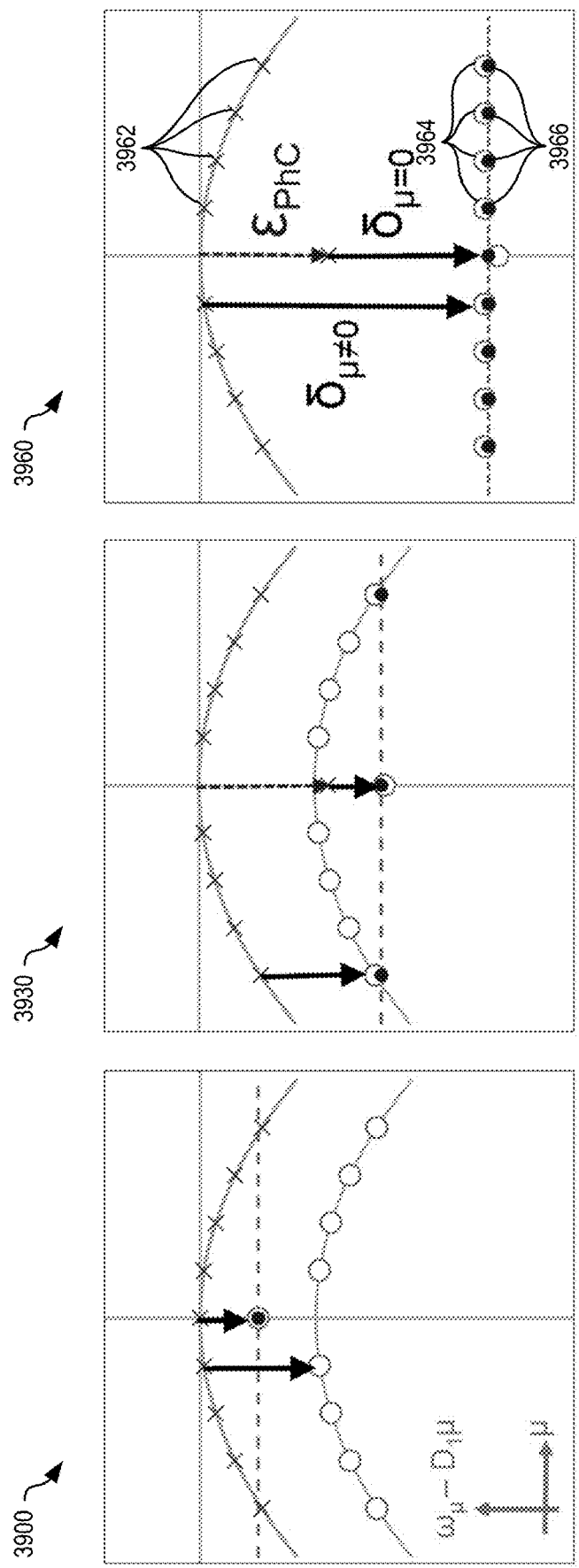
FIG. 39A is a Kerr shift diagram for normal dispersion base ring.
FIG. 39B is a Kerr shift diagram for the Turing pattern.
FIG. 39C is a Kerr shift diagram for the pulse state in the PhCR, showing the cold-cavity (X) and Kerr-shifted (○) frequencies, and energy in some modes (●), in embodiments.
Figure 40:
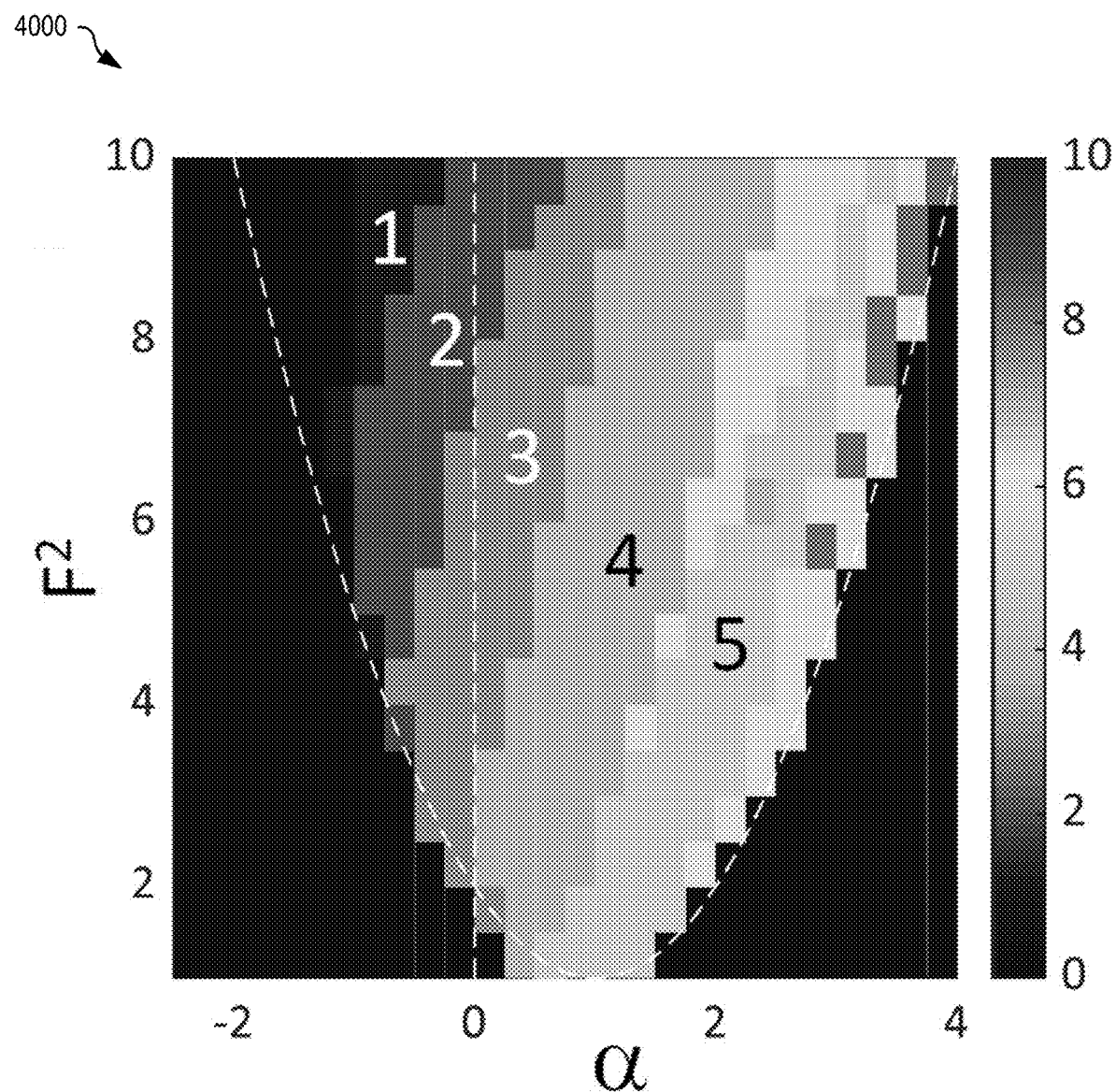
FIG. 40 is a graph illustrating a number of fringes in the optical waveform.
Figure 41:
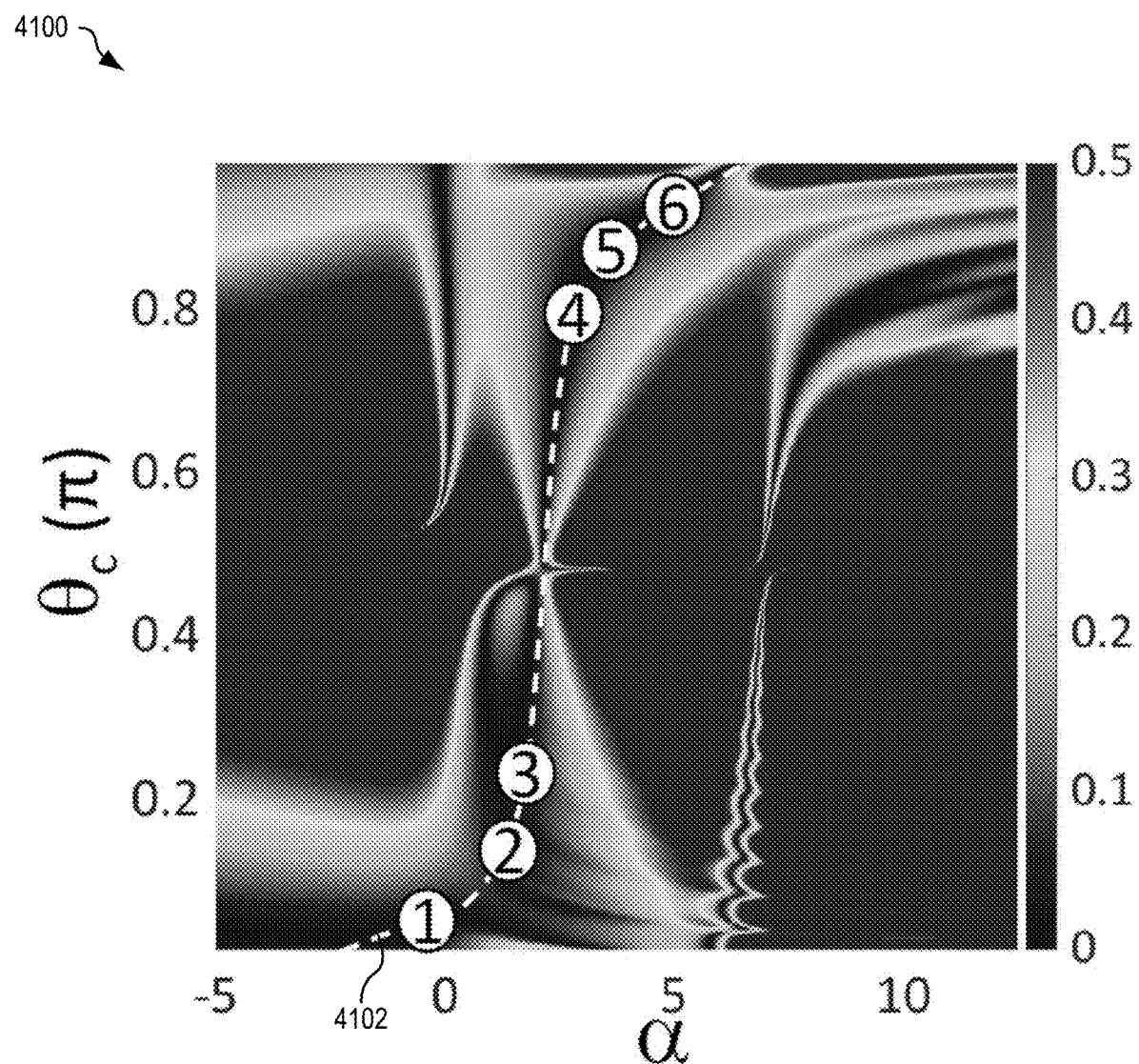
FIG. 41 is a graph illustrating error measure of the analytical ansatz, in embodiments.
Figure 42:
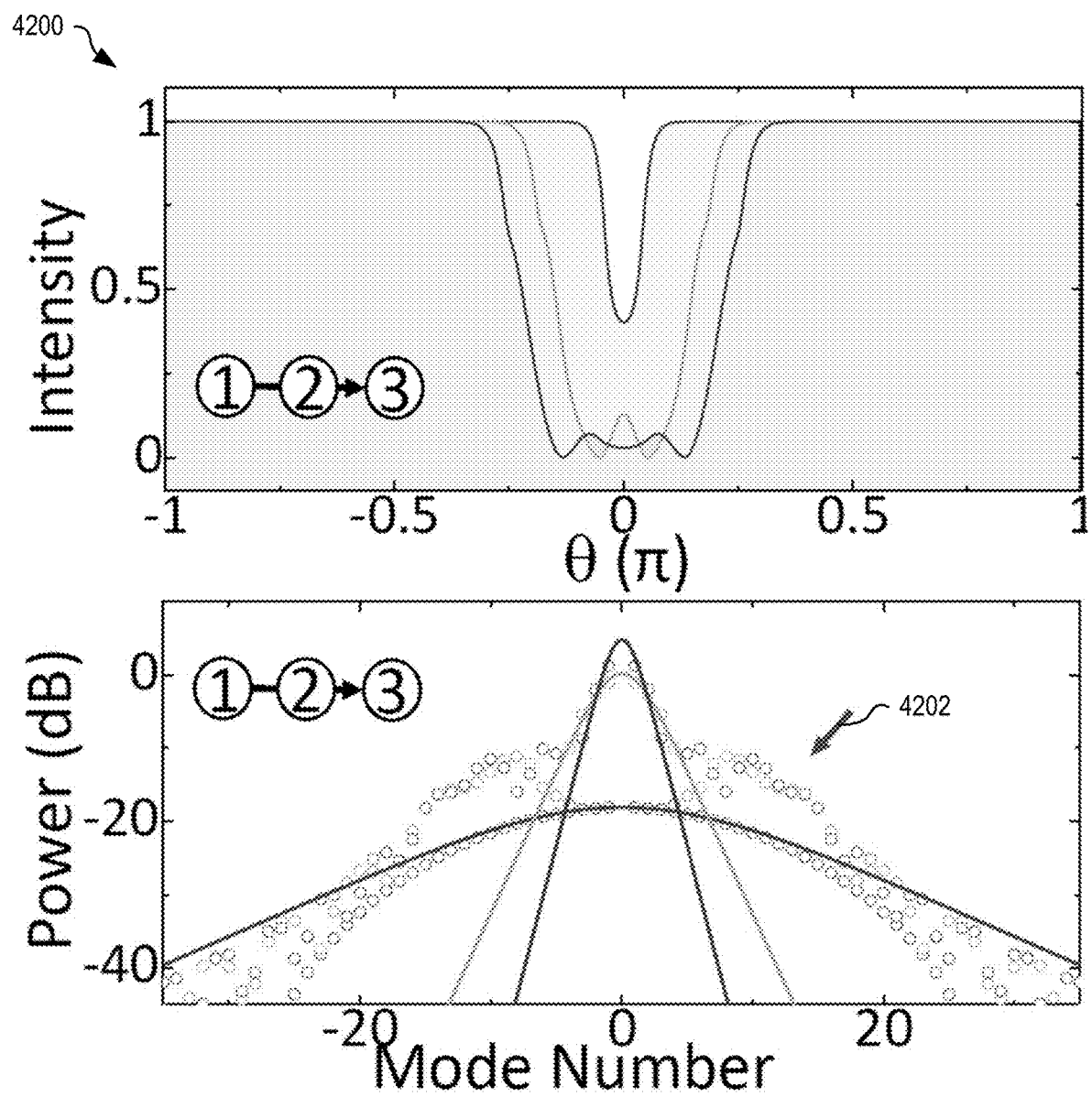
FIGS. 42 and 43 are graphs illustrating the intensities and spectra of the ansatz along the curve of FIG. 41, sweeping from dark soliton toward half-filled, and half-filled toward bright pulse, in embodiments.
Figure 43:
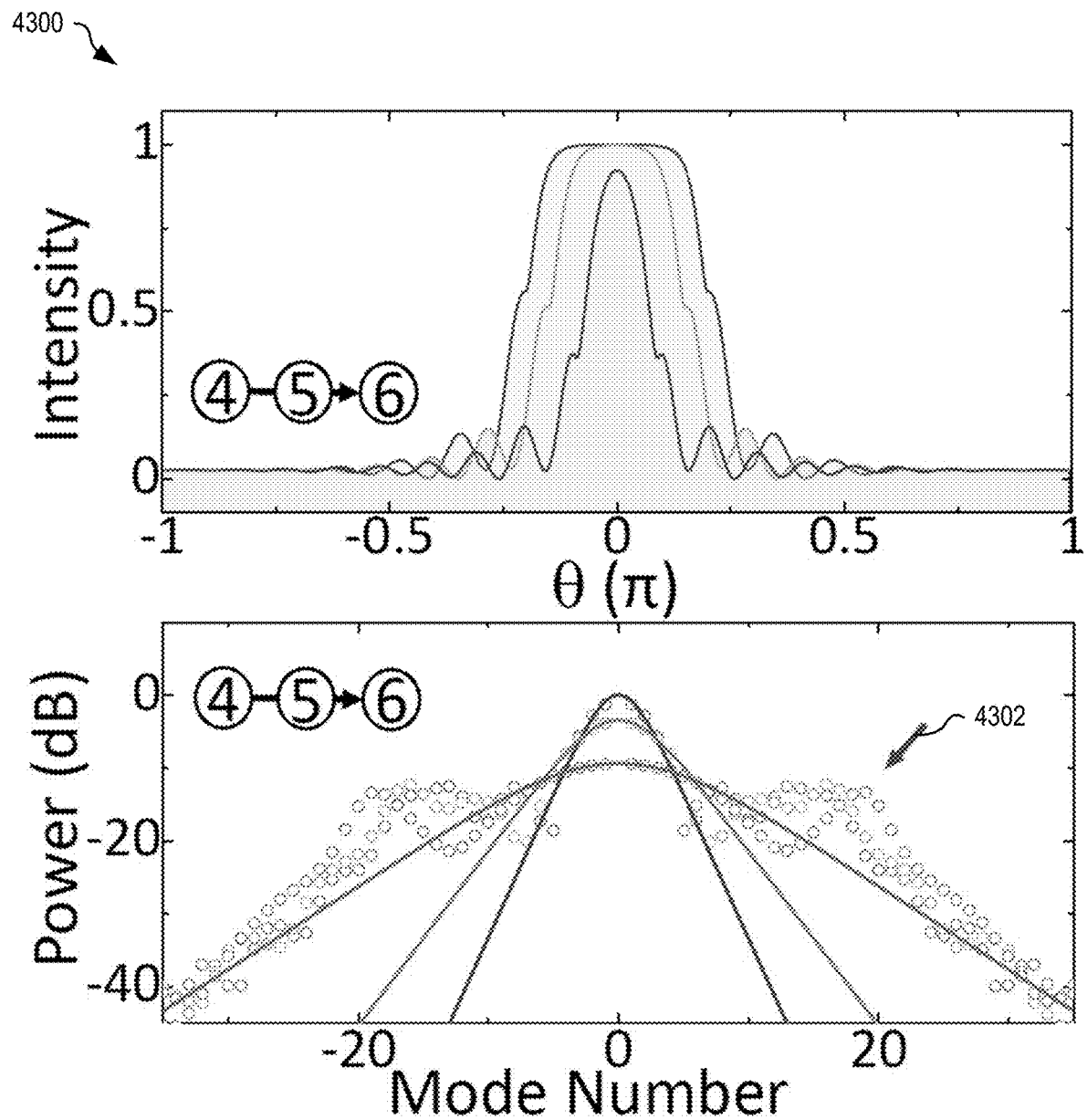

FIG. 39A is a Kerr shift diagram for normal dispersion base ring. FIG. 39B is a Kerr shift diagram for the Turing pattern. FIG. 39C is a Kerr shift diagram for the pulse state in the PhCR, showing the cold-cavity (x 3962) and Kerr-shifted (○3964) frequencies, and energy in some modes (● 3966). FIG. 40 is a graph 4000 illustrating a number of fringes in the optical waveform. FIG. 41 is a graph 4100 illustrating error measure of the analytical Ansatz using Eq. (34) (for F=3.0), where a low-error valley (dashed white line 4102) indicates reducing filling fraction with detuning. FIGS. 42 and 43 are graphs 4200 and 4300 illustrating the intensities and spectra of the Ansatz along the curve in FIG. 41, sweeping from dark soliton (FIG. 42) toward half-filled, and half-filled toward bright pulse (of FIG. 43). The center lobe fits on the spectra (plain lines) are $$y = 10\log_{10}\left(\text{sech}^2\left(\frac{x-x_0}{BW}\right)\right).$$

Phase-matching for pattern generation is conventionally unavailable in normal dispersion resonators. In this work, this is overcome using the photonic crystal shift. FIG. 39A is a graph 3900 illustrating integrated dispersion $D_{int}(\mu)$ $=\omega_\mu-\omega_0-\mu D_1$, where $\omega_\mu$ stands for the cold-cavity frequencies for the $\mu$-th mode from the pump mode $\mu=0$, $\omega_0$ the pump mode frequency, and $D_1$ the local mode spacing or free-spectral range. As the $\mu=0$ mode is energized by a pump laser, optical intensity builds up in the resonator, causing the modes to shift toward lower frequencies under the Kerr effect. However, the pump mode self-frequency shift $\delta_{\mu=0}=\frac{1}{2}\delta\mu'\neq0$ is a factor of two smaller than the other modes experiencing cross phase modulation. In an anomalous dispersion system, the $D_{int}$ curve has positive curvature, meaning the frequency difference from the local mode spacing increases with $\mu'$. This compensates for the Kerr shift mismatch between the $\mu=0$ mode and the $\mu'\neq0$ modes, therefore enabling four-wave mixing (FWM) phase-matching. In the normal dispersion case shown in FIG. S5a, the curvature is negative, moving the $\mu'\neq0$ modes further away from FWM phase-matching. Therefore, Kerr comb generation is absent in the conventional normal dispersion resonators.

A point-defect at the pump mode $\epsilon_{PhC}$ re-enables the FWM matching, shown in FIG. 39B, by filling in the mismatch between a desired pair of modes $\pm\mu'$ and the $\mu=0$ mode. The FWM matched modes energize to form Turing patterns similar to the anomalous dispersion case. More importantly, the pump mode shift modifies the detuning ranges where the pulse patterns form, also visible in PS-LLE Eq. (15). The stationary waveforms in the Kerr resonator like the bright- or dark-pulse states compose of many interlocking modes. Their component mode frequencies pull into alignment with each other by Kerr shift, shown in FIG. S5c. Since the self- and cross-phase modulation difference does not depend on the sign of dispersion, the counter-balancing term in PS-LLE Eq. (15) may also be interpreted as the time-domain equivalent of Kerr-mismatch balancing in a paper titled "Spontaneous Pulse Formation in Edge-Less Photonic Crystal Resonators," by Su-Peng Yu and Daniel C. Cole and Hojoong Jung and Gregory T. Moille and Kartik Srinivasan and Scott B. Papp, dated 2020, and incorporated herein by reference.

Derivation of Local Energy Flow

Eq. (16) is derived by evaluating the rate of change for the intensity I(θ), which is the energy per unit θ. This quantity is calculated by substituting Eq. (15) into the expression $\partial_t I(\theta)$:

$$\partial_t I = \psi^*\partial_t\psi + h.c. \tag{22}$$

$$= -2|\psi|^2 - \frac{i\beta}{2}(\psi^*\partial_\theta^2\psi - \psi\partial_\theta^2\psi^*) + F(\psi^* + \psi) + i\epsilon(\psi^*\overline{\psi} - \psi\overline{\psi}^*)$$

$$= -2I + \frac{\beta}{2}\cdot 2\partial_\theta\cdot\text{Im}(\psi^*\partial_\theta\psi) + 2F\cdot\text{Re}(\psi) + 2\epsilon\cdot\text{Im}(\psi\overline{\psi}^*)$$

$$= 2\left(-\rho_{loss} - \nabla_\theta\cdot J_\beta + \rho_{in} + P_{PhC}\right)$$

where $\rho_{in}$, $\rho_{loss}$ are the energy in-flow and loss defined above, $J_\beta=\beta/2\cdot\text{Im}(\psi^*\partial_\theta\psi)$ is an energy current driven by dispersion, and $P_{PhC}=\epsilon\cdot\text{Im}(\psi\overline{\psi}^*)$ represents power exchange induced by the photonic shift $\epsilon$. The energy flow of the physical pump is identified as $\rho_{in}$ as it is proportional to F. For the discussion of the two intensity levels, the local field is approximately flat, $J_\beta\simeq0$. We also note that $P_{PhC}$ exchanges energy within the resonator, but $\oint P_{PhC}\cdot d\theta=\text{Im}(|\overline{\psi}|^2)=0$, conserving the total energy.

Bandwidth to Filling-Fraction Correspondence

The inverse relation between fitted bandwidth BW shown in FIGS. 32-35 and the filling fraction parameter $t_c$ in the theoretical analysis is derived. Beginning with the square-wave function:

$$\psi(\theta) = \Theta(\pi t_c - |\theta|) \tag{23}$$

where $\Theta(\theta)$ is the Heaviside function. The modal spectrum of this waveform is obtained by carrying out the Fourier transform:

$$v(m) = \hat{\mathcal{F}}(\psi) = \frac{\sin(m\pi t_c)}{m\pi} \tag{24}$$

noting that setting $t_c\to 1-t_c$ changes the modal phase by $(-1)^{m+1}$ but leaves the magnitude invariant, as a result of the bright- and dark-pulse correspondence.

Focusing on the center-lobe near m=0 the second-order derivative, which links to the bandwidth, is calculated. Specifically, the second-order derivative is computed for the spectral power in units of dB, $S(f)=10\log_{10}(|v(f)|^2)$, where the mode frequencies are $f=c+m\cdot FSR$, where FSR is the free-spectral range. Evaluating the second derivative of S at m=0, gives:

$$\partial_f^2 S(f=c) = -\frac{20}{\ln(10)} \frac{\pi^2 t_c^2}{3FSR^2} \tag{25}$$

where ln(x) is the natural-log function. This is compared to the fitting function to extract BW:

$$y = a + 10\log_{10}[\text{sech}^2((f-c)/BW)] \tag{26}$$

taking its second-order derivative at f=c, gives:

$$\partial_f^2 \gamma(f=c) = -\frac{20}{\ln(10)} \cdot \frac{1}{BW^2} \tag{27}$$

The relation between BW and $t_c$ is obtained by comparing the two forms:

$$\frac{1}{BW^2} = \frac{\pi^2 t_c^2}{3FSR^2} \tag{28}$$

taking the square-root of both sides, gives the relation:

$$BW = \frac{\sqrt{3}FSR}{\pi} \cdot t_c^{-1} \tag{29}$$

which shows the inverse-proportional relation between BW and $t_c$, or, in the case of the dark-pulse-like ranges:

$$BW = \frac{\sqrt{3}FSR}{\pi} \cdot (1-t_c)^{-1} \tag{30}$$

In summary, the spectral manifestation of varying temporal filling fraction with laser detuning is an inverse-proportional change in the center-lobe bandwidth.

Waveform Features

The waveforms in normal dispersion systems show several distinct features. The above description focuses on the center lobe and its implication on the temporal duration of the bright- or dark-pulse. There are additional features at higher azimuthal frequencies including the 'wing' and 'horn'. The wing feature arises from the dark pulse touching down to zero-intensity and developing internal features (red arrow 4202 in FIG. 42). The horn feature comes from the oscillating patterns near the body of the bright-pulse (red arrow 4302 in FIG. 43). The phase diagram of the developing of these patterns, shown by plotting the number of local minima in the field, is shown in FIG. 40. The origin of these features is demonstrated using a locally linearized LLE with a piecewise-constant intensity nonlinear term. This allows an approximate waveform solution to be derived for given system parameters (detuning $\alpha$ and angle $\theta_c$ separating the two piecewise domains). The graphs of FIGS. 42 and 43 are created using this method and reasonably approximate the full LLE waveforms.

The LLE is written in the following form:

$$\partial_\tau \psi = -(1+i\alpha)\psi - \frac{id_2}{2}\partial_\theta^2 \psi + iI(\theta)\psi + F \tag{31}$$

where $I(\theta)$ is the local intensity at azimuthal angle $\theta$. The equation is approximated by separating the resonator into the domains $|\theta|<\theta_c$ and $|\theta|>\theta_c$, where $\theta_c$ specifies a switching azimuthal angle between the two domains, related to the filling ratio by $\theta_c=(1-t_c)\pi$. It is then assumed $I(\theta)$ can be treated at a constant for each domain, switching between two fixed levels $I_j$, $j=1,2$. This method is reminiscent of the switching waves but is subjected to the edge-less boundary conditions of the ring resonator. The particular solution to the system are constant fields sourced by the pump field F that produce the intensities $I_j$ in a self-consistent manner. Searching for the general solutions to Eq. (31) under this approximation, the linearized second-order differential equation in $\theta$ reads:

$$\frac{i\beta}{2}\partial_\theta^2 \psi = -(1+i\alpha_j)\psi \tag{32}$$

where $\alpha_j=\alpha-I_j$, $j=1,2$ are constants for each domain. The equation yields general S solutions of the form $\exp(\lambda_\pm \theta)$, where $$\lambda_\pm = \pm\frac{1}{\sqrt{\beta}}(u(a_j) + iu(-a_j)), u(x) = \sqrt{\sqrt{x^2+1} - x}.$$

Solution functions are chosen with the form:

$$\psi_j(\theta) = A_j \cosh(\lambda_j \theta) + E_j \tag{33}$$

for each domain, where $E_j$ is the background field for level j, $I_j=|E_j|^2$, and the hyperbolic cosine function is selected to respect the symmetry in $\pm\theta$. The pattern of the complex hyperbolic cosine can be exponential-like or sine-like depending on the signs of the local $\alpha_j$. Finally, the background level $E_1$ is set for $|\theta|<\theta_c$, and $E_2$ for $|\theta|>\theta_c$. Solving for the coefficients $A_j$ by requiring field continuity $\psi_1(\theta_c)=\psi_2(\theta_c)$, and continuity of the derivatives $\psi_1'(\theta_c)=\psi_2'(\theta_c)$ provides an analytical Ansatz for the field in the resonator, for each parameter set ($\beta$, $\alpha$, $\theta_c$, $E_j$). This simple approximate solution is found to be sufficient to reproduce the observed spectral features.

The Ansatz parameters best matching the physical state are identified by minimizing their error in the time-stationary LLE. In particular, this involves searching for a fitness measure that is sensitive to the intensity filling fraction by examining the role of each mode order $\mu$. The pump mode $\mu=0$ creates a flat background, which interferes with mode $\mu'=\pm 1$ to create a simple cosine modulation. At this point, the filling fraction is exactly 0.5 due to the shape of the cosine function. Adding $\mu'=\pm 2$ terms, the filling ratio is modified, depending on the relative phase between the modes. For example, $1+0.75 \cos(\theta)+0.25 \cos(2\theta)$ creates a bright pulse, while $1+0.75 \cos(\theta)-0.25 \cos(2\theta)$ creates a dark pulse. Accordingly, a fitness function depending on the $|\mu|\leq 2$ modes is created. A simple form is created by dividing the modal equations for mode 1 and 2 by their respective field amplitudes and subtracting the two. This creates an advantageous form that eliminates explicit dependence on the pump mode shift $\epsilon_{PhC}$ or the pump field parameters $\alpha$, F:

$$\xi_{12} = |(\delta_2 - d_{int}(2)) - (\delta_1 - d_{int}(1))| \tag{34}$$

where $\delta_j$, j=1,2 are the modal Kerr shift:

$$\delta_\mu = R(\hat{\mathcal{F}}\{|\psi(\theta)|^2\psi(\theta)\}_{,\mu} / \hat{\mathcal{F}}\{\psi(\theta)\}_{,\mu}) \qquad (35)$$

and $d_{int}$ are the linewidth-normalized integrated dispersion. The $\xi_{12}$ term vanishes for time-stationary solutions of the LLE. This metric is used to minimize the error of the Ansatz. FIG. 41 shows the evolution of $\xi_{12}$ as a function of ($\alpha$, $\theta_c$), where it is assumed the two intensity levels $I_{1,2}$ correspond to the upper- and lower-state of the bi-stable pump mode on resonance for F=3.0. $\xi_{12}$ shows three minimum valleys. The center valley (dashed line 4102 in FIG. 41) shows the correct exponential-like shape for the upper level and sine-like shape for the lower, in agreement to calculated intensity patterns in the LLE. Tracing this minimum valley of $\xi_{12}$, the trend of increasing $\alpha$ resulting in decreasing $t_c$ (increasing $\theta_c$) is observed. This suggests that the Ansatz functions, while crude, capture important aspects of the system. The intensity patterns and spectra along the curve 4102 are shown in FIGS. 42 and 43, at point 1-3 for the dark pulse, and 4-6 for the bright pulse.

The Ansatz functions show the shared physical origin of the lobe-number inside a dark-pulse (FIG. 42) and oscillations on the sides of the bright-pulse (FIG. 43). These two appear spectrally as the 'wing' and 'horn' features, respectively. The oscillations result from the sine-like behavior of the linearized LLE in the low-intensity domain, while the periodicity approximately scales with $\sqrt{\beta}$ from the form of the eigenvalue $\lambda_+$. The upper level of the pulse has exponential-like waveform, therefore does not show the oscillations.

Power Conversion Efficiency

The 25% theoretical limitation to power conversion efficiency results from an interplay between pump mode coupling condition and energy distribution of the Kerr effect. The Kerr effect extract energy from the pump mode and distributes it to the comb modes, resulting in an additional loss term on the µ=0 mode, corresponding to the imaginary counterpart of Eq. (35). The pump mode coupling condition is affected by the Kerr term, in the form of a modified effective loss rate $\kappa_i^{pump}=\kappa_i+\kappa_{Kerr}$, where $\kappa_i$, $\kappa_{Kerr}$ stand for the intrinsic and Kerr-induced loss in the resonator. In the critical or near-critically coupled devices in this work, the comb formation becomes a self-limiting process. Increasing the pump power, thus increasing the strength of the Kerr-induced loss term, shifts the coupling condition toward under-coupling, preventing the pump power from entering the resonator. The optimal power-conversion pump $F^2$ in the LLE is studied to find $\kappa_i^{pump}=\kappa_i+\kappa_c$ at the case giving the 25% efficiency, an analogue condition to maximizing the in-cavity intensity in a Fabry-Perot resonator.

The total power efficiency $\eta_{total}=P_{comb}^{out}/P_{pump}^{in}$ can be improved by overcoupling/pin the resonator. The coupling condition are specified by defining the coupling constant $K=\kappa_c/\kappa_i$. The total power efficiency may be related to the internal efficiency $\eta$ in the form:

$$\eta_{total} = \frac{4K}{K+K^{-1}+2}\cdot\eta = \left(\frac{2K}{K+1}\right)^2\cdot\eta \qquad (36)$$

where K>1 indicates over-coupling. The improved efficiency is achieved at the cost of increased threshold power, therefore reducing the maximum $F^2$ values that may be achieved by a given pump laser. The benefit of overcoupling arrives because the absorption loss of the resonator is diluted by the rapid removal of energy by the bus waveguide (e.g., waveguide 202, FIG. 2), thus enabling the 25% energy division limit to be overcome. Note that in the limit of high coupling K>>1, $\eta_{total}\to 4\eta$, therefore the maximum internal efficiency of 25% corresponds to an 100% total efficiency in the limiting case. Stronger coupling parameter spaces, and methods to control the pump mode coupling strength deferentially from the other modes, such as modified bus waveguides with a low-finesse pump recycling cavity or contra-directional grating coupler, are being explored to further improve the conversion efficiency.

Description of Embodiments

Fabrication of resonators in silicon materials is well known. However, the nonlinear absorptive losses of silicon preclude any resonator fabricated in silicon from operating as described above. Accordingly, it is not possible to achieve the described performance within non-linear resonators fabricated from silicon.

Particularly, modifying an inner radial wall of PhCR 200, fabricated from $Ta_2O_5$, does not deter from a high resonator Q factor. PhCR 200 is designed to provide a specific output for a given input. For example, R and RW are determined for a given operational frequency and the periodic nanopatterning 204 is determined to provide the spontaneous output. For example, for a given pump power and frequency, PhCR 200 may be designed to spontaneously form a dissipative Kerr soliton without the need for other components. This was not possible in the prior art without the need for additional components to cause the dissipative Kerr soliton to form. Accordingly, PhCR 200 provides a significant size advantage over the prior art solutions. The functionality is enabled within PhCR 200 because the Q factor does not decrease, which is a requirement for nonlinear optics, since the power level required for the nonlinear optical effects is smaller. Accordingly, material selection and quality of fabrication of PhCR 200 is critical for nonlinear optics.

The periodicity of periodic nanopatterning 204 is commensurate with the wavelength of light being pumped into PhCR 200. That is, PhCR 200 is designed such that the laser being pumped into PhCR 200 at a frequency that is a mode of the resonator. Further, periodic nanopatterning 204 is also tuned to the wavelength of the laser being pumped into PhCR 200. In certain embodiments, periodic nanopatterning 204 has a single spatial modulation period that changes one resident mode of PhCR 200. In other embodiments, periodic nanopatterning 204 has multiple spatial modulation periods that change multiple modes of PhCR 200.

Figure 44A:
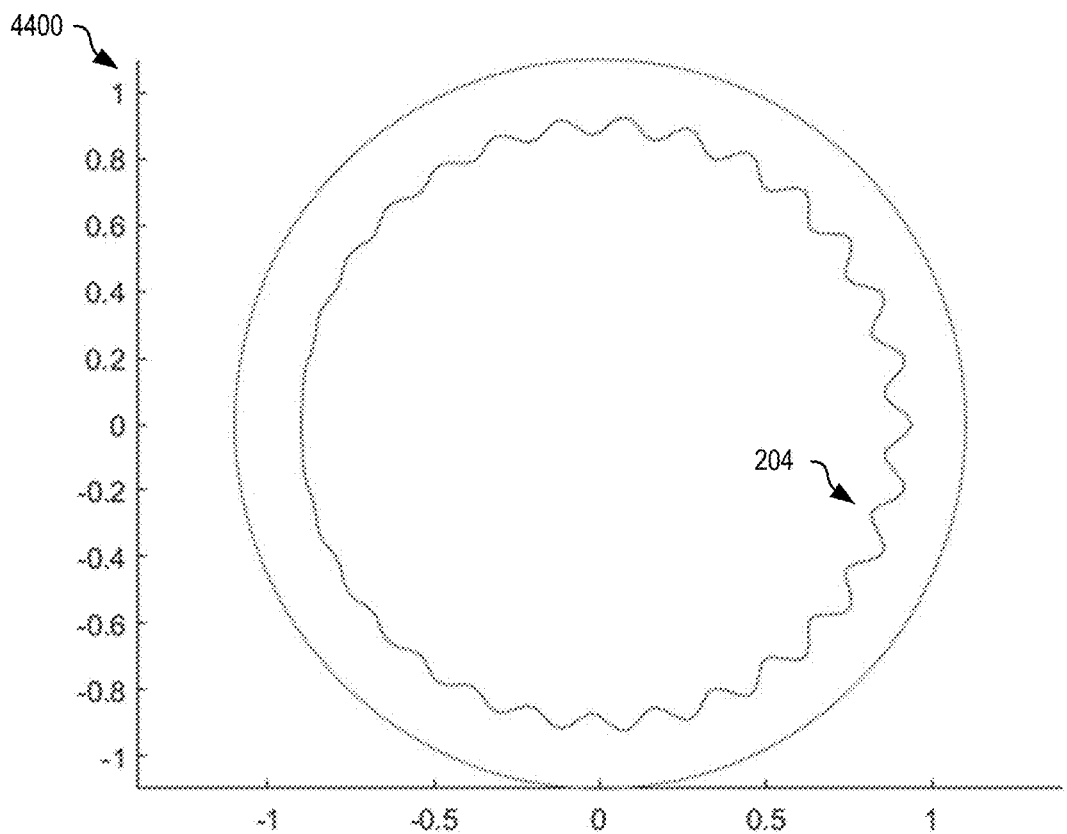
FIGS. 44A and 44B are graphs illustrating example nanopatterning with multiple periodicities, in embodiments.

FIG. 44A is a graph 4400 illustrating one example of periodic nanopatterning 204 generated with a modulation form of: Rin=0.9+0.02*cos(29*theta)+0.02*cos(30*theta). In this example, the periodicity of the two cosine functions differ by one over the full circle (e.g., inner radial wall 205), leading to the illustrated pattern where the amplitude appears to be twice as large on one side, and zero on the other side. The apparent change of 'local' amplitude over the ring is the interference between sine waves of different periods.

Figure 44B:
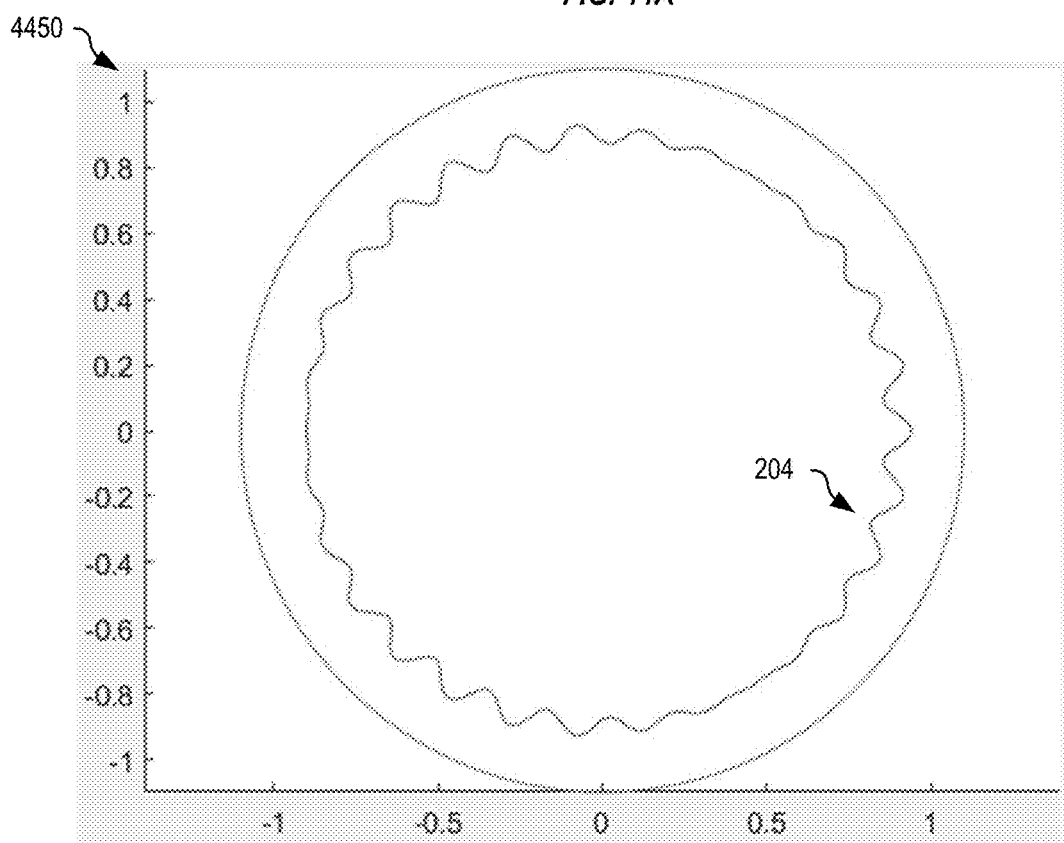

FIG. 44B is a graph 4450 illustrating one example of periodic nanopatterning 204 generated with a modulation form of: Rin=0.9+0.02*cos(27*theta)+0.02*cos(30*theta). In this example, the periodicity differs by three over the full circle (e.g., inner radial wall 205) and the amplitude transitions between large and near-zero three times around the circle.

The precision at which periodic nanopatterning 204 is formed around inner radial wall 205 is critical for correct operation of PhCR 200. To control the nonlinear optics effects (e.g., modes) within PhCR 200, periodic nanopatterning 204 has to be fabricated precisely around inner radial wall 205. Where the operational frequency of the resonator is lower, and larger silicon resonators are used, the fabrication is less critical. However, since PhCR 200 is designed for use at higher frequencies and lower power levels (e.g., for use in optical network solutions), PhCR 200 is smaller and therefore requires significantly higher precision to allow spontaneous pulse formation. Particularly, the resolution of periodic nanopatterning 204 in the fabrication process is in the order of the linewidth of the resonant wave, and in certain embodiments is within a range of between 2 nm and 10 nm. Such precision was not required for prior art resonators and was not previously demonstrated. However, such precision is required for periodic nanopatterning 204 such that specific modes within PhCR 200 may be controlled and thereby achieve spontaneous optical-pulse generation.

Although illustrated as sinusoidal, periodic nanopatterning 204 may have other forms including but not limited to square, triangular, sawtooth, and so on.

As described above, periodic nanopatterning 204 is formed only at inner radial wall 205 of ring 206. A further reason for this is that a property of photonic crystal is that sub-wavebands of light have a higher frequency and light at these shorter wavelengths is pushed against outer radial wall 212. Accordingly, the light at these shorter wavelengths has less interaction with periodic nanopatterning 204.

When the pump light is applied to PhCR 200, many modes of the resonator are excited within the resonator cavity (ring 206), and the higher frequency components of the pulse are spatially at a larger radius than the lower frequency components and therefore see a different loss because they are not encountering as much periodic nanopatterning 204 as compared to the lower frequency components. Accordingly, the size of ring 206 is engineered such that for each desired mode of the resonator is configured to have the desired loss and phase shift.

Although the above embodiments illustrate the use of $Ta_2O_5$ and $SiO_2$, other material may be used without departing from the scope hereof. For example, PhCR 200 may be fabricated using $SiO_2$ and one or more of silicon carbide (SiC), silicon nitride (SiN), aluminum nitride (AlN), and lithium niobate ($LiNbO_3$) as alternating layers.

Figure 45:
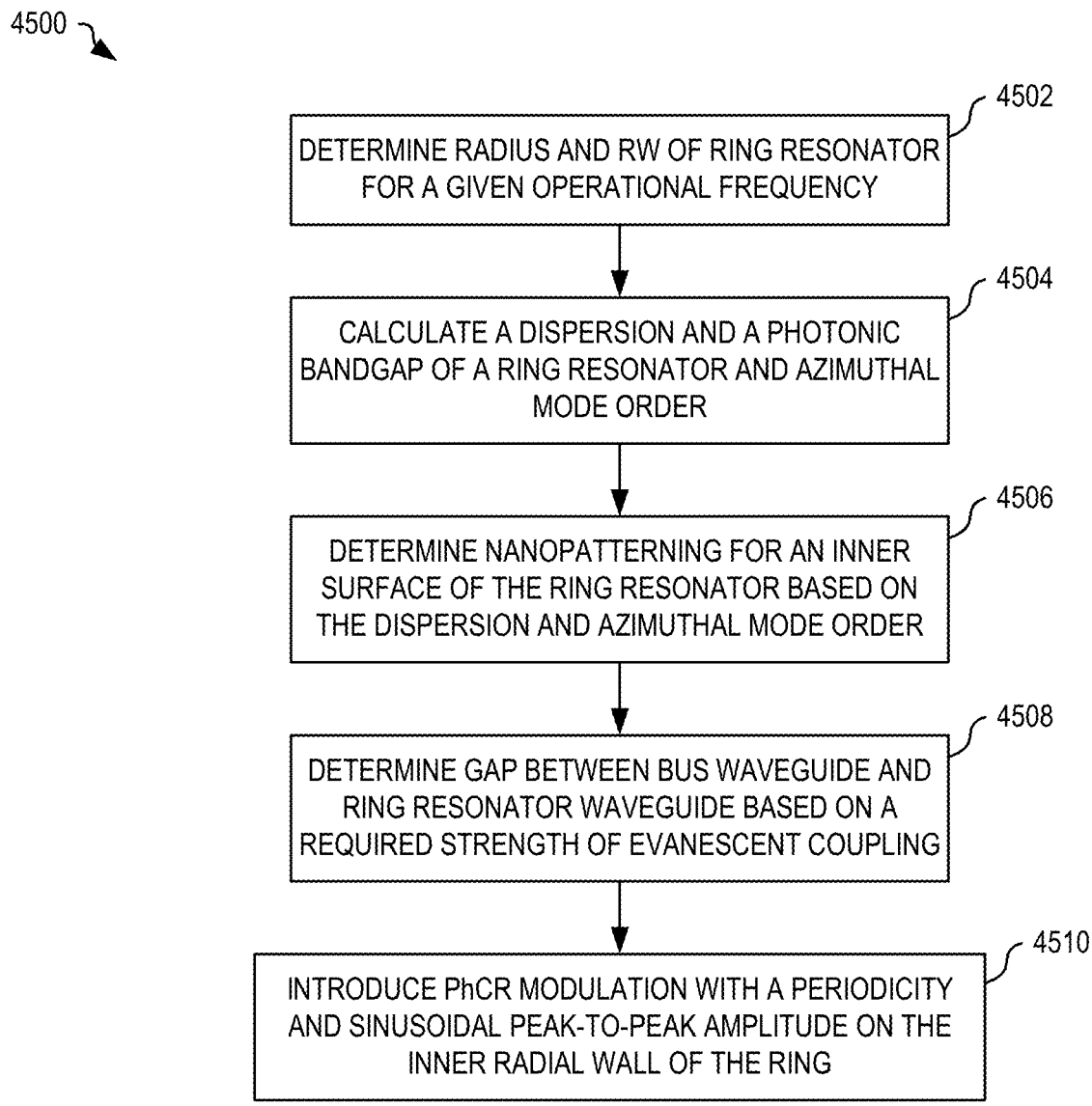
FIG. 45 is a flowchart illustrating one example process for fabrication of the PhCR of FIG. 2, in embodiments.

FIG. 45 is a flowchart illustrating one example method 4500 for designing PhCR 200 of FIG. 2 to operate at given resonance frequencies. In block 4502, method 4500 determines the period of the resonator such that the bandgap matches the desired operational wavelength. In one example of block 4502, for a desired operational frequency, a radius and RW of conventional ring resonator 100, FIG. 1, is calculated. In block 4504, method 4500 calculates a dispersion and a photonic bandgap of the ring resonator and azimuthal mode order m of the PhC. In one example of block 4504, a finite-element method program is used to calculate a dispersion and a photonic bandgap of conventional ring resonator 100, FIG. 1 for the determined radius and RW. The dispersion calculation yields the propagation constant $k_{eff}$ for RW, ring radius R, and desired operational frequency. The azimuthal mode order m of the PhC is then calculated by the boundary condition $k_{eff} \cdot 2\pi R = 2 m\pi$. In block 4506, method 4500 determines a periodic nanopatterning for an inner radial wall of the ring resonator based on the desired output pulse from PhCR 200. In one example of block 4506, a frequency and amplitude of nanopatterning 204 is determined to have with the periodicity $2\pi R/2m$ and sinusoidal peak-to-peak amplitude $A_{PhC}$. The sinusoidal shape is chosen as it can be fabricated reliably to very small amplitude using lithography and plasma etching, however, in certain embodiments, a particular shape is also selected based on the desired output of PhCR 200. In block 4508, method 4500 determines a gap between a bus wave guide and the ring resonator waveguide based on a required strength of evanescent coupling. In one example of block 4508, a bus waveguide approaches the smooth outer radial wall of the ring resonator, and a strength of the evanescent coupling between the resonator and the bus is controlled by the gap between the two.

According to this method, the geometry of ring 206 and waveguide 202 are correlated to a desired mode structure and/or dispersion of PhCR 200 while also taking into account a desired type of laser output from PhCR 200, such as an optical frequency comb, or a particular type of pulse. In the case of a pulse being output, the temporal profile of the pulse may be controlled by periodic nanopatterning 204. For example, the desired output could be a classic soliton pulse that has a sech type temporal profile, or it may be desired for the pulse to have a gaussian profile, or it may be desired to for the pulse to approximate a sink pulse in shape. Advantageously, PhCR 200 may be designed and fabricated to correlates all these constraints together such that PhCR 200 spontaneously generates the desired output when the appropriate input is provided.

Figure 46:
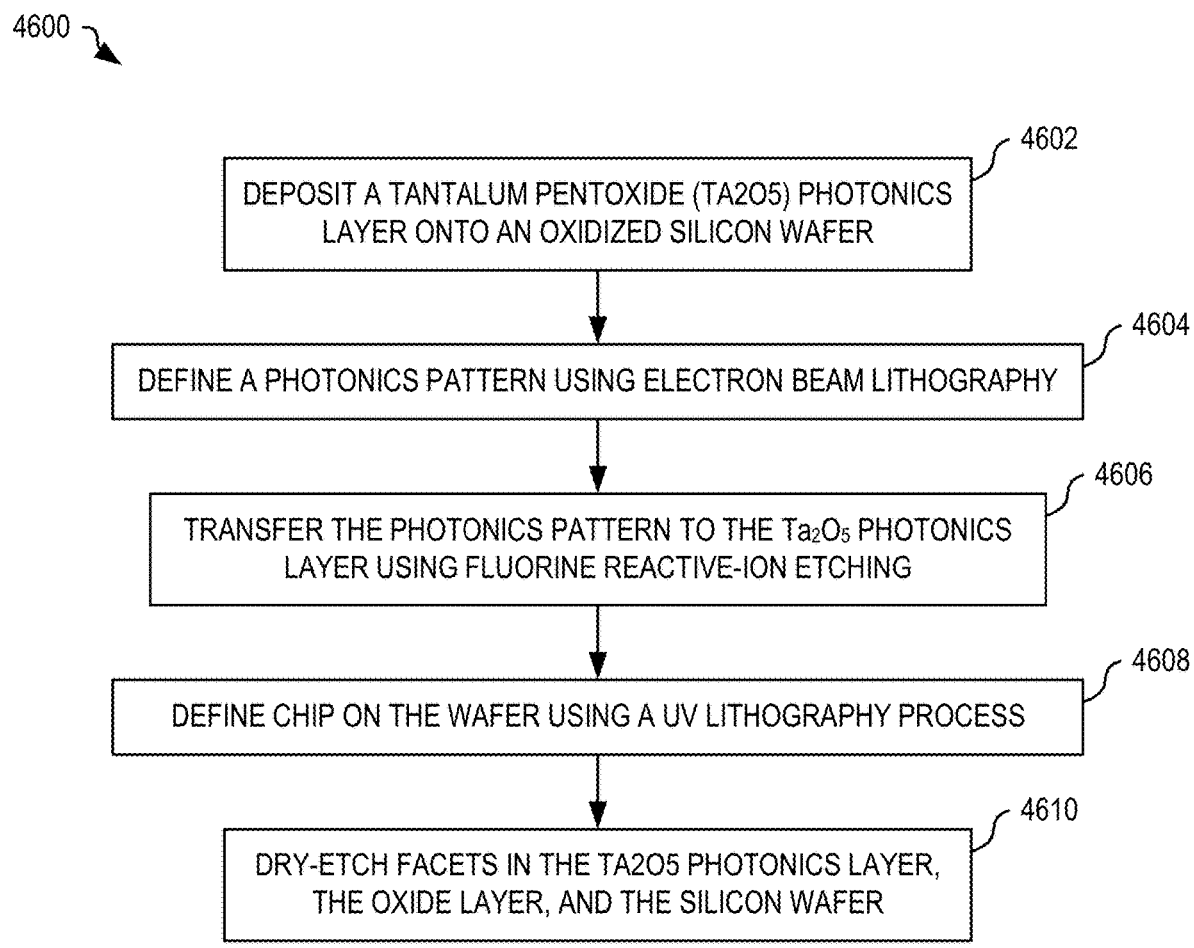
FIG. 46 is a flowchart illustrating one example method for fabricating the PhCR of FIG. 2, in embodiments.

For example, the temporal shape of the resonator may be designed, then corresponding photonic crystal nano patterning may be designed in order to give the output the appropriate shape and the design is implemented using the fabrication process shown in FIG. 46.

FIG. 46 is a flowchart illustrating one example method 4600 for fabricating PhCR 200 of FIG. 2, in embodiments. In block 4602, method 4600 deposits a tantalum pentoxide ($Ta_2O_5$) photonics layer onto an oxidized silicon wafer. In certain embodiments, the $Ta_2O_5$ and $SiO_2$ layer are repeated one or more times. In block 4604, method 4600 defines a photonics pattern using electron beam lithography. In block 4606, method 4600 transfers the photonics pattern to the Ta2O5 photonics layer using fluorine reactive-ion etching. In block 4608, method 4600 defines chips on the wafer using a UV lithography process. In block 4610, method 4600 dry-etches facets in the Ta2O5 photonics layer, the oxide layer, and the silicon wafer.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A photonic-crystal resonator (PhCR), comprising:
    a ring having an outer radial wall, and an inner radial wall, and an inner radius, defined by a distance to the inner radial wall, that varies as a periodic function of azimuthal angle; and
    a waveguide lying tangential to the outer radial wall.
2. The PhCR of claim 1, the periodic function having a single spatial period.

3. The PhCR of claim 2, the single spatial period being less than a wavelength of at least one mode of the PhCR.

4. The PhCR of claim 1, the periodic function including a sinusoidal modulation having more than one spatial period.

5. The PhCR of claim 1, the outer radial wall being azimuthally smooth.

6. The PhCR of claim 1, each of the ring and the waveguide comprising a stack of layers, at least one of the layers comprising $Ta_2O_5$ and at least one of the layers comprising $SiO_2$.

7. The PhCR of claim 6, the stack comprising alternating layers of $Ta_2O_5$ and $SiO_2$.

8. The PhCR of claim 1, the ring and the waveguide being formed in a stack of materials including $SiO_2$ and one or more of silicon carbide (SiC), silicon nitride (SiN), aluminum nitride (AlN), and lithium niobate ($LiNbO_3$).

* * * * *